(12) United States Patent
Borgstadt

(10) Patent No.: US 7,841,414 B1
(45) Date of Patent: Nov. 30, 2010

(54) WORK STRING CONTROLLER

(75) Inventor: Justin Borgstadt, Duncan, OK (US)

(73) Assignee: Halliburton Energy Services Inc., Duncan, OK (US)

( * ) Notice: Subject to any disclaimer, the term of this patent is extended or adjusted under 35 U.S.C. 154(b) by 0 days.

(21) Appl. No.: 12/875,001

(22) Filed: Sep. 2, 2010

Related U.S. Application Data

(63) Continuation of application No. 12/140,191, filed on Jun. 16, 2008.

(51) Int. Cl.
*E21B 23/00* (2006.01)
(52) U.S. Cl. .................. 166/381; 166/250.01; 166/53
(58) Field of Classification Search ......... 166/379–381, 166/250.01, 53, 77.1, 77.51
See application file for complete search history.

(56) References Cited

U.S. PATENT DOCUMENTS

| | | | |
|---|---|---|---|
| 3,204,706 A | 9/1965 | Jonsson | |
| 4,016,942 A | 4/1977 | Wallis, Jr. et al. | |
| 4,110,688 A | 8/1978 | Bailey | |
| 4,269,554 A | 5/1981 | Jackson | |
| 4,367,056 A | 1/1983 | Seneviratne | |
| 4,405,115 A | 9/1983 | Boyadjieff | |
| 4,531,875 A | 7/1985 | Krueger | |
| 4,591,007 A | 5/1986 | Shaginian et al. | |
| 4,748,563 A | 5/1988 | Anthoine | |
| 4,752,682 A | 6/1988 | Beck et al. | |
| 4,854,397 A | 8/1989 | Warren et al. | |
| 4,951,759 A | 8/1990 | Richardson | |
| 4,964,462 A | 10/1990 | Smith | |
| 5,014,781 A | 5/1991 | Smith | |
| 5,122,023 A | 6/1992 | Mochizuki | |
| 5,351,767 A | 10/1994 | Stogner et al. | |
| 5,750,896 A | 5/1998 | Morgan et al. | |
| 5,923,428 A | 7/1999 | Woodworth | |
| 5,931,238 A | 8/1999 | Gilmore et al. | |
| 6,158,516 A | 12/2000 | Smith et al. | |
| 6,179,065 B1 | 1/2001 | Payne et al. | |
| 6,298,927 B1 | 10/2001 | Back | |
| 6,343,892 B1 | 2/2002 | Kristiansen | |

(Continued)

FOREIGN PATENT DOCUMENTS

WO 9312318 A1 6/1993

(Continued)

OTHER PUBLICATIONS

Anderson, Robb G., "Web machine coordinated motion control via electronic line-shafting," IAS Annual Tech. Conf., Oct. 3-7, 1999, 8 pages, Proc. of I.E.E.E.

(Continued)

*Primary Examiner*—David J Bagnell
*Assistant Examiner*—Catherine Loikith
(74) *Attorney, Agent, or Firm*—John W. Wustenberg; Conley Rose P.C.

(57) ABSTRACT

Well bore servicing equipment is provided. The well bore servicing equipment comprises a first manipulator to grip a well bore work string, to raise the work string, and to lower the work string. The well bore servicing equipment further comprises a controller to receive a work string trajectory input and to automatically control the first manipulator to raise and lower the work string substantially in conformance with the work string trajectory input.

20 Claims, 19 Drawing Sheets

U.S. PATENT DOCUMENTS

| | | |
|---|---|---|
| 6,386,284 B1 | 5/2002 | Buck et al. |
| 6,626,238 B2 | 9/2003 | Hooper |
| 6,688,393 B2 | 2/2004 | Sredensek et al. |
| 6,759,968 B2 | 7/2004 | Zierolf |
| 6,890,156 B2 * | 5/2005 | Watson et al. .................. 417/42 |
| 6,896,055 B2 | 5/2005 | Koithan |
| 7,011,166 B2 * | 3/2006 | Koch et al. .................... 175/24 |
| 7,059,427 B2 | 6/2006 | Power et al. |
| 7,182,133 B2 | 2/2007 | Webre et al. |
| 7,228,771 B2 | 6/2007 | Muscarella et al. |
| 2007/0131416 A1 | 6/2007 | Odell, II et al. |
| 2009/0308603 A1 | 12/2009 | Borgstadt |

FOREIGN PATENT DOCUMENTS

| | | |
|---|---|---|
| WO | 0151760 A2 | 7/2001 |

OTHER PUBLICATIONS

Foreign communication from a related counterpart application—International Search Report and Written Opinion, PCT/GB2009/001465, Oct. 8, 2009, 9 pages.

Lorenz, Robert D., "Synchronized motion control for process automation," http://ieeexplore.ieee.org/xpl/absprintf.jsp?arnumber=96869&page=FREE, 2009, 7 pages, IEEE.

Patent application entitled, "Work string controller," by Justin Borgstadt, filed Sep. 2, 2010 as U.S. Appl. No. 12/874,997.

Patent application entitled. "Work string controller," by Justin Borgstadt, filed Sep. 2, 2010as U.S. Appl. No. 12/874,998.

Patent application entitled, "Work string controller," by Justin Borgstadt, filed Sep. 2, 2010 as U.S. Appl. No. 12/875,005.

* cited by examiner

WORK STRING CONTROLLER

CROSS-REFERENCE TO RELATED APPLICATIONS

This is a Continuation Application of U.S. patent application Ser. No. 12/140,191, filed Jun. 16, 2008 and published as US 2009/0308603 A1, and entitled "Work String Controller," which is hereby incorporated by reference herein in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Automated control systems attempt to drive physical characteristics of a system, for example a process or object, to achieve system objectives. Automated control systems may be able to improve on the control provided manually by a human operator, for example by providing a higher frequency response, by taking account of a greater number of system parameters, and/or by providing a higher accuracy of control. Automated control systems may take many forms and may be designed to use continuous time controllers and/or discrete time controllers. Control systems may be both designed and described with control diagrams representing processing blocks. Generally, a control system may be built and implemented from the control system diagram.

A well bore may be serviced using a work string. A work string may include continuous coiled tubing which is fed continuously into the well bore from large spools. The longer the continuous tubing, the greater the tensile strength of the tubing may be to support the weight of the longer tubing. On the other hand, the greater the tensile strength of the tubing, the less flexible the tubing may be and the greater stress that may be produced in the tubing as it flexes going into the well bore and coming back out of the well bore. An advantage of coiled tubing is that it can be fed relatively rapidly and continuously into a well bore. A work string may also be composed of interconnected pieces or joints of pipe, for example joints of pipe about 10 meters long with a male threaded end and an opposite female threaded end. The pipe joints are connected together by threading two pipe joints together tightly. Various tools may be attached to the end of the work string—either coiled tubing or interconnected joints of pipe—to accomplish a variety of well bore operations.

SUMMARY

Disclosed herein is a well bore servicing equipment, comprising a first manipulator to grip a well bore work string, to raise the work string, and to lower the work string; and a controller to receive a work string trajectory input and to automatically control the first manipulator to raise and to lower the work string substantially in conformance with the work string trajectory input. The work string trajectory input may comprise at least a work string target position and a work string target velocity. The work string trajectory input may comprise an ordered sequence of target pairs, wherein each target pair comprises a work string target position and a work string target velocity, and wherein the controller controls the first manipulator to drive the work string to each of the work string target positions at the associated work string target velocity with the work string target position in the ordered sequence. The first manipulator may comprise a first slip bowl to grip the work string and a first hydraulic actuator to exert force on the work string via the first slip bowl to raise and to lower the work string. The first manipulator may further comprise a hydraulic axial piston pump, and the controller may be operable to control the flow rate of the hydraulic axial piston pump, whereby the controller controls in part the first manipulator. The first manipulator may further comprise a second hydraulic actuator to exert force on the work string via the first slip bowl to raise and to lower the work string and a first traveling head that couples the first slip bowl to the first hydraulic actuator and to the second hydraulic actuator. The well bore servicing equipment may further include a second manipulator to grip the well bore work string, to raise the work string, and to lower the work string, and the controller may further automatically control the second manipulator to raise and to lower the work string substantially in conformance with the work string trajectory input. The well bore servicing equipment may further include a collar detector to detect a collar location of the work string. The controller may coordinate control of the first manipulator and the second manipulator to provide substantially continuous movement of the work string in accordance with the work string trajectory input and to avoid one of the first manipulator and the second manipulator gripping the work string at the collar location of the work string, whereby increased operational speed is achieved. The controller may comprise a first manipulator controller to provide a first manipulator force command based on a feedback associated with the first manipulator, based on a model of the first manipulator, and based on a first manipulator command trajectory that is based on the work string trajectory input. The first manipulator may comprise an actuator, and the controller may comprise a first drive modulator to map a first manipulator force command and a first manipulator velocity command to an actuator control signal. The first drive modulator may map the first manipulator force command and the first manipulator velocity command to the actuator control signal based on feedback associated with the actuator and based on a model of the actuator. The first manipulator may comprise an actuator, and the controller may comprise a drive observer that provides an estimated actuator parameter feedback value that is smoothed and substantially zero time lagged based on sensor information received from the actuator, wherein the controller automatically controls the first manipulator based in part on the estimated actuator parameter feedback value. The actuator may be a hydraulic actuator, and the drive observer system may provide the estimated hydraulic pressure parameter feedback value of a hydraulic chamber of the hydraulic actuator based in part on a model of the hydraulic actuator. The model may be based on an estimated effective piston area, an estimated hydraulic fluid bulk modulus, and an estimated variable hydraulic chamber volume. The first manipulator may comprise a hydraulic actuator, and the controller may comprise a drive observer that provides an estimated flow disturbance value that is smoothed and based on sensor information received from the actuator, wherein the controller automatically controls the first manipulator based on the estimated flow disturbance value. The first manipulator may comprise an actuator, and the controller may comprise a manipulator observer that provides an estimated actuator position feedback value that is smoothed and substantially zero time lagged based on actuator position sensor information received from the actuator, wherein the controller automatically controls the first manipulator based in part on the estimated actuator position feedback value. The manipulator observer further may provide an estimated actuator velocity feedback value that is smoothed and substantially zero time lagged based on actuator velocity sensor information received from the actuator, wherein the controller automatically controls the first manipulator based in part on the estimated actuator velocity feedback value. The manipulator may comprise a force coupling component to couple force output by the actuator to the work string, and the manipulator observer may provide the estimated actuator position feedback value based in part on a model of the force coupling component. The model may be based on an estimated mass of the force coupling component, an estimated weight of the force coupling component, and an estimated damping factor of the force coupling component. The model further may be based on an estimated friction of the force coupling component moving within a restraint mechanism. The first manipulator may comprise an actuator, and the controller may comprise a manipulator observer that provides an estimated disturbance force feedback value that is smoothed and based on actuator position sensor information received from the actuator, wherein the controller may automatically control the first manipulator based in part on the estimated disturbance force feedback value.

Further disclosed herein is a method of servicing a well bore with a work string, comprising receiving a control mode input identifying a work string control mode of operation; receiving a work string trajectory input; and automatically controlling a plurality of manipulators to drive the work string to substantially match the work string trajectory input according to the work string control mode of operation. The work string control mode of operation may be a high speed sequential mode in which two manipulators are automatically controlled, and the method of servicing the well bore with the work string may further comprise gripping the work string with a first manipulator; releasing the work string with a second manipulator; moving the work string with the first manipulator; repositioning the second manipulator; first stopping the work string; then gripping the work string with the second manipulator; releasing the work string with the first manipulator; moving the work string with the second manipulator; and repositioning the first manipulator. The work string control mode of operation may be a high speed sequential mode with stationary slip usage, and the method of servicing the well bore with the work string may further comprise gripping the work string with a stationary slip bowl before gripping the work string with the first manipulator; releasing the work string with the stationary slip bowl before moving the work string with the first manipulator; gripping the work string with the stationary slip bowl before gripping the work string with the second manipulator; and releasing the work string with the stationary slip bowl before moving the work string with the second manipulator. The work string control mode of operation may be a high speed continuous mode in which two manipulators are automatically controlled, and the method of servicing the well bore with the work string may further comprise gripping the work string with a first manipulator, without stopping the work string; releasing the work string with a second manipulator; moving the work string with the first manipulator; repositioning the second manipulator; gripping the work string with the second manipulator, without stopping the work string; releasing the work string with the first manipulator; moving the work string with the second manipulator; and repositioning the first manipulator, wherein the work string may be moved by the manipulators to achieve at least one of a substantially constant velocity and a substantially constant acceleration identified by the work string trajectory input. The work string control mode of operation may be a high speed constrained mode in which two manipulators are automatically controlled, and the method of servicing the well bore with the work string may further comprise gripping the work string with a first manipulator, without stopping the work string; releasing the work string with a second manipulator; moving the work string with the first manipulator; repositioning the second manipulator; gripping the work string with the second manipulator, without stopping the work string; releasing the work string with the first manipulator; moving the work string with the second manipulator; and repositioning the first manipulator, wherein the work string may be moved by the manipulators to remain within one or more operational constraints including a maximum mechanical load, a maximum electrical load, and a safety operational limit. The work string control mode of operation may be a high capacity sequential mode in which two manipulators and a stationary slip bowl are automatically controlled, and the method of servicing the well bore with the work string may further comprise gripping the work string with a first manipulator and a second manipulator; releasing the work string with a stationary slip bowl; moving the work string with the first and second manipulator; stopping the work string with the first and second manipulator; gripping the work string with the stationary slip bowl; releasing the work string with the first manipulator and the second manipulator; and repositioning the first manipulator and the second manipulator. The work string control mode of operation may be a high capacity continuous mode in which at least three manipulators are automatically controlled, and the method of servicing the well bore with the work string may further comprise gripping the work string with a first manipulator and a second manipulator; releasing the work string with a third manipulator; moving the work string with the first and second manipulator; repositioning the third manipulator; gripping the work string with the third manipulator; releasing the work string with the first manipulator; moving the work string with the second and third manipulator; repositioning the first manipulator; gripping the work string with the first manipulator; releasing the work string with the second manipulator; moving the work string with the first and third manipulator; and repositioning the second manipulator, wherein the work string is moved by the manipulators to achieve at least one of a substantially constant velocity and a substantially constant acceleration identified by the work string trajectory input. In an embodiment, the plurality of manipulators may comprise a dual-jacking system, wherein the dual-jacking system comprises a first pair of hydraulic actuators plumbed in parallel and coupled to a first traveling head coupled to a first gripping device and a second pair of hydraulic actuators plumbed in parallel and coupled to a second traveling head coupled to a second gripping device. The work string control mode of operation may be a high speed sequential mode, and the method of servicing the well bore with the work string may further comprise gripping the work string with the first gripping device; releasing the work string with the second gripping device; moving the work string with the first pair of hydraulic actuators; repositioning the second pair of hydraulic actuators; first stopping the work string; gripping the work string with the second gripping device; releasing the work string with the first gripping device; moving the work string with the second pair of hydraulic actuators; and repositioning the first pair of hydraulic actuators. The work string control mode of operation may be a high speed sequential mode with stationary slip usage, and the method of servicing the well bore with the work string may further comprise gripping the work string with a stationary slip bowl before gripping the work string with the first gripping device; releasing the work string with the stationary slip bowl before moving the work string with the first pair of hydraulic actuators; gripping the work string with the stationary slip bowl before gripping the work string with the second gripping device; and releasing the work string with the stationary slip bowl before moving the work string with the second pair of hydraulic actuators. The work string control mode of operation may be a high speed continuous mode, and the method of servicing the well bore with a work string may further comprise gripping the work string with the first gripping device, without stopping the work string; releasing the work string with the second gripping device; moving the work string with the first pair of hydraulic actuators; repositioning the second pair of hydraulic actuators; gripping the work string with the second gripping device, without stopping the work string; releasing the work string with the first gripping device; moving the work string with the second pair of hydraulic actuators; and repositioning the first pair of hydraulic actuators, wherein the work string is moved by the dual-jacking system to achieve at least one of a substantially constant velocity and a substantially constant acceleration identified by the work string trajectory input. The work string control mode of operation may be a high speed constrained mode, and the method of servicing a well bore with a work string may further comprise gripping the work string with the first gripping device, without stopping the work string; releasing the work string with the second gripping device; moving the work string with the first pair of hydraulic actuators; repositioning the second pair of hydraulic actuators; gripping the work string with the second gripping device, without stopping the work string; releasing the work string with the first gripping device; moving the work string with the second pair of hydraulic actuators; and repositioning the first pair of hydraulic actuators, wherein the work string is moved by the dual-jacking system to remain within one or more operational constraints including a maximum mechanical load, a maximum electrical load, and a safety operational limit. The work string control mode of operation may be a high capacity sequential mode in which a stationary slip bowl is automatically controlled, and the method of servicing the well bore with the work string may further comprise gripping the work string with the first gripping device and the second gripping device; releasing the work string with a stationary slip bowl; moving the work string with the first pair of hydraulic actuators and the second pair of hydraulic actuators; stopping the work string with the first pair of hydraulic actuators and the second pair of hydraulic actuators; gripping the work string with the stationary slip bowl; releasing the work string with the first gripping device and the second gripping device; and repositioning the first pair of hydraulic actuators and the second pair of hydraulic actuators.

Further disclosed herein is a control system comprising a first hydraulic actuator having a rod side chamber and a piston side chamber; a hydraulic pump to provide hydraulic fluid at an adjustable pressure and an adjustable flow rate to the first hydraulic actuator; a first hydraulic pressure sensor to produce an indication of a first hydraulic pressure of the hydraulic actuator; and a force modulator to automatically control the flow rate of the hydraulic pump based on a first force command, based on a first velocity command, and based on the indication of the first hydraulic pressure. The control system may further comprise a directional flow control valve coupled to the first hydraulic actuator and to the hydraulic pump and operable to be commanded to direct hydraulic fluid from the hydraulic pump to one of the rod side chamber of the hydraulic actuator, the piston side chamber of the hydraulic actuator, or to a return port of the hydraulic pump, and the force modulator further automatically commands the directional flow control valve based on the first force command, based on the first velocity command, and based on the indication of the hydraulic pressure from the first pressure sensor, whereby the direction of force produced by the hydraulic actuator is controlled. The first hydraulic pressure may be a hydraulic pressure of the rod side chamber, and the control system may further comprise a second pressure sensor to produce an indication of a hydraulic pressure of the piston side chamber; and a pressure observer to produce an estimate of the hydraulic pressure of the rod side chamber based on the indication of the hydraulic pressure of the rod side chamber produced by the first hydraulic pressure sensor and to produce an estimate of the hydraulic pressure of the piston side chamber based on the indication of the hydraulic pressure of the piston side chamber produced by the second pressure sensor, and the force modulator may automatically control the flow rate of the hydraulic pump based at least in part on the estimate of the hydraulic pressure of the rod side chamber and on the estimate of the hydraulic pressure of the piston side chamber. The control system may further comprise a position sensor, coupled to the first hydraulic actuator, to produce an indication of the position of a rod end of the first hydraulic actuator and a velocity sensor, coupled to the first hydraulic actuator, to produce an indication of the velocity of the rod end of the first hydraulic actuator, wherein the manipulator controller may further determine the first force command at least in part based on the indication of the position of the rod end of the first hydraulic actuator and on the indication of the velocity of the rod end of the first hydraulic actuator. The control system may further comprise a position and velocity observer to produce an estimate of the position of the first hydraulic actuator based on the indication of the position of the rod end of the first hydraulic actuator and to produce an estimate of the velocity of the rod end of the first hydraulic actuator based on the indication of the velocity of the rod end of the first hydraulic actuator, wherein the manipulator controller may transmit the first force command to the force modulator based at least in part on the estimate of the position of the rod end of the first hydraulic actuator and on the estimate of the velocity of the rod end of the first hydraulic actuator. The control system may further comprise a flow regulator to produce a hydraulic pump control signal under the control of the force modulator, whereby the force modulator controls the flow rate of the hydraulic pump through the flow regulator.

Further disclosed herein is an automated hydraulic flow regulator, comprising a proportional-integral (PI) controller portion to determine a flow error and to generate a corrective signal based on the flow error; a command feed-forward portion to determine a command feed-forward signal based on a flow rate command and an estimate of a hydraulic pump motor angular velocity; and a pump control gain to amplify the sum of the corrective signal and the command feed-forward signal to produce a commanded hydraulic pump motor signal, whereby the automated hydraulic flow regulator controls a hydraulic flow. The flow error may be determined as the difference of the flow rate command and a sensed flow rate. The command feed-forward signal may be determined by amplifying the flow rate command by a feed-forward gain, wherein the feed-forward gain may be inversely proportional to the estimate of the hydraulic pump motor angular velocity. The hydraulic flow regulator may further include an axial piston pump that produces the hydraulic flow, wherein the commanded hydraulic pump motor signal controls the axial piston pump by controlling the angular displacement of a swash plate of the axial piston pump.

Further disclosed herein is an automated force modulator, comprising a proportional gain controller portion to determine a force error and to generate a corrective signal based on the force error; a command feed-forward portion to determine a command-feed forward signal based on a velocity command and a directional area gain, wherein the directional area gain has a first value when the velocity command has a first polarity and the directional area gain has a second value when the velocity command has a second polarity; and a summation junction to output a commanded flow signal based on the corrective signal and the command feed-forward signal. The force error may be determined as the difference of a force command and an estimated force. The estimated force may be determined based on an indication of a rod side pressure of a hydraulic actuator and a piston side pressure of the hydraulic actuator. The first value of directional area gain may be proportional to the area of a piston of a hydraulic actuator, and the second value of directional area gain may be proportional to the area of the piston of the hydraulic actuator minus the cross-section area of a rod of the hydraulic actuator. The summation junction may output the commanded flow signal based further on a flow disturbance term. The automated force modulator may further comprise a directional valve modulator to output a directional valve command based on the polarity of a sum of the corrective signal and the command feed-forward signal.

Further disclosed herein is an automated manipulator controller, comprising a proportional-integral-derivative (PID) controller portion to determine a manipulator position error and a manipulator velocity error and to generate a corrective signal based on the manipulator position error and the manipulator velocity error; a command feed-forward portion to determine a command feed-forward signal based on a manipulator acceleration command and a manipulator mass gain; a manipulator damping gain to determine a manipulator damping force based on a manipulator damping gain and an indication of manipulator velocity; and a summation junction to output a first manipulator force command based on the corrective signal, the command feed-forward signal, the manipulator damping force, and a feed forward work string load command. The manipulator position error may be determined as the difference of a manipulator position command and an indication of manipulator position, and the manipulator velocity error may be determined as the difference of a manipulator velocity command and the indication of manipulator velocity. The summation junction may further output the first manipulator force command based on a manipulator weight. The summation junction may further output the first manipulator force command based on a difference between the manipulator force command and an estimate of a manipulator force disturbance.

Further disclosed herein is a pressure estimator comprising a directional valve command feed forward component to produce a rod side flow command and a piston side flow command based on a directional flow valve command and a feed forward flow rate command; a piston side pressure observer to produce an estimated piston side pressure based on the piston side flow command, a sensed piston side pressure, an actuator velocity, and an actuator position; and a rod side pressure observer to produce an estimated rod side pressure based on the rod side flow command, a sensed rod side pressure, the actuator velocity, and the actuator position. The pressure estimator may further comprise a directional valve disturbance flow component to estimate a disturbance flow based on the directional flow valve command, the estimated piston side pressure, and the estimated rod side pressure. When the directional flow valve command has a piston side value, the piston side flow command may be proportional to the feed forward flow rate command and the rod side flow command may be proportional to the negative value of the feed forward flow rate command. When the directional flow valve command has a rod side value, the piston side flow command may be proportional to the negative value of the feed forward flow rate command and the rod side flow command may be proportional to the value of the feed forward flow rate command. When the directional flow valve command has a piston side value, the rod side flow command further may be proportional to an effective rod side area of the piston divided by the effective piston side area of the piston. When the directional flow valve command has a rod side value, the piston side flow command further may be proportional to the effective piston side area of the piston divided by the effective rod side area of the piston.

Further disclosed herein is a pressure observer comprising a first proportional-integral (PI) controller portion to determine a first pressure error and to generate a first corrective signal based on the first pressure error; a first feed-forward portion to determine a first flow rate based on a velocity and a first gain; a first integrator to integrate the sum of the first corrective signal and the first flow rate; and a second gain to amplify an output of the first integrator by a first model gain and to produce a first pressure estimate. The first proportional-integral controller portion may further determine a first flow disturbance signal based on the first pressure error. The first pressure error may be determined as the difference of a first sensed pressure and the first pressure estimate. The first gain may be proportional to the difference of an area of a piston of a hydraulic actuator and a cross-section area of a rod of the hydraulic actuator. The first model gain may be proportional to a bulk modulus of a hydraulic fluid and may be inversely proportional to a volume comprising a rod side chamber of a hydraulic actuator, wherein the volume of the rod side chamber may change as a rod of the hydraulic actuator moves. The pressure observer may further comprise a second proportional-integral (PI) controller portion to determine a second pressure error and to generate a second corrective signal based on the second pressure error; a second feed-forward portion to determine a second flow rate based on the velocity and a second gain; a second integrator to integrate the sum of the second corrective signal and the second flow rate; and a second gain to amplify an output of the second integrator by a second model gain and to produce a second pressure estimate.

Further disclosed herein is a manipulator position and velocity observer comprising a proportional-integral-derivative (PID) controller portion to determine a manipulator position error and a manipulator velocity error and to generate a corrective signal based on the manipulator position error and on the manipulator velocity error; a first gain to amplify an indication of manipulator velocity by a manipulator damper gain to generate a damper force signal; a force summation portion that is operable to determine a summed force term based on the corrective signal, based on the damper force signal, based on a force command, and based on a manipulator weight term; a second gain to amplify the summed force term by an inverse manipulator gain and to generate a manipulator acceleration term; a first integrator to integrate the manipulator acceleration term to generate a manipulator velocity term and to output an estimate of manipulator velocity; and a second integrator to integrate the manipulator velocity term to generate a manipulator position term and to output an estimate of manipulator position. The proportional-integral-derivative controller portion may be further operable to produce a manipulator force disturbance term based on the manipulator position error and on the manipulator velocity error. The manipulator position error may be determined as the difference of a sensed manipulator position and the estimate of manipulator position, and the manipulator velocity error may be determined as the difference of a sensed manipulator velocity and the estimate of manipulator velocity.

Further disclosed herein is a work string controller comprising a first proportional-integral-derivative (PID) controller portion to determine a first position error and a first velocity error and to generate a first simulated force feedback based on the first position error and the first velocity error; a second proportional-integral-derivative (PID) controller portion to determine a second position error and a second velocity error and to generate a second simulated force feedback based on the second position error and the second velocity error; a third proportional-integral-derivative (PID) controller portion to determine a work string position error and a work string velocity error and to generate a force term based on the work string position error, based on the work string velocity error, based on the first simulated force feedback, and based on the second simulated force feedback; a gain to amplify the force term by a work string mass gain to produce an acceleration term; a first integrator to integrate the acceleration term to produce an estimated work string velocity; a second integrator to integrate the estimated work string velocity term to produce an estimated work string position; and a commands generator to produce a first slip bowl command, a first acceleration command, a first velocity command, a first position command, a second slip bowl command, a second acceleration command, a second velocity command, and a second position command based on the estimated work string velocity and the estimated work string position. The commands generator may be further operable to produce the first and second slip bowl commands based on a collar indication. The work string mass gain may be inversely proportional to a mass of a work string. The work string controller may further comprise a first slip bowl portion to determine a first slip bowl error based on a first estimated slip bowl position, a first commanded slip bowl position, and a first slip bowl model; a first proportional-integral (PI) controller portion to generate a third simulated force feedback based on the first slip bowl error; a second slip bowl portion to determine a second slip bowl error based on a second estimated slip bowl position, a second commanded slip bowl position, and a second slip bowl model; and a second proportional-integral (PI) controller portion to generate a fourth simulated force feedback based on the second slip bowl error, wherein the third proportional-integral-derivative controller portion generates the force term further based on the third simulated force feedback and the fourth simulated force feedback.

Further disclosed herein is a collar locator, comprising a first digital camera to capture a first image; and a collar detector coupled to the first digital camera and operable to generate a first thresholded image of the first image, to generate a first edge detection analysis of the first thresholded image, and to determine the location of a collar based in part on the first edge detection analysis. The collar locator may further include a first light source, whereby the light source may illuminate a work string that is at least a portion of the first image. The collar locator may further comprise a second digital camera to capture a second image, wherein the collar detector is coupled to the second digital camera, and the collar locator may further generate a second thresholded image of the second image, generate a second edge detection analysis of the second thresholded image, and determine the location of the collar based in part on the second edge detection analysis. In an embodiment, the first and second digital cameras may each capture a plurality of images at a periodic rate, and the collar detector may determine a position and a velocity of the collar based on the plurality of images. In an embodiment, the first and second digital cameras may each capture about 30 images per second.

Further disclosed herein is a method of servicing a well bore with a work string comprising placing the work string in a well bore; receiving a work string trajectory input; determining a simulated force feedback of the work string on a first manipulator; determining an estimated work string velocity based at least on the simulated force feedback of the work string on the first manipulator; determining an estimated work string position based at least on the simulated force feedback of the work string on the first manipulator; determining a first manipulator position command and a first manipulator velocity command based on the estimated work string position and the estimated work string velocity; and automatically controlling the first manipulator based at least on the first manipulator position command and the first manipulator velocity command. Determining the estimated work string velocity may comprise determining a corrective signal based on a work string position command and a work string velocity command, combining the simulated force feedback of the work string on the at least one manipulator and the corrective signal to determine a force term, converting the force term to an acceleration term, and integrating the acceleration term to determine the simulated work string velocity. Determining the estimated work string position may comprise integrating the estimated work string velocity to determine the simulated work string position. The simulated force feedback of the work string on the at least one manipulator may be determined as the sum of a plurality of a simulated force feedback of the work string on a manipulator, and determining the simulated force feedback of the work string on the manipulator may comprise determining a manipulator position error term, determining a manipulator velocity error term, amplifying the manipulator position error term to produce a first proportional term, integrating and amplifying the manipulator position error term to produce a first integral term, amplifying the velocity error term to produce a first derivative term, and summing the first proportional term, the first integral term, and the first derivative term. In an embodiment, determining the simulated force feedback of the work string on the manipulator may further comprise determining a slip bowl position error, amplifying the slip bowl position error by a second proportional gain to produce a second proportional term, integrating and amplifying the slip bowl position error to produce a second integral term, and summing the second proportional term, the second integral term, the first proportional term, the first integral term, and the first derivative term. In an embodiment, the first integral gain may be used to produce the first integral term, and a second integral gain may be used to produce the second integral term, wherein the second integral gain may be at least about ten times larger than the first integral gain. Controlling the first manipulator may be further based on a collar indication input. Controlling the work string may further include determining a second manipulator position command and a second manipulator velocity command based on the simulated force feedback of the work string on the at least one manipulator, the estimated work string position, the estimated work string velocity, and the work string trajectory input; and automatically controlling a second manipulator based on the second manipulator position command and the second manipulator velocity command. The method may further comprise determining a simulated force feedback of the work string on an a second manipulator; determining the estimated work string velocity further based on the simulated force feedback of the work string on the second manipulator; determining the estimated work string position further based on the simulated force feedback of the work string on the second manipulator; determining a first feed forward work string load command, a second manipulator position command, a second manipulator velocity command, and a second feed forward work string load command based on the estimated work string position and the estimated work string velocity; further automatically controlling the first manipulator based on the first feed forward work string load command; and automatically controlling the second manpulator based at least on the second manipulator position command, the second manipulator velocity command, and the second feed forward work string load command.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Figure 1:
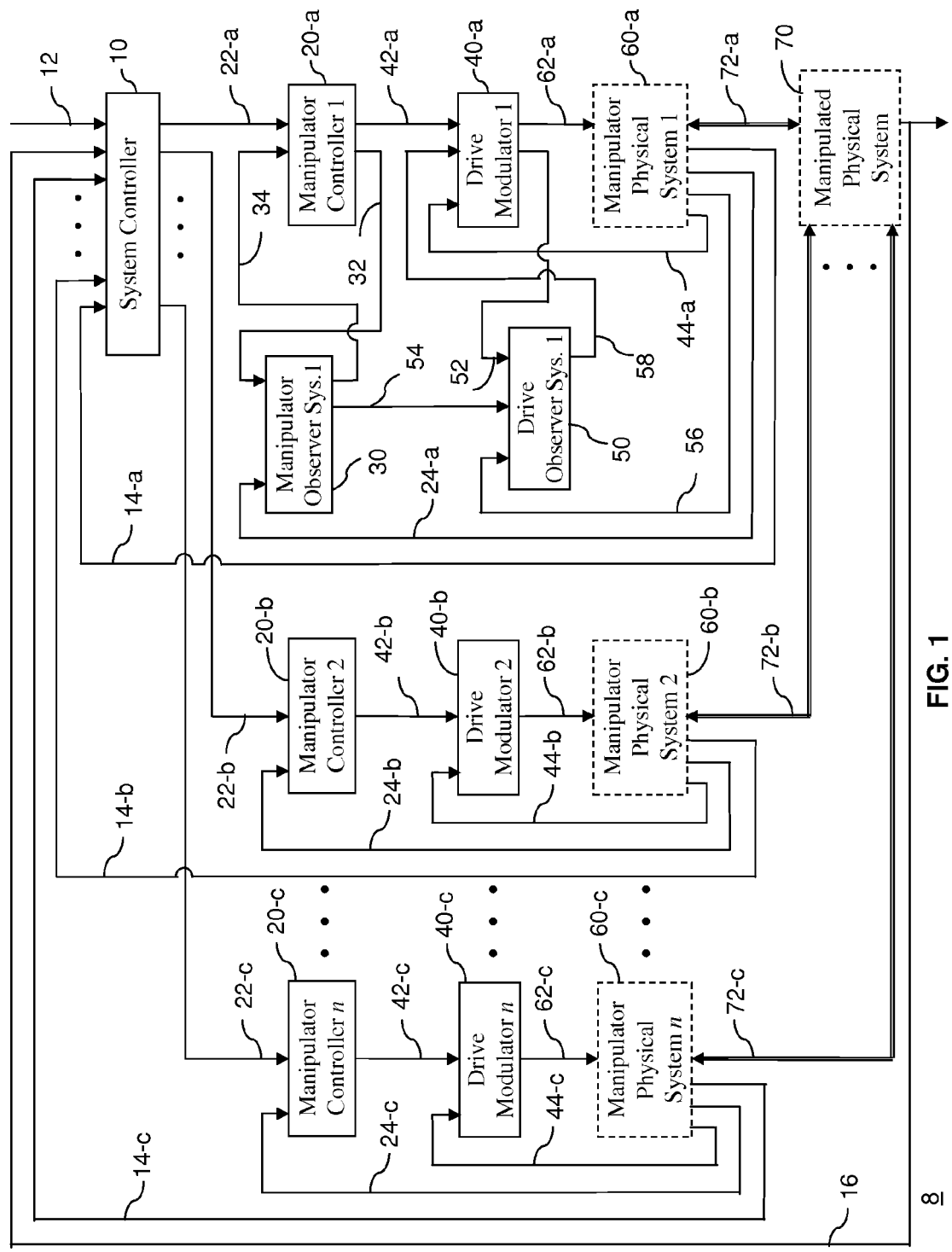
FIG. 1 is a block diagram of a control system according to some embodiments of the disclosure.
Figure 7:
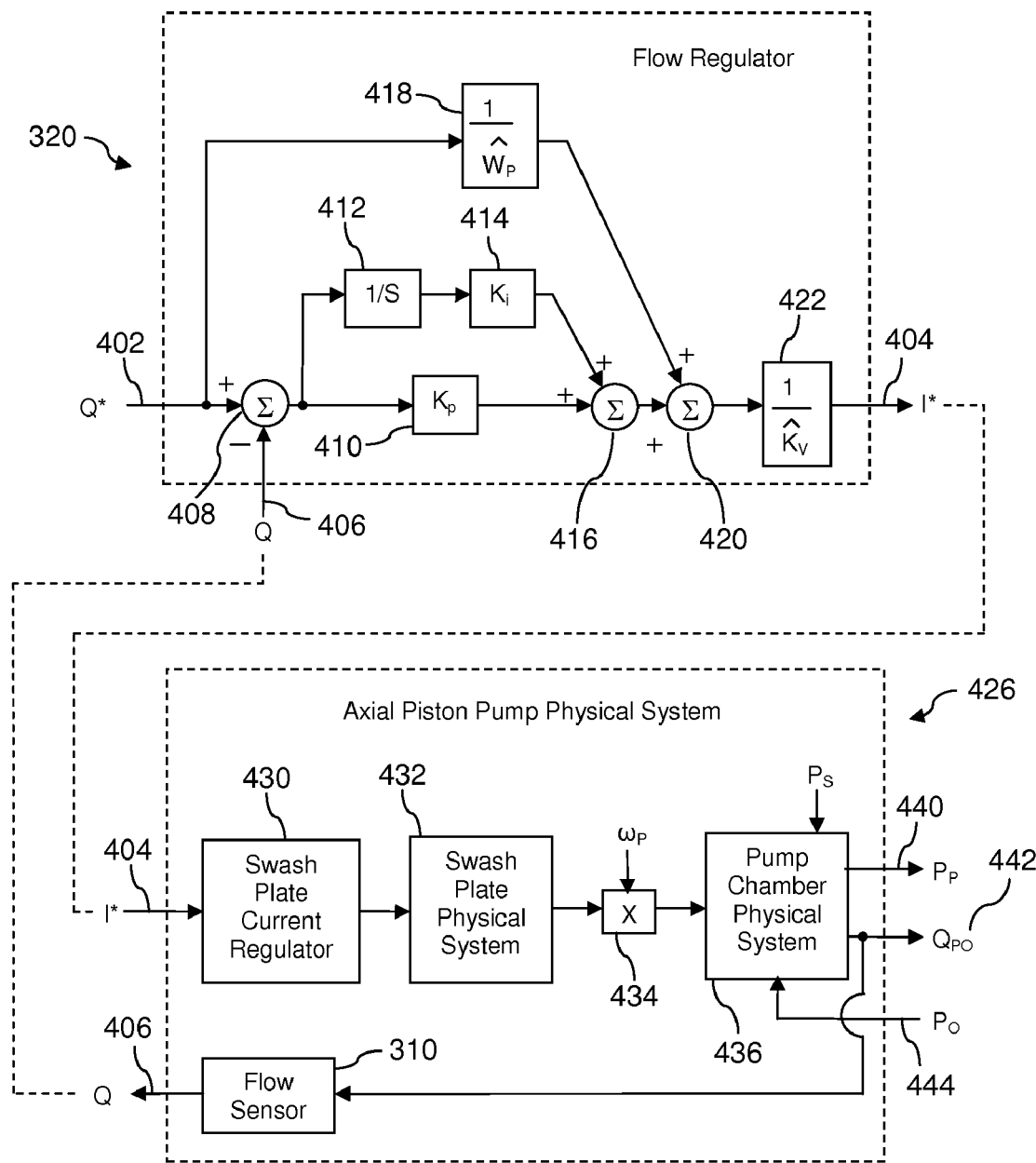
FIG. 7 is control diagram of a flow regulator according to some embodiments of the disclosure.
Figure 8:
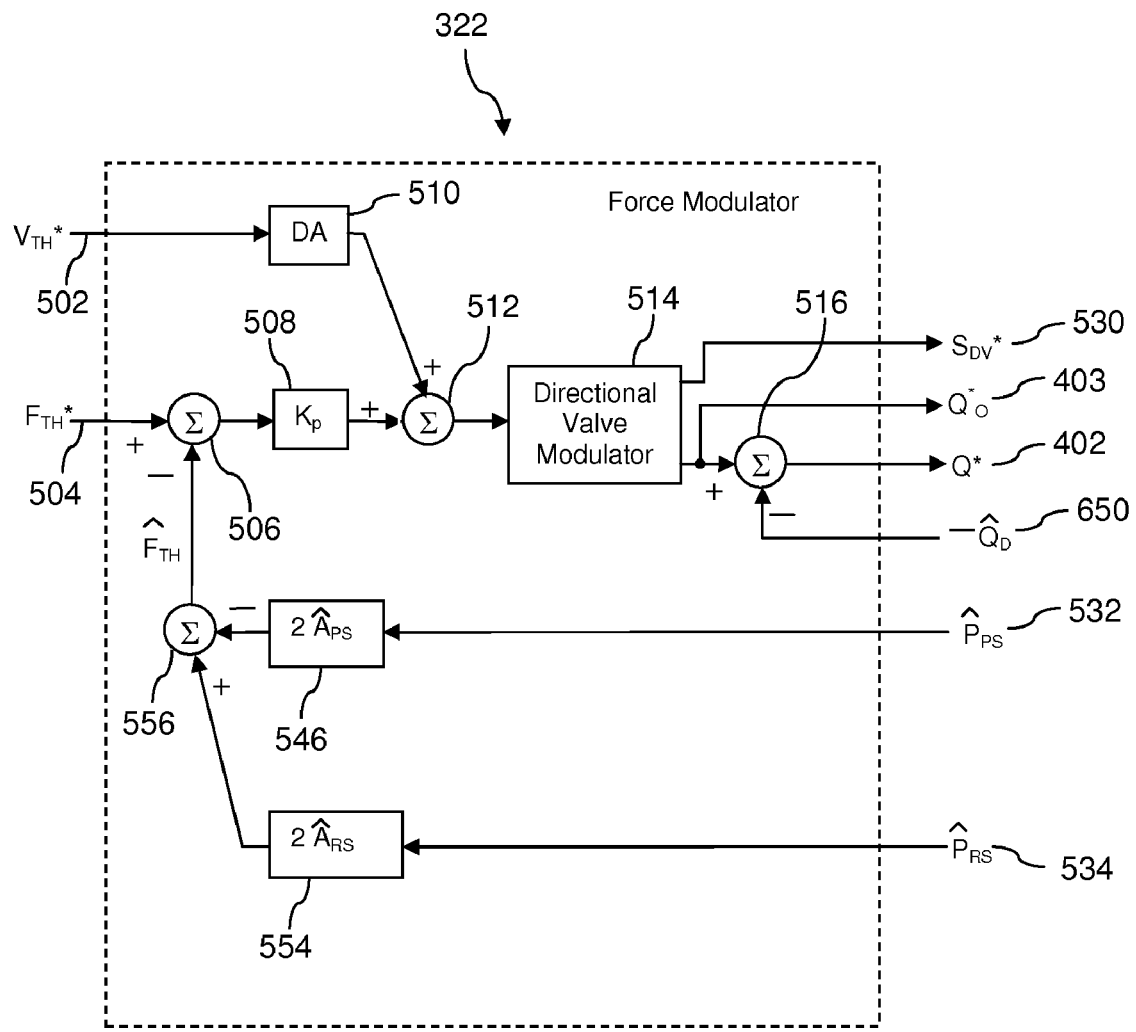
FIG. 8 is a control diagram of a force modulator according to some embodiments of the disclosure.
Figure 9:
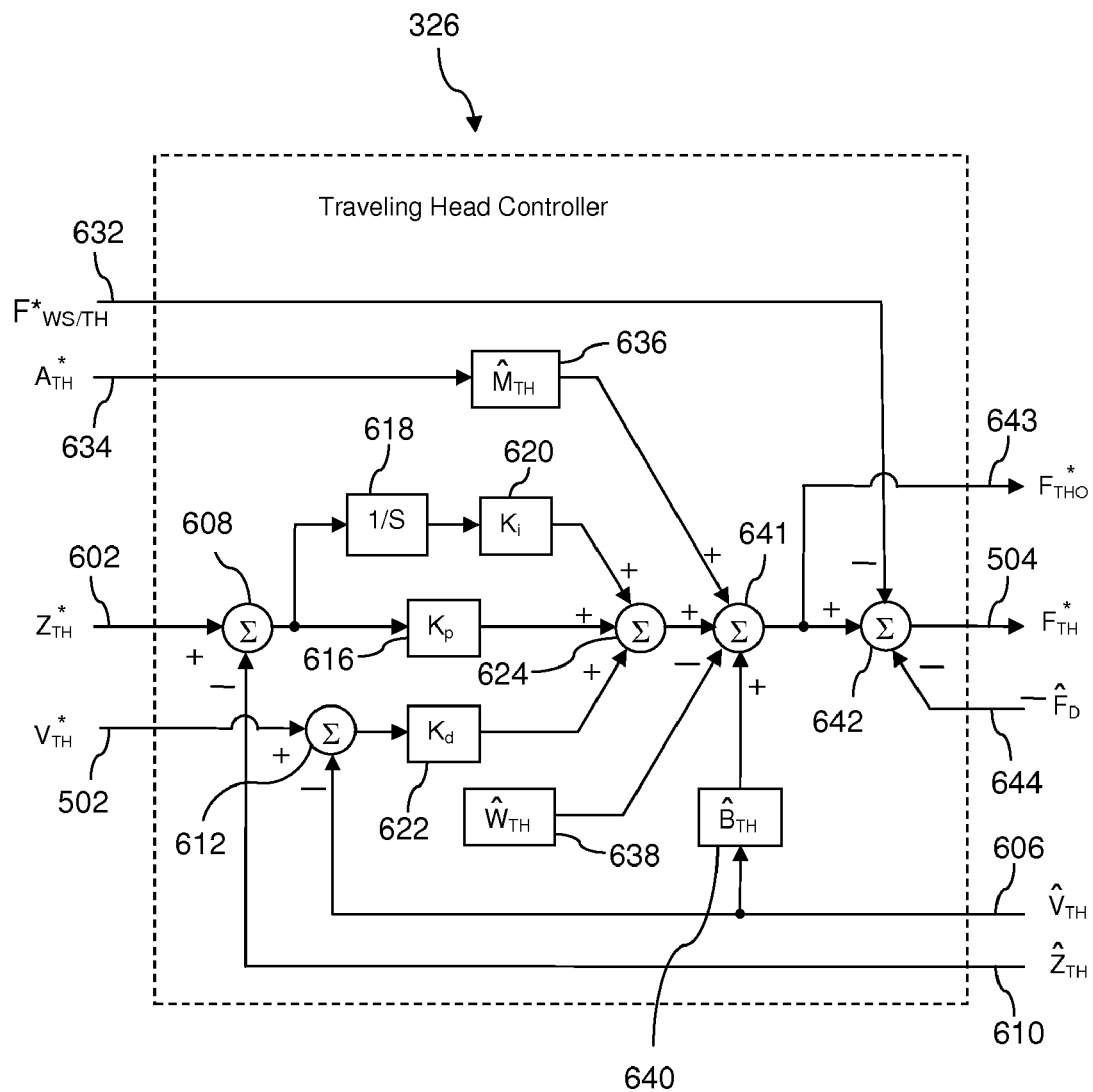
FIG. 9 is a control diagram of a traveling head controller according to some embodiments of the disclosure.
Figure 10:
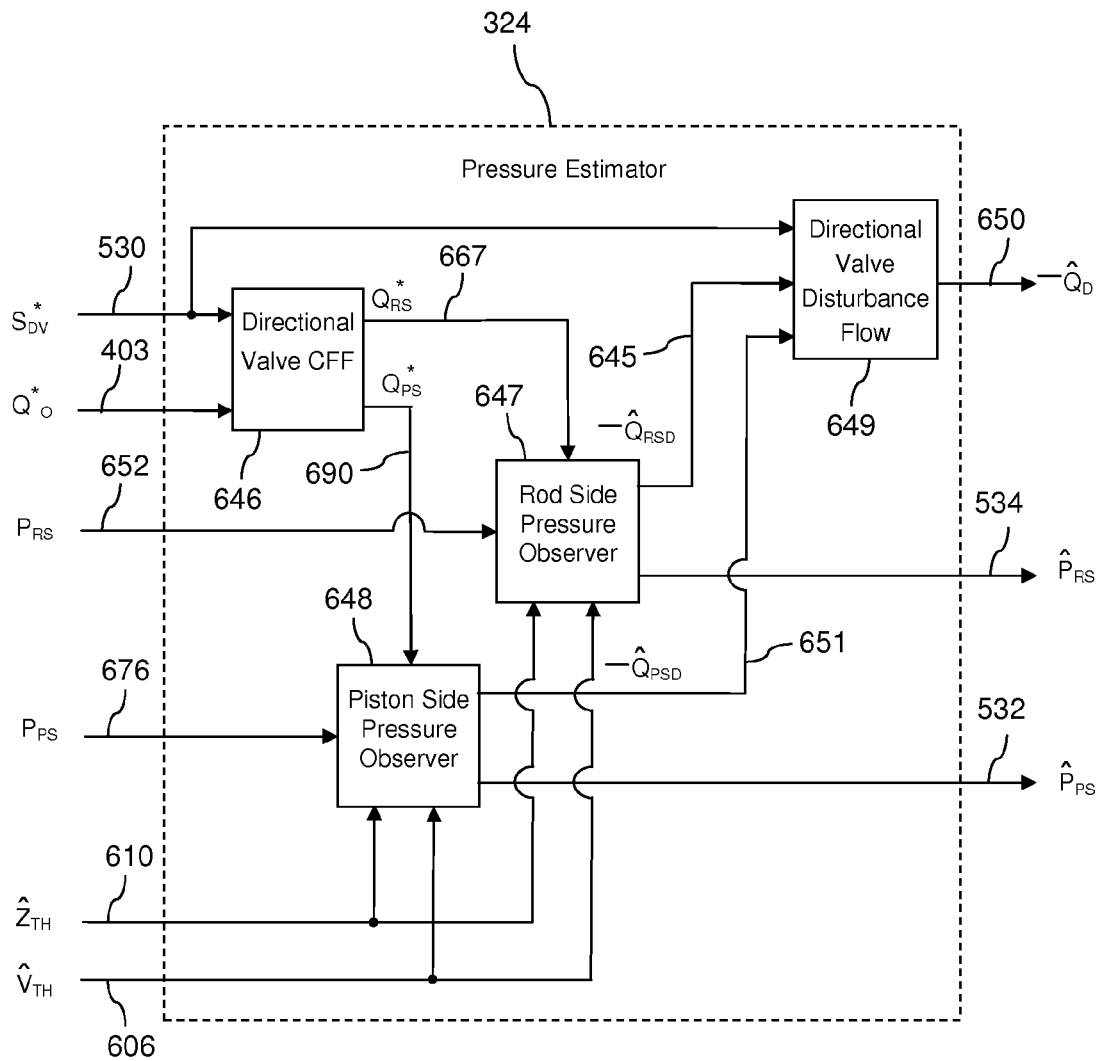
FIG. 10 is a block diagram of a drive observer according to some embodiments of the disclosure.
Figure 11:
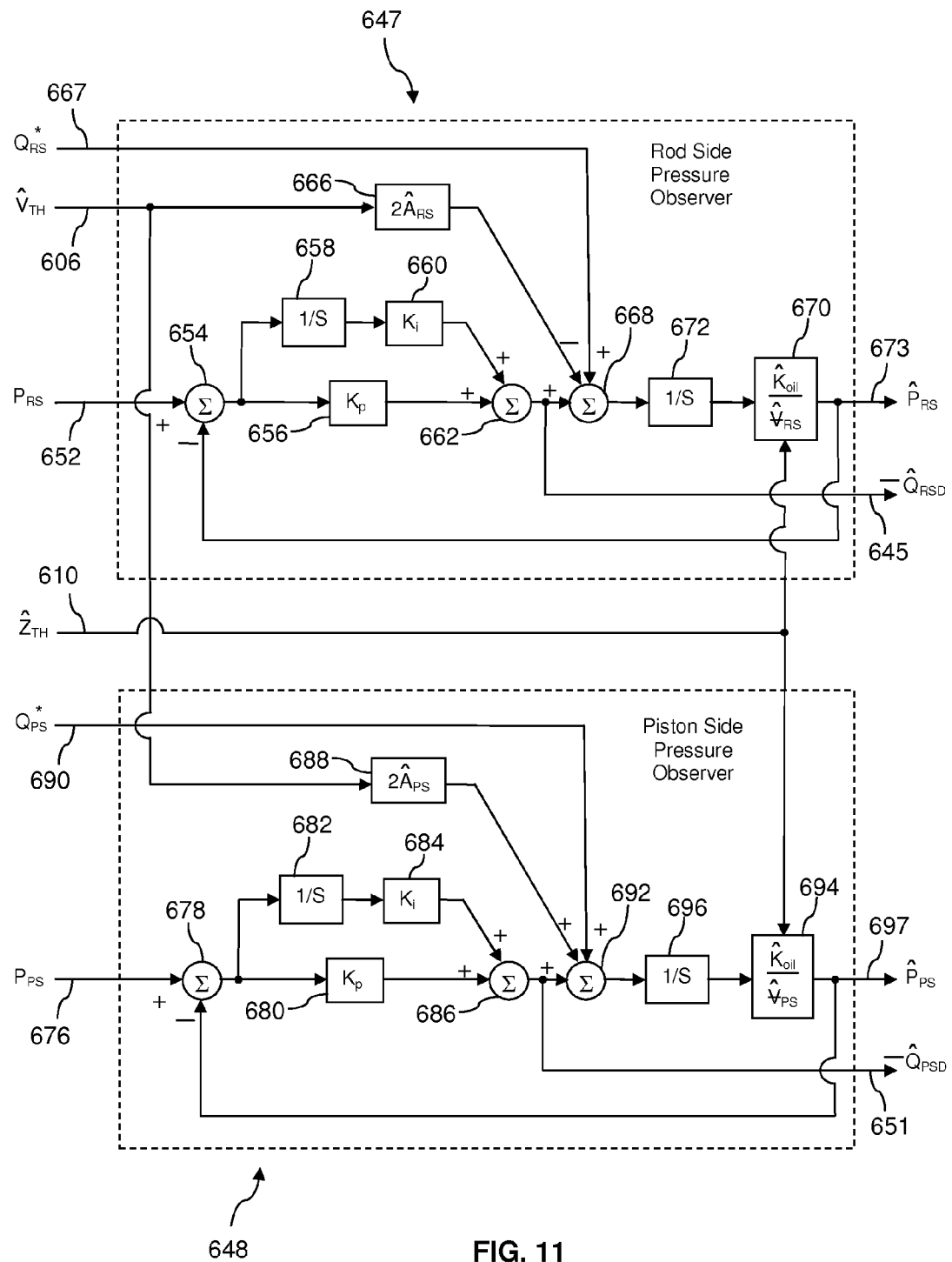
FIG. 11 is a control diagram of a rod side pressure observer and a piston side pressure observer according to some embodiments of the disclosure.
Figure 12:
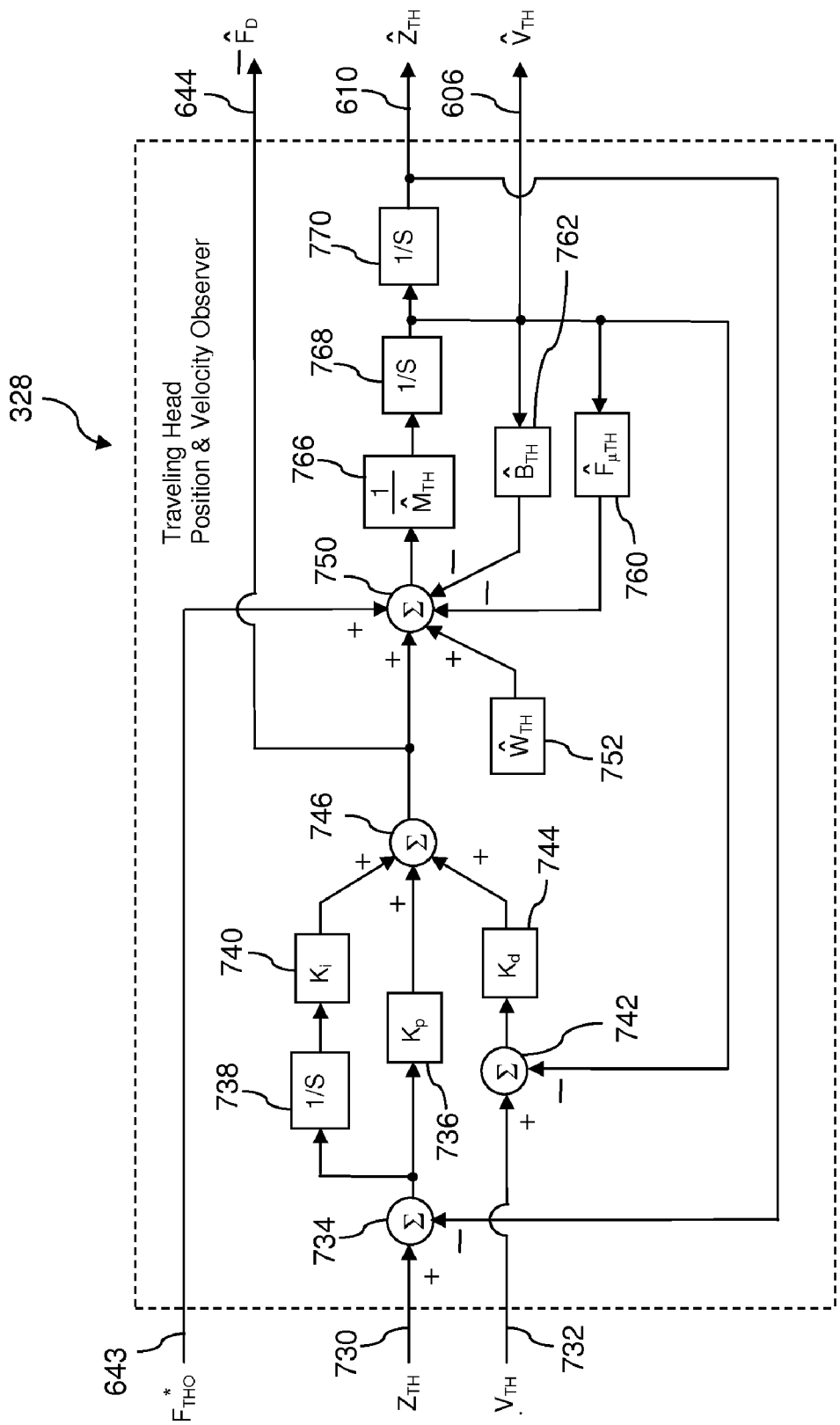
FIG. 12 is a control diagram of a traveling head position and velocity observer according to some embodiments of the disclosure.
Figure 13:
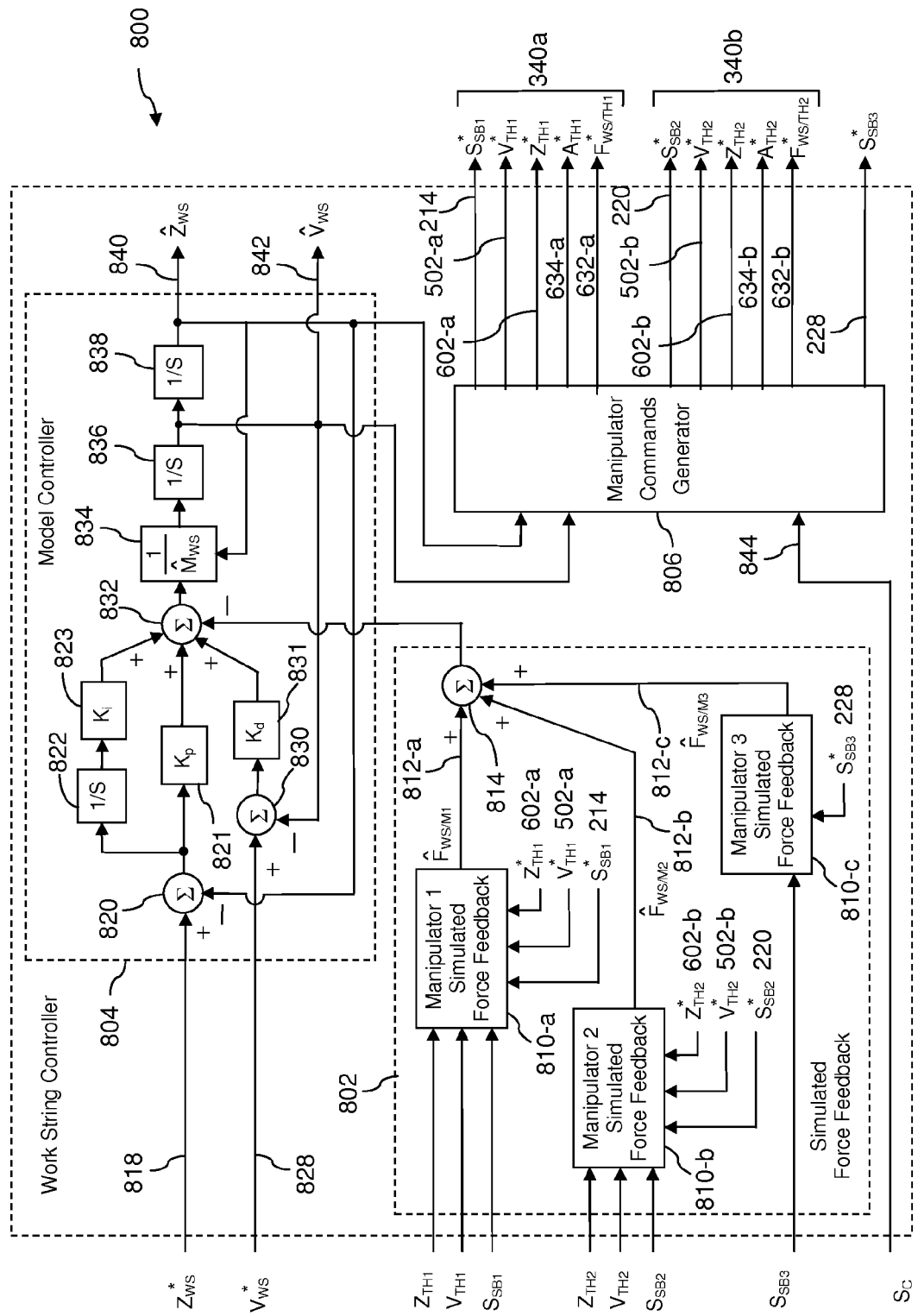
FIG. 13 is a block diagram of a work string controller according to some embodiments of the disclosure.
Figure 16:
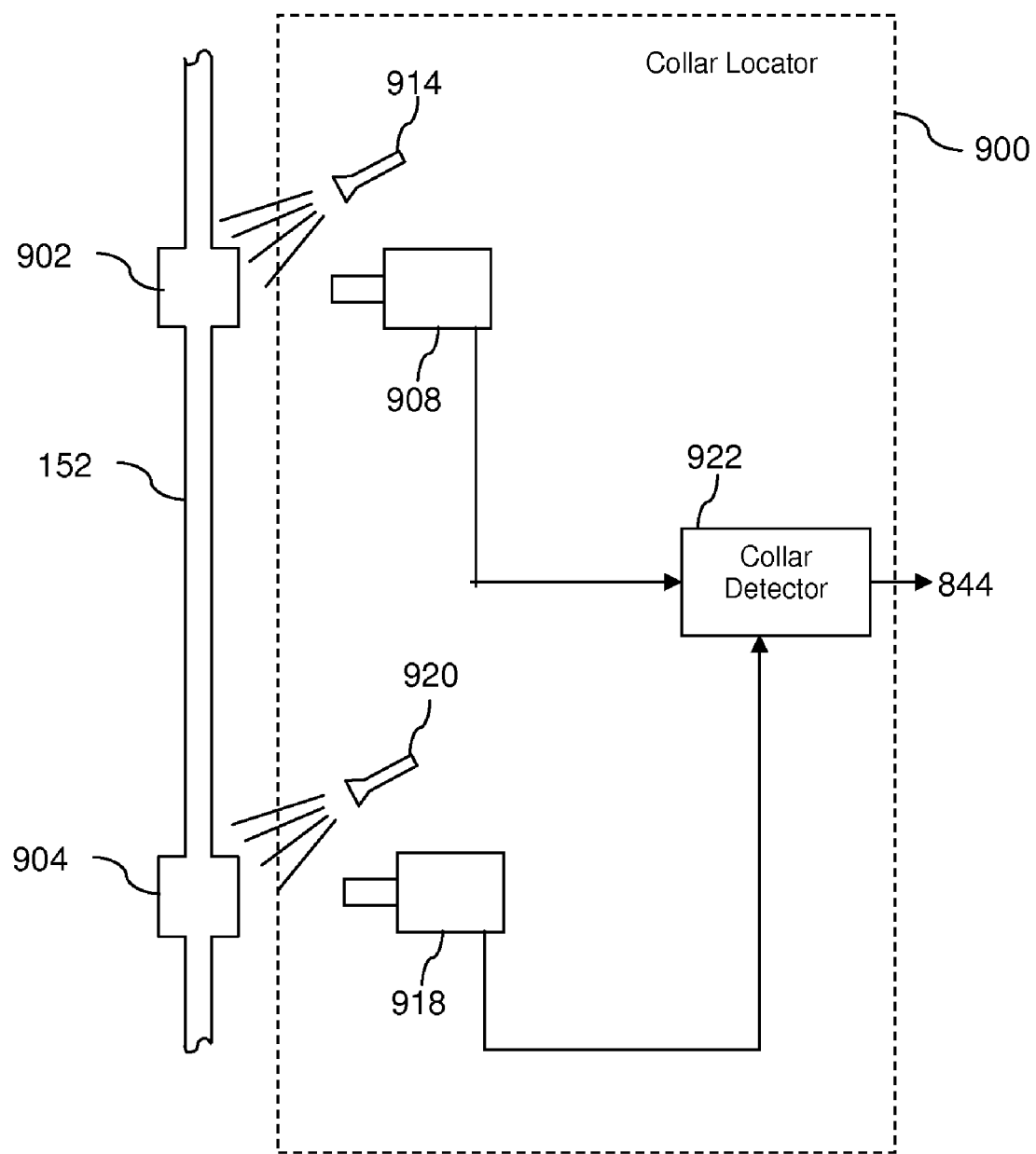
FIG. 16 is an illustration of a pipe collar locator according to an embodiment of the disclosure.

In the figures and in the text herein below, variable names and variable symbols that are associated with an asterisk, for example F*, generally represent commanded values. Variable names and variable symbols that are associated with a caret, for example F^, generally represent estimated values. Variable names and variable symbols that are not associated with any additional symbol, for example F, generally represent measured and/or actual values. Turning now to FIG. 1, a control system architecture 8 suitable for some of the embodiments of the present disclosure is discussed. The control system architecture 8 includes a system controller 10, a plurality of manipulator controllers 20, a manipulator observer system 30, a plurality of drive modulators 40, a drive observer system 50, a plurality of manipulator physical systems 60, and a manipulated physical system 70. An embodiment of the system controller 10 is shown in FIG. 13 and described in more detail hereinafter. An embodiment of the manipulator controller 20 is shown in FIG. 9 and described in more detail hereinafter. An embodiment of the manipulator observer system 30 is shown in FIG. 12 and described in more detail hereinafter. An embodiment of the drive modulator 40 is shown in FIG. 7 and FIG. 8 and described in more detail hereinafter. An embodiment of the drive observer system 50 is shown in FIG. 10 and FIG. 11 and described in more detail hereinafter. An embodiment of the manipulator physical system 60 is shown in FIG. 2A, FIG. 2B, FIG. 3, FIG. 6, and FIG. 7 and described in more detail hereinafter. An embodiment of the manipulated physical system 70 is shown in FIG. 3 and FIG. 16 and discussed in more detail hereinafter.

While FIG. 1 depicts three separate manipulator systems 60, in different embodiments, different numbers of manipulators 60, drive modulators 40, and manipulator controllers 20 may be implemented. Also, while FIG. 1 depicts a second manipulator physical system 60-b, a second drive modulator 40-b, and a second manipulator controller 20-b as well as a third manipulator physical system 60-c, a third drive modulator 40-c, and a third manipulator controller 20-c without an associated manipulator observer system 30 and without an associated drive observer system 50, in other embodiments a manipulator observer system 30 and/or a drive observer system 50 may be associated with these system control components. The system controller 10 receives a system controller command signal 12, a physical system feedback 16 from the manipulated physical system 70, and a manipulator feedback 14 from each of the manipulator physical systems 60 as input, for example a first manipulator feedback 14-a from the first manipulator physical system 60-a, a second manipulator feedback 14-b from the second manipulator physical system

60-$b$, and a third manipulator feedback 14-$c$ from the third manipulator physical system 60-$c$. In an embodiment, the system controller command signal 12 may comprise a work string trajectory input. The system controller 10 outputs a manipulator controller command signal 22 to each of the manipulator controllers 20. In an embodiment, the manipulator controller command signal 22 may comprise a manipulator command trajectory that is based on a work string trajectory input to the system controller 10. In an embodiment, a first manipulator controller command signal 22-$a$ may comprise a first manipulator command trajectory and a second manipulator controller command signal 22-$b$ may comprise a second manipulator command trajectory, wherein both the first manipulator command trajectory and the second manipulator command trajectory are based on the work string trajectory input. The general purpose of the control system architecture 8 is to drive the physical system 70 according to the system controller command signal 12. In an embodiment, the system controller command signal 12 may be a trajectory describing the position, velocity, and acceleration of the manipulated physical system 70 at different times. The system controller command signal 12 may further include various mode and commands. In an embodiment, the control system architecture 8 comprises well bore servicing equipment, for example a control system automatically controlling a plurality of manipulators to raise and lower a well bore work string in and out of a well bore to accomplish a well bore servicing job.

Each of the manipulator controllers 20 receives a manipulator controller command signal 22 from the system controller 10 and one of a manipulator observer feedback signal 34 from the manipulator observer system 30 or a manipulator feedback 24 as inputs. Each of the manipulator controllers 20 outputs a drive modulator command signal 42 to the drive modulator 40. The first manipulator controller 20-$a$ also outputs a first manipulator controller output signal 32 to the manipulator observer system 30. With respect to describing FIG. 1, the term "signal" may mean either a single signal or a vector of signals. For example, in an embodiment, the command signal 22 may comprise a commanded traveling head position signal, a commanded traveling head velocity signal, a commanded traveling head acceleration signal, a commanded traveling head force signal, and a commanded slip bowl position signal.

Each of the drive modulators 40 receives the drive modulator command signal 42 from the manipulator controller 20 and a manipulator feedback signal 44 from the manipulator physical system 60. The first drive modulator 40-$a$ also receives a first drive observer system output signal 58 from the first drive observer system 50. Each of the drive modulators 40 outputs a manipulator physical system command signal 62 to the manipulator physical system 60. The first drive modulator 40-$a$ also outputs a first drive modulator output signal 52 to the first drive observer system 50.

The manipulator observer system 30 receives the first manipulator controller output signal 32 and a first manipulator feedback 24-$a$. The manipulator observer system 30 outputs the first manipulator observer feedback signal 34 to the first manipulator controller 20-$a$ and a first manipulator observer system output signal 54 to the first drive observer system 50.

The first drive observer system 50 receives the first observer output signal 54 from the manipulator observer system 30, the first drive modulator output signal 52 from the first drive modulator 40-$a$, and a first manipulator feedback signal 56 from the first manipulator physical system 60-$a$. The first drive observer system 50 outputs the first drive observer system output signal 58 to the first drive modulator 40-$a$.

Each of the manipulator physical systems 60 receives the manipulator physical system command signal 62 from the drive modulator 40. Each of the manipulator physical systems 60 outputs a plurality of feedback signals 14, 24, and 44 to the system controller 10, the manipulator observer system 30 or the manipulator controller 20, and the drive modulator 40, respectively. Additionally, the first manipulator physical system 60-$a$ outputs a first manipulator feedback signal to the first drive observer system 50. Each of the manipulator physical systems 60 also interacts with the manipulated physical system 70, represented in FIG. 1 by the manipulated physical system interaction with manipulator 72. For example, in an embodiment, the manipulated physical system 70 may be a work string for servicing and/or drilling a well bore and the manipulators 60 may be a plurality of hydraulic jacks coupled to slip bowls configured to grip the work string. The work string may comprise a plurality of connected segments (e.g., drill string, tubing string, casing string, etc.) or a continuous length of oilfield tubular such as coiled tubing. The work string may have one or more associated or connected tools, for example one or more down hole tools positioned at or near a terminal end of the work string. In some embodiments, the several manipulator physical systems 60 that manipulate the manipulated system 70 may be of different types. The manipulator physical system 60 may include hydraulic actuators, electric motor actuated screw jacks, robot lever arms, slip bowls, and other devices. In another embodiment, the manipulated physical system 70 may be some other object manipulated by one or more manipulator physical systems 60 that are robotic arms. It should be understood that the control system architecture 8 depicted in FIG. 1 is suitable to a number of alterations, modifications, and arrangements of components, all of which are contemplated by the present disclosure.

Figure 2A:
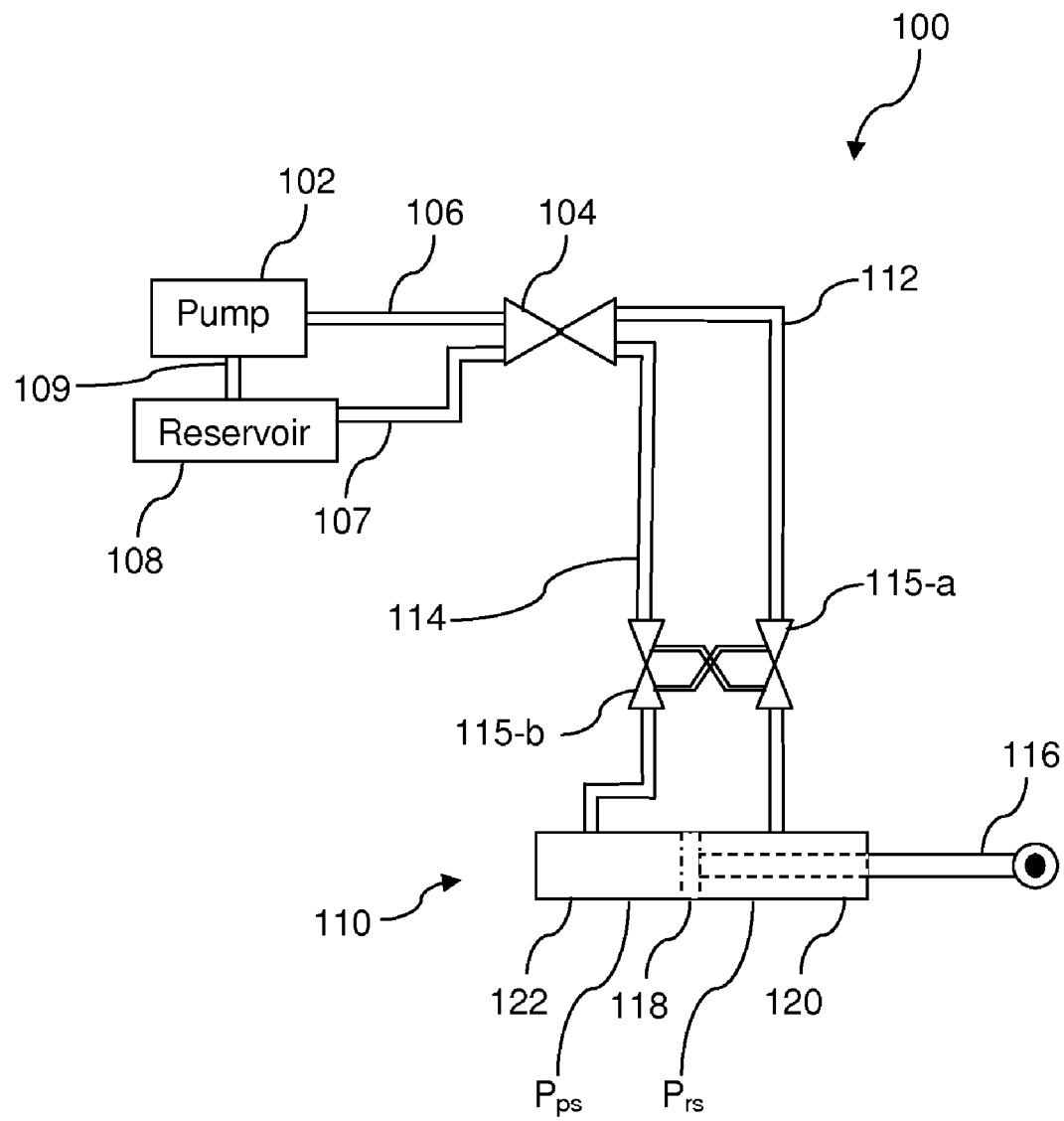
FIG. 2A is an illustration of a single actuator hydraulic power system according to some embodiments of the disclosure.
Figure 3:
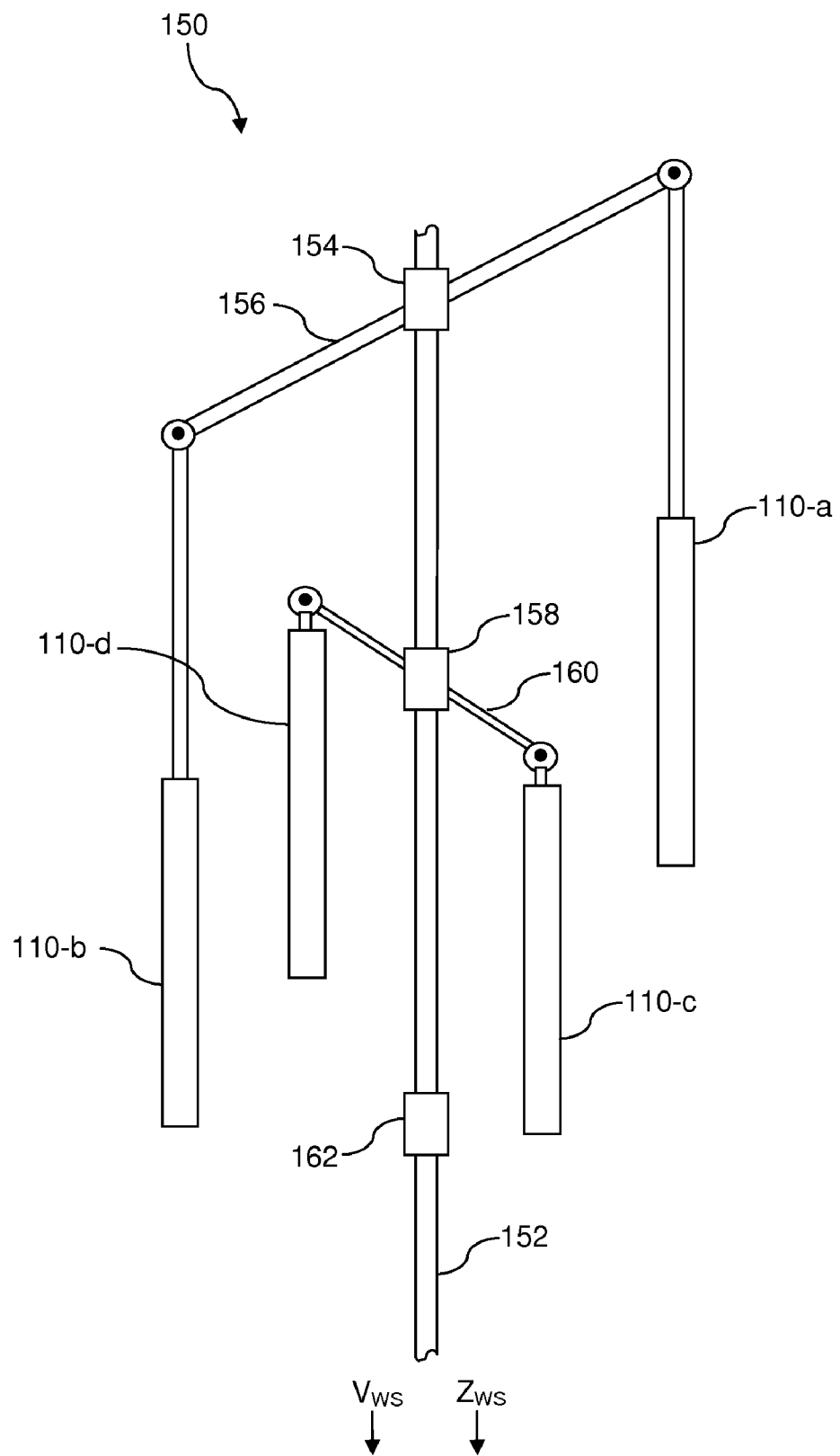
FIG. 3 is an illustration of a dual-jacking mechanism according to some embodiments of the disclosure.

Turning now to FIG. 2A, a single actuator hydraulic system 100 is described. The single actuator hydraulic system 100 comprises a hydraulic pump 102, a directional flow valve 104, a hydraulic pressure supply line 106, a hydraulic return line 107, a hydraulic fluid reservoir 108, a hydraulic supply line 109, a hydraulic actuator 110, a rod side hydraulic line 112, a piston side hydraulic line 114, a first counterbalance valve 115-$a$, and a second counterbalance valve 115-$b$. In an embodiment, the hydraulic pump 102 provides pressurized flow of hydraulic fluid at an effective pressure and rate of flow to drive the hydraulic actuator 110 according to operational control regimes. In different embodiments, different hydraulic pumps 102 may be selected to provide different flow/pressure capacities and/or different pump ratings. Pressurized hydraulic fluid flows through the hydraulic pressure supply line 106 to the hydraulic actuator 110 under the control of the directional flow valve 104. The hydraulic fluid is returned from the hydraulic actuator 110 through the hydraulic return line 107 to hydraulic fluid reservoir 108 under the control of the directional flow valve 104. The hydraulic pump 102 draws hydraulic fluid from the hydraulic fluid reservoir 108 via the hydraulic supply line 109. The directional flow valve 104 directs pressurized hydraulic fluid to the rod side hydraulic line 112 when in a first control state, to the piston side hydraulic line 114 when in a second state, and to the hydraulic return line 107 when in a third state.

In an embodiment, the directional flow valve 104 has four ports which connect to the hydraulic pressure supply line 106, the hydraulic return line 107, the rod side hydraulic line 112, and the piston side hydraulic line 114. The directional flow valve 104 has an internal diverting spool that is electrically actuated by use of a first and a second solenoid. When the first solenoid is energized, the internal diverting spool is displaced to a first position, connecting the hydraulic pressure supply line 106 with the rod side hydraulic line 112 and connecting the hydraulic return line 107 with the piston side hydraulic line 114. When the second solenoid is energized, the internal diverting spool is displaced to a second position, connecting the hydraulic pressure supply line 106 to the piston side hydraulic line 114 and the hydraulic return line 107 to the rod side hydraulic line 112. When neither the first solenoid or the second solenoid is energized, the internal diverting spool remains in a neutral position, and all four hydraulic lines—the hydraulic pressure supply line 106, the hydraulic return line 107, the rod side hydraulic line 112, and the piston side hydraulic line 114—are connected together, effectively routing the hydraulic pressure supply line 106 to the hydraulic return line 107 and bypassing both the rod side hydraulic line 112 and the piston side hydraulic line 114.

The hydraulic actuator 110 comprises a rod 116 attached to a piston 118. The rod 116 is supported and retained by an end cap (not shown) of the hydraulic actuator 110 and by the piston 118. The piston 118 is supported by the interior of the hydraulic actuator 110. The rod 116 may be coupled to a weight bearing structure (not shown) to manipulate or move the weight bearing structure. The interior of the hydraulic actuator 110 includes a rod side chamber 120 and a piston side chamber 122. By directing hydraulic fluid at different pressures into the rod side chamber 120 from the rod side hydraulic line 112 and into the piston side chamber 122 from the piston side hydraulic line 114, the rod 116 is driven under force in different directions. The force exerted by the rod 116 may be calculated to be the difference of the product of an area of the piston 118 multiplied by the hydraulic pressure, $P_{PS}$, in the piston side chamber 122 and a product of the hydraulic pressure, $P_{RS}$, in the rod side chamber 120 multipled by an area determined as the area of the piston 118 minus a cross-sectional area of the rod 116. In different embodiments, different hydraulic actuators 110 may be selected having different stroke lengths, different diameters, different piston sizes, different chamber volumes, and other different specifications, capacities, and/or dimensions.

In an embodiment, a first counterbalance valve 115-a is installed in the rod side hydraulic line 112 and a second counterbalance valve 115-b is installed in the piston side hydraulic line 114. The first and second counterbalance valves 115-a, b are cross-connected to each other. The purpose of the first and second counterbalance valves 115-a, b is to hold any overrunning loads of the hydraulic actuator 110. For example, if the hydraulic actuator 110 is extended and bearing a heavy weight, as may be the case when the hydraulic actuator 110 is supporting a long pipe string or coiled tubing, and then the single actuator hydraulic system 100 is controlled or commanded to direct hydraulic fluid and pressure to the rod side chamber 120 and to return hydraulic fluid from the piston side chamber 122, while not choking back the flow out of the piston side chamber 122, the hydraulic actuator 110 and the load it supports may fall uncontrolled at the rate which the hydraulic fluid can escape the piston side chamber 122. The first and second counterbalance valves 115-a, b promote maintaining controlled movement of the hydraulic actuator 110 by holding back hydraulic fluid so that the hydraulic actuator 110 does not run away or fall.

The first counterbalance valve 115-a provides a first pilot hydraulic pressure to the second counterbalance valve 115-b, and, similarly, the second counterbalance valve 115-b provides a second pilot hydraulic pressure to the first counterbalance valve 115-a. In order to move the hydraulic actuator 110 in a manner that requires fluid to flow through the first counterbalance valve 115-a into the rod side chamber 120 and for fluid to exit the piston side chamber 122 through the second counterbalance valve 115-b, sufficient hydraulic pressure must be supplied by the first pilot hydraulic pressure to the second counterbalance valve 115-b. Similarly, in order to move the hydraulic actuator 110 in a manner that requires fluid to flow through the second counterbalance valve 115-b into the piston side chamber 122 and for fluid to exit the rod side chamber 120 through the first counterbalance valve 115-a, sufficient hydraulic pressure must be supplied by the second pilot hydraulic pressure to the first counterbalance valve 115-a. Counterbalance valves 115 may be employed in both the rod side hydraulic line 112 and the piston side hydraulic line 114, because the work string may be either heavily weighted and exerting a downwards force on the hydraulic actuator 110 or heavily buoyant and exerting an upwards force on the hydraulic actuator 110. These conditions may be referred to as work string heavy and work string light, respectively.

Figure 2B:
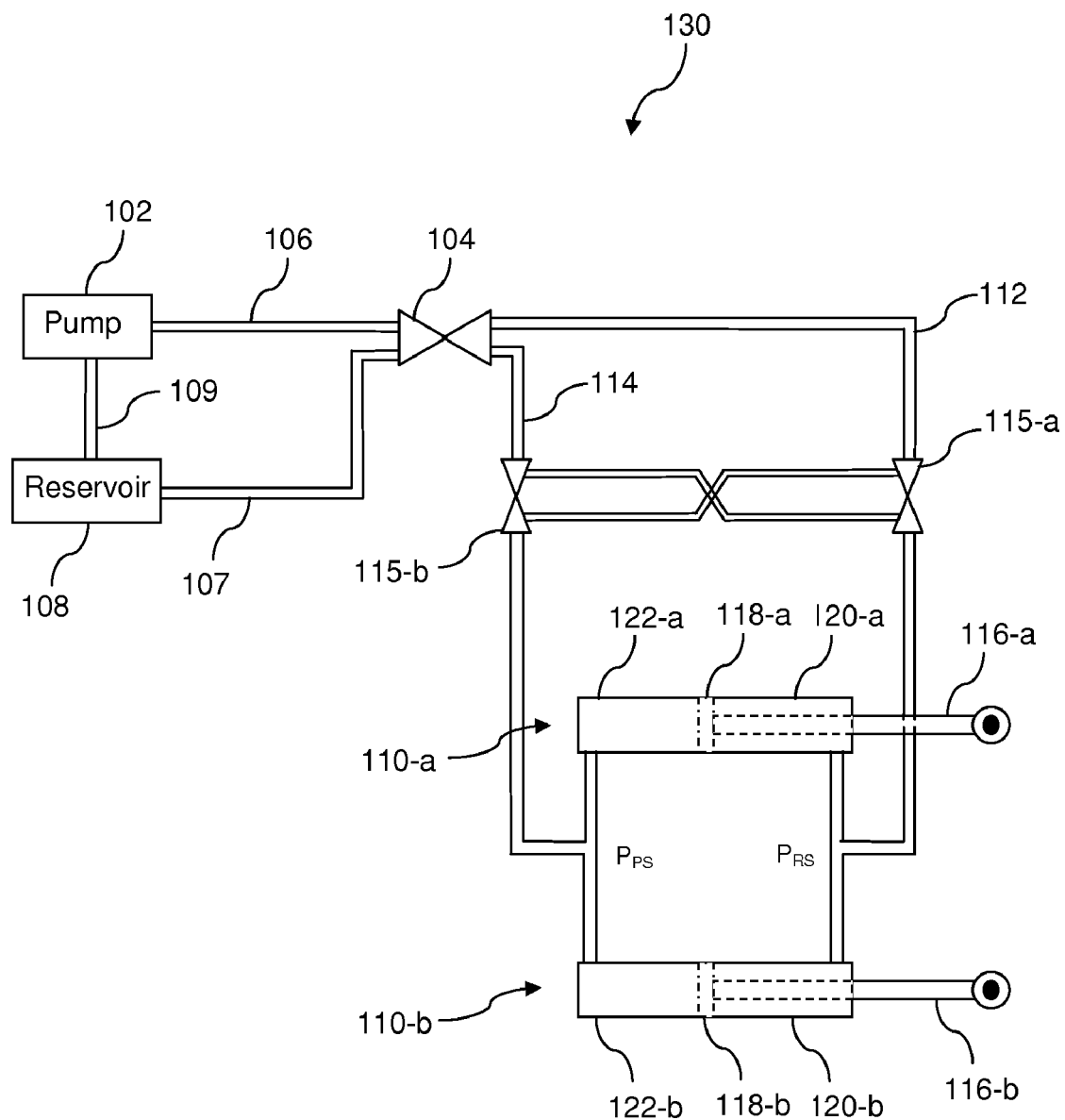
FIG. 2B is an illustration of a two actuator hydraulic power system according to other embodiments of the disclosure.

Turning now to FIG. 2B, a two actuator hydraulic system 130 is described. The two actuator hydraulic system 130 is substantially similar to the single actuator hydraulic system 100, with the difference being that the two actuator hydraulic system 130 contains two hydraulic actuators 110, a first hydraulic actuator 110-a and a second hydraulic actuator 110-b, plumbed in parallel. The first hydraulic actuator 110-a comprises a first rod 116-a attached to a first piston 118-a. The interior of the first hydraulic actuator 110-a includes a first rod side chamber 120-a and a first piston side chamber 122-a. Similarly, the second hydraulic actuator 110-b comprises a second rod 116-b attached to a second piston 118-b. The interior of the second hydraulic actuator 110-b includes a second rod side chamber 120-b and a second piston side chamber 122-b. The two rod side chambers 120-a, b are plumbed in parallel from the common rod side hydraulic line 112, and the two piston side chambers 122-a, b are plumbed in parallel from the common piston side hydraulic line 114. Because the hydraulic actuators 110 are plumbed in parallel, the function of the directional flow valve 104 and the counterbalance valves 115 remain the same as described with respect to FIG. 2A. The use of multiple hydraulic actuators 110, for example two hydraulic actuators 110-a, 110-b as illustrated in FIG. 2B, may provide increased force to apply to a manipulated object. Additionally, the use of multiple hydraulic actuators 110 may promote ease of force transfer from the hydraulic actuators 110 to the manipulated object or objects.

Turning now to FIG. 3, a dual-jacking system 150 is described. The dual-jacking system 150 is operable to manipulate a work string 152 in and out of a well bore (not shown) to a target depth Z and at a target velocity V under automatic control of a work string controller to be described hereinafter. The dual-jacking system 150 comprises a first slip bowl 154, a first traveling head 156, a second slip bowl 158, a second traveling head 160, and four hydraulic actuators—the first hydraulic actuator 110-a, the second hydraulic actuator 110-b, a third hydraulic actuator 110-c, and a fourth hydraulic actuator 110-d. The first hydraulic actuator 110-a and the second hydraulic actuator 110-b are coupled to opposite ends of the first traveling head 156. The third hydraulic actuator 110-c and the fourth hydraulic actuator 110-d are coupled to opposite ends of the second traveling head 160. The dual-jacking system 150 may also comprise a stationary slip bowl 162. In some contexts, slip bowls may be referred to as grasping actuators that may be said to assume a non-grasping position when open and a grasping position when closed. In an embodiment, the bases of the hydraulic actuators 110-a, b, c, d and the stationary slip bowl 162 may be attached to and supported by another structure, for example a drilling derrick, a work-over rig, or some other support structure. The positive Z direction is oriented downwards, into a well bore (not shown). The positive V velocity is oriented downwards, into the well bore.

The two hydraulic actuators 110-c, d are substantially similar to the hydraulic actuators 110-a, b described above with reference to FIG. 2B. Because in some control regimes or operational modes the two hydraulic actuators 110-a, b and the two hydraulic actuators 110-c, d may be commanded independently, the two hydraulic actuators 110-a, b may be coupled to a first directional flow valve 104-a (not shown) and a first hydraulic pump 102-a (not shown) and the two hydraulic actuators 110-c, d may be coupled to a second directional flow valve 104-b (not shown) and a second hydraulic pump 102-b (not shown).

By commanding the first slip bowl 154 to grip the work string 152 and commanding the first hydraulic actuator 110-a and the second hydraulic actuator 110-b in unison, the work string 152 may be manipulated to move in and out of the well bore. In effect, the parallel plumbing of the first and second hydraulic actuators 110-a, b described above results in the common motion of the first and second hydraulic actuators 110-a, b. Similarly, by commanding the second slip bowl 158 to grip the work string 152 and commanding the third hydraulic actuator 110-c and the fourth hydraulic actuator 110-d in unison, the work string 152 may be manipulated to move in and out of the well bore. Again, in effect, the parallel plumbing of the third and fourth hydraulic actuators 110-c, d described above results in the common motion of the third and fourth hydraulic actuators 110-c, d. The stationary slip bowl 162 may be commanded to grip the work string 152 during different operation modes, for example during transfer of the load from the first slip bowl 154 to the second slip bowl 158 and from the second slip bowl 158 to the first slip bowl 154. During some operation modes, however, the stationary slip bowl 162 may not be employed. The four hydraulic actuators 110-a, b, c, d may move to about the extended limit of their travel and to about the retracted limit of their travel. In some embodiments, the first and second hydraulic actuators 110-a, b are about fully extended while the third and fourth hydraulic actuators 110-c, d are about fully retracted, and vice-versa, that is the hydraulic actuator pairs may have about opposite traversal (e.g., opposite direction and velocity). In an embodiment, the motions of the four hydraulic actuators 110-a, b, c, d are guided by rails or other structures (not shown) that constrain their motions to substantially one axis of motion, for example positive and negative Z-axis motion. For further details of the dual jacking system 150, see U.S. Pat. No. 6,688,393 B2 issued Feb. 10, 2004, entitled Dual Jacking System and Method by Eric M. Sredensek and Michael S. Oser, which is hereby incorporated by reference for all purposes.

In one case, for example when the weight of the work string 152 is moderate, the hydraulic actuators 110 may be commanded so that while the first slip bowl 154 grips the work string 152 and the first and second hydraulic actuators 110-a, b move the work string 152 in a positive Z direction, the second slip bowl 158 is disengaged from the work string 152 and the third and fourth hydraulic actuators 110-c, d move in a negative Z direction. At about the limits of travel, the hydraulic actuators 110 are commanded to stop, bringing the work string 152, both slip bowls 154, 158, and both traveling heads 156, 160 to a stop with zero velocity. The second slip bowl 158 is engaged to grip the work string 152, and the first slip bowl 154 is disengaged from the work string 152. This operation may be referred to as a "hand-off" from one slip bowl 154, 158 to another and may involve additional movements of one or more of the traveling heads 156, 160 for the second slip bowl 158 to fully engage the work string 152 and for the first slip bowl 154 to fully disengage from the work string 152. The third and fourth hydraulic actuators 110-c, d may then be commanded to move the work string 152 in the positive Z direction, while the first and second hydraulic actuators 110-a, b are commanded to move in the negative Z direction. At about the limits of travel, the hydraulic actuators 110 may be commanded to stop, bringing the work string 152, both slip bowls 154, 158, and both traveling heads 156, 160 to a stop with zero velocity. A hand-off is then performed transferring the work string 152 from the grip of the second slip bowl 158 to the grip of the first slip bowl 154. This cycle may be repeated, moving the work string 152 further into the well or reversed and repeated, moving the work string 152 out of the well. In some contexts, this mode of operation may be referred to as a high speed sequential mode.

Using the high speed sequential mode, the four hydraulic actuators 110-a, b, c, d may cooperate to maintain a sequence of start-stop movements of the work string 152, driving the work string 152 at an average commanded velocity V to a commanded depth Z. In this mode, the two pairs of hydraulic actuators—hydraulic actuators 110-a, b and hydraulic actuators 110-c, d—can operate out-of-phase, handing off between each other, thereby achieving higher velocities of the work string 152 than may be possible with a single pair of hydraulic actuators, for example 110-a, b. In some contexts herein, the commanded velocity V and commanded depth Z may be referred to as a trajectory of the work string 152. Alternatively, a plurality of commanded velocities V and commanded depths Z may be concatenated into a series that may also be referred to as a trajectory of the work string 152.

In another case, for example when the work string 152 may be too heavy for manipulation by one pair of hydraulic actuators 110 at a time, the four actuators 110-a, b, c, d and the two slip bowls 154, 158 may be commanded to share the load of manipulating the work string 152. In this case, the first and second slip bowls 154, 158 may be engaged to grip the work string 152 and the four hydraulic actuators 110-a, b, c, d may be commanded to move the work string 152 in the positive Z direction to about one limit of their travel. The four hydraulic actuators 110-a, b, c, d then may be commanded to bring the work string 152 to a stop, zero velocity V, whereupon the stationary slip bowl 162 may be engaged to grip and hold the weight of the work string 152. When the stationary slip bowl 162 is supporting the work string 152, the first and second slip bowls 154, 158 may be disengaged, and the four hydraulic actuators 110-a, b, c, d may be commanded to move in the negative Z direction to about the opposite limit of their travel. The four hydraulic actuators 110-a, b, c, d may then be commanded to come to a stop, zero velocity V, whereupon the first and second slip bowls 154, 158 may be commanded to engage and grip the work string 152. The stationary slip bowl 162 then may be commanded to disengage, and the cycle may be repeated. In some contexts, this mode of operation may be referred to as a distributed load or high capacity sequential mode. This mode may be characterized by a coordinated sequence of start and stop operations between the two pairs of hydraulic actuators—hydraulic actuators 110-a, b and hydraulic actuators 110-c, d—working in unison and using the stationary slip bowl 162 to bear the work string 152 during stops. This mode may provide a capacity to manipulate higher loads, for example a heavier work string 152, but with lower velocity than may be possible with the high speed sequential mode.

In another case, for example when the weight of the work string 152 is within the handling capacity of one pair of hydraulic actuators 110, for example the hydraulic actuators 110-*a, b*, the four hydraulic actuators 110-*a, b, c, d* and the two slip bowls 154, 158 may be synchronized to maintain a substantially continuous movement of the work string 152. In other words, the hydraulic actuators 110-*a, b, c, d* and the slip bowls 154, 158 may move in such a way as to provide substantially constant velocity of the work string 152 or substantially constant acceleration or deceleration of the work string 152. The hand off of the work string 152 between the hydraulic actuators 110-*a, b, c, d* and the slip bowls 154, 158 may be coordinated "on the fly" to promote this continuous motion. In some contexts, this mode of operation may be referred to as a high speed continuous mode. This mode may have the advantage of reducing the power and/or energy consumption requirements necessary to start and stop the work string 152 with each motion as described in the high speed sequential mode. Additionally, this mode may reduce stress and strain on the various components of the dual-jacking system 150 and/or the hydraulic components, thereby possibly extending the service life of the same.

In another case, for example when the weight of the work string 152 is within the handling capacity of one pair of hydraulic actuators 110, for example the hydraulic actuators 110-*a, b*, constraints other than the maximum handling capacity of the pairs of hydraulic actuators 110 may constrain the work string 152 velocities and/or accelerations. For example, mechanical, electrical, and/or safety constraints may limit the speed at which a hand-off "on the fly" can be accomplished. This maximum hand-off speed may be slower than the desired or commanded velocity of the work string 152. In order to achieve an overall "average" work string speed which matches the commanded velocity of the work string 152, the four hydraulic actuators 110-*a, b, c, d* and the two slip bowls 154, 158 may be synchronized. When synchronized, the four hydraulic actuators 110-*a, b, c, d* and the two slip bowls 154, 158 may decelerate the work string 152 to the maximum hand-off speed during hand-offs and accelerate the work string 152 to a velocity between hand-offs such that the overall average velocity of the work string 152 is the commanded velocity of the work string 152. In some contexts, this mode of operation may be referred to as a high speed constrained mode.

In another case, for example when the weight of the work string 152 is within the handling capacity of one pair of hydraulic actuators 110, for example the hydraulic actuators 110-*a, b*, mechanical, electrical, or safety constraints or considerations may make it desirable to use the stationary slip bowl 162 during the hand off between the hydraulic actuators 110, for example between the hydraulic actuators 110-*a, b* and the hydraulic actuators 110-*c, d*. The four hydraulic actuators 110-*a, b, c, d* and the three slip bowls 154, 158, and 162 may be synchronized such that after a stroke of manipulating the work string 152 is completed by the hydraulic actuators 110-*a, b* the first slip bowl 154 hands off the work string 152 to the stationary slip bowl 162. At this point, the slip bowls 154 and 158 are both disengaged from the work string 152. The stationary slip bowl 162 then hands off the work string 152 to the second slip bowl 158 with the hydraulic actuators 110-*c, d* in position for a full stroke of manipulating the work string 152. The hydraulic actuators 110-*c, d* then manipulate the work string 152 while the hydraulic actuators 110-*a, b* reposition the first slip bowl 154 to a starting position for the next hand off. In some contexts, this mode of operation may be referred to as a high speed sequential mode with the stationary slip. Generalizing, this mode of operation may be referred to as a three manipulator high speed sequential mode as opposed to the two manipulator high speed sequential mode described above.

In another case, for example when the weight of the work string 152 exceeds the handling capacity of one pair of hydraulic actuators 110, for example the hydraulic actuators 110-*a, b*, three or more pairs of hydraulic actuators 110 may be employed to provide a high capacity continuous mode of operation. For example, hydraulic actuators 110-*a, b, c, d, e, f* may be operated with hydraulic actuators 110-*a, b* forming in part a first manipulator, hydraulic actuators 110-*c, d* forming in part a second manipulator, and hydraulic actuators 110-*e, f* forming in part a third manipulator. The first, second, and third manipulators may be coupled to slip bowls by a traveling head as depicted in FIG. 3. The first and second manipulator may grip the work string 152 and move the work string while the third manipulator is repositioned. The third manipulator may then grip the work string 152, and the second manipulator may release the work string 152. The first and third manipulators may move the work string 152 while the second manipulator is repositioned. The second manipulator may then grip the work string 152, and the first manipulator may release the work string 152. The second and third manipulators may move the work string 152 while the first manipulator is repositioned. The first manipulator may then grip the work string 152, and the third manipulator may release the work string 152. The cycle may be repeated to provide substantially continuous movement of the work string 152. It will be appreciated by one skilled in the art that other numbers of manipulators may be combined in a fashion similar to that described above to provide substantially continuous motions while distributing the weight of the work string 152 over multiple manipulators.

The mode of operation chosen determines how the commanded trajectories of the manipulators (traveling head position, traveling head velocity, slip bowl position) are computed through kinematics. Additionally, all of these modes are relevant with any number, type, or combination of manipulators. For example, a system which consists of four manipulators could be used where the weight of the work string 152 exceeds the capacity of a single manipulator but does not exceed the capacity of two manipulators working in unison. A mode can be envisioned where the manipulators are paired into two sets for capacity reasons and the paired sets of manipulators are operated in a high speed continuous mode to maximize pipe speed.

Another example would be the same four manipulator system where the weight of the work string 152 exceeds the capacity of two manipulators but does not exceed the capacity of three manipulators working in unison. A mode can be envisioned where there are always three manipulators in contact with the work string 152 for capacity reasons and the manipulators are operated in a version of the high speed continuous mode to maximize the velocity of the work string 152.

With multiple manipulators in a particular system a series of modes can be envisioned where the control system automatically changes from mode to mode to optimize performance and prevent failure as the weight of the work string 152 increases or decreases.

In combination with the present disclosure, one skilled in the art may recombine or extend the scenarios described above to describe other controlling regimes, all of which are contemplated by the present disclosure and system.

Figure 4:
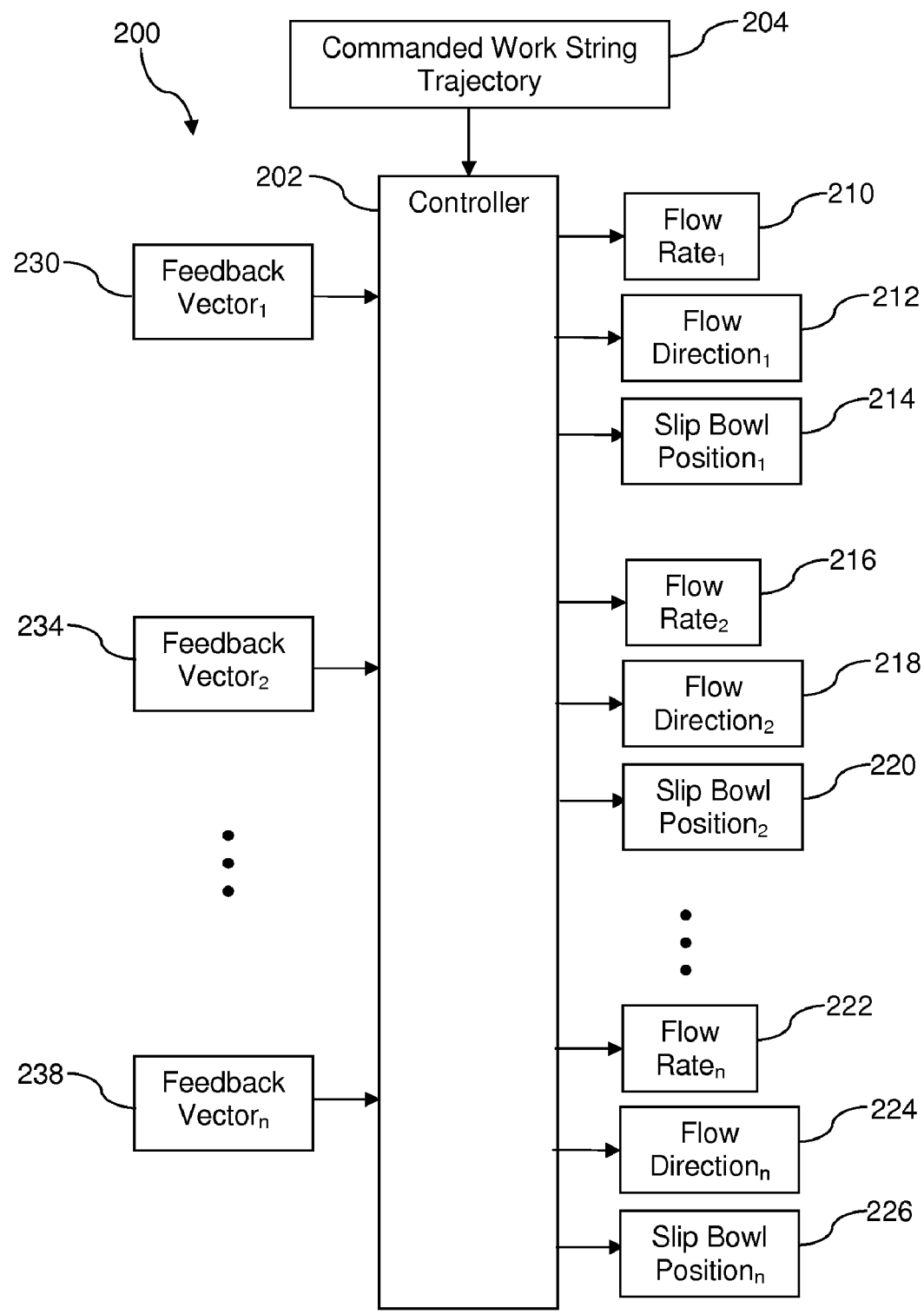
FIG. 4 is a block diagram of a work string control system according to some embodiments of the disclosure.

Turning now to FIG. 4, a work string control system 200 is described. The work string control system 200 is one embodiment of the control system architecture 8 described with reference to FIG. 1 above. The work string control system 200 comprises a controller 202, a commanded trajectory input 204, a first flow rate command 210, a first flow direction command 212, a first slip bowl position command 214, a second flow rate command 216, a second flow direction command 218, a second slip bowl position command 220, a third flow rate command 222, a third flow direction command 224, a third slip bowl position command 226, a first feedback vector 230, a second feedback vector 234, and a third feedback vector 238. In an embodiment, any number of flow rate commands and flow direction commands may be provided by the controller 202. Similarly, in an embodiment, any number of feedback vectors may be received by the controller 202. The controller 202 is configured to automatically generate the flow rate commands 210, 216, and 222; the flow direction commands 212, 218, and 224; and the slip bowl position commands 214, 220, and 226 based on the commanded trajectory input 204 and the feedback vectors 230, 234, and 238. In an embodiment, each one of the commands may depend upon all of the input vectors. For example, the first flow rate command 210 may depend not only on the first feedback vector 230 but also on the second feedback vector 234, because the motions of the first and second traveling heads 154, 158 may not be commanded entirely independently of each other. In an embodiment, the third slip bowl position command 226 may control the stationary slip bowl 162 and the third flow rate command 222 and the third flow direction command 224 may remain zero.

In an embodiment, the controller 202 is implemented on a general purpose computer system using digital control methods based on discrete time processing of sampled inputs. In another embodiment, however, the controller 202 may be implemented as a combination of the general purpose computer system and some analog processing components and at least part of the controller 202 may use analog control methods based on continuous time processing of analog inputs. Analog feedback control system components are well known to those skilled in the art and may be implemented, for example, using differential amplifiers, capacitors, and resistors to compose integrators, differentiators, amplifiers, and other common analog feedback control system components. General purpose computer systems are discussed in further detail hereinafter. It will be understood by one skilled in the art that the several components of the control system architecture 8 including the manipulator controllers 20-a, b, c, the drive modulators 40-a, b, c, the manipulator observer system 30, and the drive observer system 50 may be conceptually aggregated as the controller 202 and implemented in one or more coordinated computer programs or software components that are executed on one or more computer systems.

In an embodiment, the controller 202 is coupled to the dual-jacking system 150 described above and is operable to control the actuators 110-a, b, c, d and to control the first and second slip bowls 154, 158 to manipulate the work string 152 to achieve the commanded trajectory input 204. In this embodiment, the first flow rate command 210 may be coupled to a first hydraulic pump 102-a (not shown) associated with the first and second hydraulic actuators 110-a, b, the first flow direction command 212 may be coupled to a first directional flow valve 104-a (not shown) associated with the first and second hydraulic actuators 110-a, b, and the first slip bowl position command 214 may be coupled to the first slip bowl 154. In this embodiment, the second flow rate command 216 may be coupled to a second hydraulic pump 102-b (not shown) associated with the third and fourth hydraulic actuators 110-c, d, the second flow direction command 218 may be coupled to a second directional flow valve 104-b (not shown) associated with the third and fourth hydraulic actuators 110-c, d, the second slip bowl position command 220 may be coupled to the second slip bowl 158, and the third slip bowl position command 226 may be coupled to the stationary slip bowl 162.

In this embodiment, velocity and position sensors coupled to one or both of the first and second hydraulic actuator 110-a, b and pressure and flow sensors coupled to a first rod side hydraulic line 112-a (not shown) and a first piston side hydraulic line 114-a (not shown) connected in parallel to the first and second hydraulic actuators 110-a, b may be coupled to the controller 202 as the first feedback vector 230. In this embodiment, velocity and position sensors coupled to one or both of the third and fourth hydraulic actuators 110-c, d and pressure and flow sensors coupled to a second rod side hydraulic line 112-b (not shown) and a second piston side hydraulic line 114-b (not shown) connected in parallel to the third and fourth hydraulic actuators 110-c, d may be coupled to the controller 202 as the second feedback vector 234. In an embodiment, the velocity and position sensors may be coupled to the rod 116 of the hydraulic actuator 110.

Figure 5:
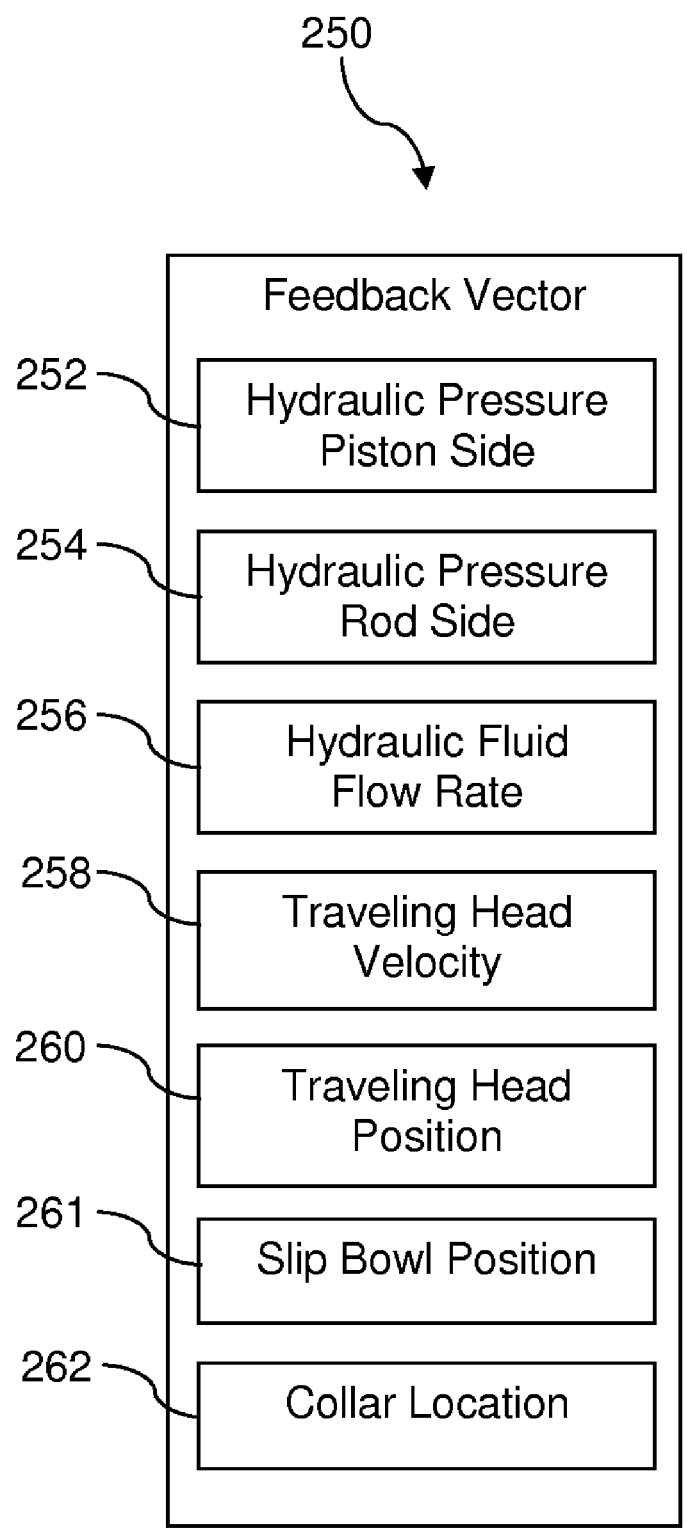
FIG. 5 is an illustration of a feedback vector according to some embodiments of the disclosure.

Turning now to FIG. 5, an exemplary feedback vector 250 is described. The feedback vector 250 may comprise a piston side pressure feedback 252, a rod side pressure feedback 254, a flow rate feedback 256, a traveling head velocity feedback 258, a traveling head position feedback 260, a slip bowl position feedback 261, and a work string collar location feedback 262. In other embodiments, some of the depicted feedbacks may not be present and other feedbacks not depicted may be present in the feedback vector 250. In another embodiment, velocity of the work string 152 and position of the work string 152 may be present in the feedback vector 250.

Figure 6:
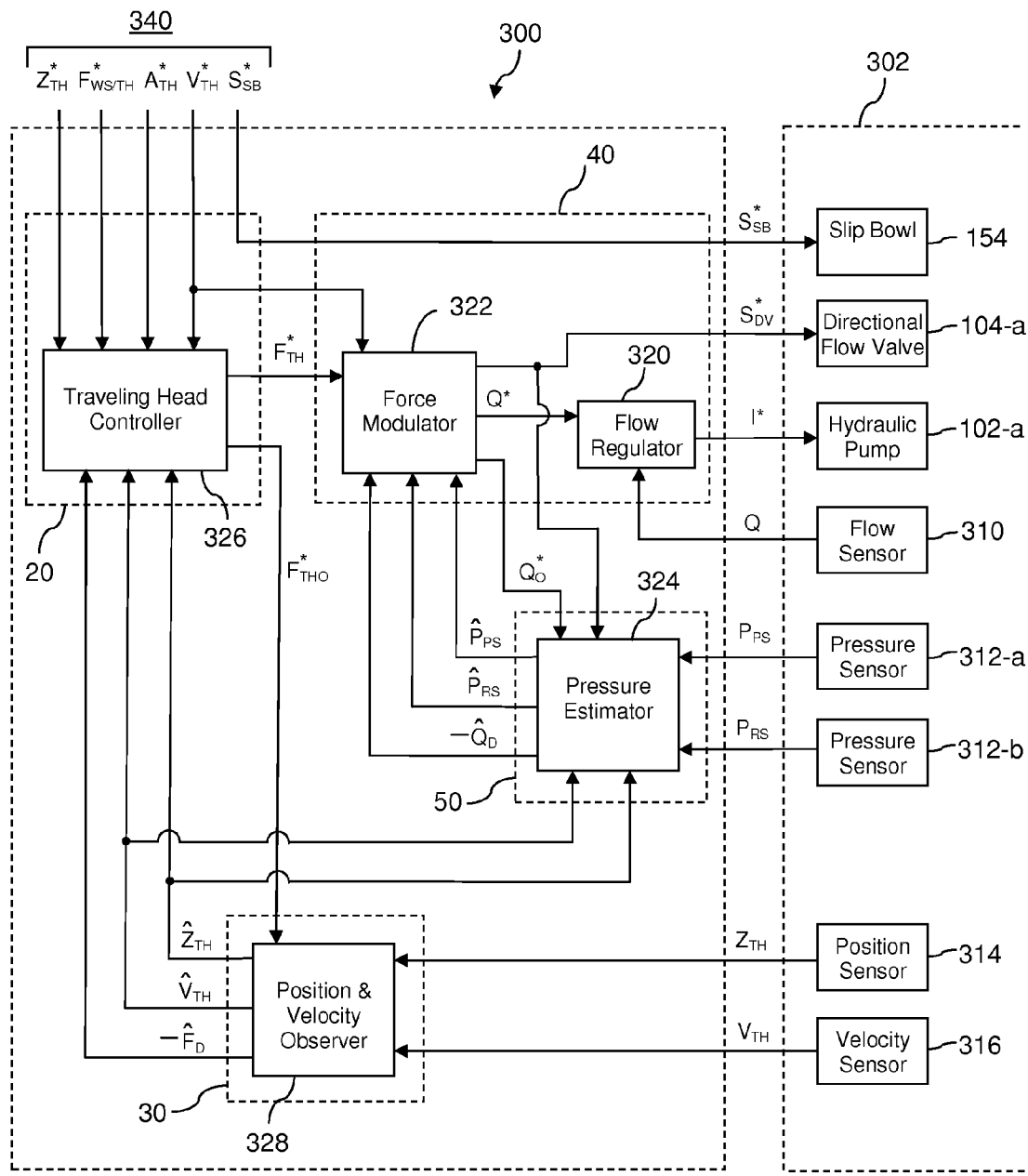
FIG. 6 is a block diagram of a manipulator control system and a manipulator physical system interface according to some embodiments of the disclosure.

Turning now to FIG. 6, a manipulator control system 300 is described. The manipulator control system 300 is one embodiment of portions of the control system architecture 8. In the following descriptions some control components associated with specific embodiments are associated with their corresponding generic component in the control system architecture 8 depicted in FIG. 1, for example by enclosing one or more components in a dotted line box and referring to the dotted line box with a label from the control system architecture 8 depicted in FIG. 1. The control system architecture 8 depicted in FIG. 1 should not be limited by the following description, because the specific embodiments of control system components described hereinafter are only some of the wide variety of possible embodiments of the control system architecture 8 that are contemplated by the present disclosure.

The manipulator control system 300 automatically controls a physical system, for example the manipulator physical system 60, through a manipulator physical system interface 302. In an embodiment, the physical system associated with the manipulator physical system interface 302 may be substantially similar to portions of the dual-jacking system 150 and portions of the two actuator hydraulic system 130. In another embodiment, however, the manipulator control system 300 may control a different manipulator physical system 60. The manipulator control system 300 may be said to have two degrees of freedom because it controls the first slip bowl 154 and it controls the first traveling head 156, for example by controlling the first directional valve 104-a and the first hydraulic pump 102-a. In an embodiment, the manipulator physical system interface 302 comprises the first slip bowl 154, the first directional flow valve 104-a, the first hydraulic pump 102-a, a flow sensor 310, a first pressure sensor 312-a, a second pressure sensor 312-b, a traveling head position sensor 314, and a traveling head velocity sensor 316. The manipulator control system 300 may be implemented on a general purpose computer system using digital control methods based on discrete time processing of sampled inputs. In another embodiment, however, the control system 300 may include some analog components which process continuous time inputs according to analog feedback control methods.

In an embodiment, the manipulator control system 300 comprises a flow regulator 320, a force modulator 322, a pressure estimator 324, a traveling head controller 326, and a traveling head position and velocity observer 328. In other embodiments, the manipulator control system 300 may comprise other components. For example, in an embodiment, the manipulator control system 300 may not comprise the pressure estimator 324, and instead the outputs of the pressure sensors 312-a, b may be directly input to the force modulator 322. In an embodiment, the manipulator control system 300 may not comprise the traveling head position and velocity observer 328, and instead the output of the traveling head position sensor 314 and the output of the traveling head velocity sensor 316 may be directly input to the traveling head controller 326. The flow regulator 320 in combination with the force modulator 322 form an embodiment of the drive modulator 40 depicted in FIG. 1. The pressure estimator 324 is an embodiment of the drive observer system 50 depicted in FIG. 1. The traveling head position and velocity observer 328 is an embodiment of the manipulator observer system 30 depicted in FIG. 1. The traveling head controller 326 is an embodiment of the manipulator controller 20 depicted in FIG. 1.

In an embodiment, a slip bowl command ($S_{SB}$*) commands the first slip bowl 154 to an open or a closed position or state. In a different embodiment, however, a slip bowl controller (not shown) may be employed to generate a slip bowl command based on a sensed or estimated position of the first slip bowl 154 and based on a desired position of the first slip bowl 154.

In an embodiment, the flow regulator 320 receives a flow rate command (Q*) input from the force modulator 322 and a flow rate feedback (Q) from the flow sensor 310 and automatically produces a current command (I*) to regulate the first hydraulic pump 102-a to provide the desired hydraulic flow rate to the manipulator, for example to the hydraulic actuators 110-a, b. In another embodiment, however, no flow rate feedback is provided to the flow regulator 320 which operates in an open-loop control mode. An embodiment of the flow regulator 320 is described further hereinafter.

In an embodiment, the force modulator 322 receives a traveling head force command (F*$_{TH}$) and a traveling head velocity command (V*$_{TH}$) from the traveling head controller 326. In an embodiment, the force modulator 322 also receives an estimated piston side pressure feedback (P^$_{PS}$), an estimated rod side pressure feedback (P^$_{RS}$), and an estimated flow rate disturbance feedback (Q^$_D$) from the pressure estimator 324. In combination with the present disclosure, one skilled in the art will readily appreciate that an estimated parameter value, while it is related to a sensed parameter value, may be different from the sensed parameter value. For example, an estimated parameter value may be a smoothed or filtered version of the sensed parameter value that attenuates noise produced by a sensor or by an environment. Additionally, an estimated parameter value may partially reduce or remove phase shifts and/or time lags of system response. In another embodiment, however, the force modulator 322 receives a sensed piston side pressure feedback ($P_{PS}$) and a sensed rod side pressure feedback ($P_{RS}$), for example in an embodiment which does not comprise the pressure estimator 324. The force modulator 322 automatically produces the flow rate command Q* and provides the flow rate command Q* to the flow regulator 320. The force modulator 322 also automatically produces a directional flow valve command ($S_{DV}$*) to control the state of the directional flow valve 104. In an embodiment that comprises a pressure estimator 324, the force modulator 322 also automatically produces an observer feed forward flow rate command Q*$_O$ and provides the observer feed forward flow rate command Q*$_O$ to the pressure estimator 324. In an embodiment, the directional flow valve command may be mapped by a digital-to-analog converter device (not shown) to produce an electrical current to energize the first or the second solenoid to actuate the diverting spool to control the first directional flow valve 104-a. An embodiment of the force modulator 322 is described further hereinafter.

In an embodiment, the pressure estimator 324 receives a sensed piston side pressure ($P_{PS}$) input, a sensed rod side pressure ($P_{RS}$) input, the directional flow valve command ($S_{DV}$*) input, the observer feed forward flow rate command (Q*$_O$) input, an estimated traveling head position (Z^$_{TH}$) input, an estimated traveling head velocity (V^$_{TH}$) input and automatically produces the estimated piston side pressure, the estimated rod side pressure, and the estimated disturbance flow rate. In another embodiment, one or more of the estimated traveling head position (Z^$_{TH}$) and the estimated traveling head velocity (V^$_{TH}$) may be sensed rather than estimated values. Each of the estimated pressures are a zero time lagged, filtered signal. An embodiment of the pressure estimator 324 is discussed further hereinafter.

In an embodiment, the traveling head controller 326 receives a traveling head command input vector 340 that comprises a traveling head position command ($Z_{TH}$*), the traveling head velocity command ($V_{TH}$*), a traveling head acceleration command ($A_{TH}$*), and a feed forward work string load on the traveling head (F*$_{WS/TH}$). The traveling head controller 326 also receives an estimated traveling head position (Z^$_{TH}$) input, an estimated traveling head velocity (V^$_{TH}$) input and an estimated traveling head force disturbance (F^$_D$) input from the position and velocity observer 328. In an embodiment, however, the manipulator control system 300 does not comprise a traveling head position and velocity observer 328, and the traveling head controller 326 receives a sensed traveling head position ($Z_{TH}$) from the traveling head position sensor 314 and/or a sensed traveling head velocity ($V_{TH}$) from the traveling head velocity sensor 316. In general, a velocity sensor may provide a more accurate indication of manipulator velocity, for example traveling head velocity, than differentiating the output of a manipulator position sensor over time to calculate manipulator velocity, because the differentiation operation may produce unreliable results caused by noise in the signal generated by the position sensor 314. The traveling head controller 326 automatically produces the traveling head force command F*$_{TH}$ and provides the traveling head force command F*$_{TH}$ to the force modulator 322. The traveling head controller 326 automatically produces the observer feed forward traveling head force command F*$_{THO}$ and provides the observer feed forward traveling head force command F*$_{THO}$ to the traveling head position and velocity observer 328. An embodiment of the traveling head controller 326 is discussed further hereinafter.

The traveling head position and velocity observer 328 receives the observer feed forward traveling head force command F*$_{THO}$ from the traveling head controller 326, the sensed traveling head position input from the traveling head position sensor 314, and the sensed traveling head velocity input from the traveling head velocity sensor 316. The traveling head position and velocity observer 328 automatically produces the estimated traveling head position, the estimated traveling head velocity, and the estimated traveling head force disturbance and provides the estimated traveling head position, the estimated traveling head velocity, and the estimated traveling head force disturbance to the traveling head controller 326. Each of the estimated traveling head position and estimated traveling head velocity is a zero time lagged, filtered signal. An embodiment of the traveling head position and velocity observer 328 is discussed further hereinafter. In combination with the present disclosure, one skilled in the art will readily appreciate that an estimated parameter value, while it is related to a sensed parameter value, may be different from the sensed parameter value. For example, an estimated parameter value may be a smoothed or filtered version of the sensed parameter value that attenuates noise produced by a sensor or by an environment. Additionally, an estimated parameter value may partially reduce or remove phase shifts and/or time lags of system response.

Turning now to FIG. 7, an embodiment of the flow regulator 320 and an embodiment of the hydraulic pump 102 are discussed. The flow regulator 320, in combination with the force modulator 322 discussed below, comprise an embodiment of the drive modulator 40 of the control system architecture 8 described with reference to FIG. 1. The flow regulator 320 comprises a plurality of functional blocks including summation junctions, integrators, and gain units. The flow regulator 320 comprises a proportional-integral (PI) controller portion, a command feed-forward portion, and a pump control gain portion. The general purpose of the PI controller portion is to correct the error between a sensed flow rate and a flow rate command by producing a corrective signal that tends to drive the sensed flow rate to the flow rate command. The general purpose of the command feed-forward portion is to provide a command feed-forward signal that comprises a substantial component of the drive signal to control a motor that drives the hydraulic pump 102 based on the flow rate command, which may promote the PI controller portion being more suitably tuned to the purpose of correcting for dynamic transients and disturbances, such as changes of the physical system, sensors, or errors. Generally, in control systems analysis, disturbance terms correspond to imperfections or errors, for example extraordinary conditions, imperfect measurements or sensing of system parameters, irregularities such as bubbles in the hydraulic fluid, etc.

A sensed flow rate 406 is negatively summed with a flow rate command 402 by a first summation junction 408 to determine a flow rate error term. The sensed flow rate 406 provides a negative feedback term. The output of the first summation junction 408 is amplified by a first proportional gain 410. The output of the first summation junction 408 is integrated by a first integrator 412 and then amplified by a first integral gain 414. The output of the first proportional gain 410 and the output of the first integral gain 414 are summed by a second summation junction 416. The components 408, 410, 412, 414, and 416 comprise a PI controller portion. The output of the second summation junction 416 may be viewed as a corrective signal that tends to drive the sensed flow rate 406 to the value of the flow rate command 402. In an embodiment, the position of the first integrator 412 and the first integral gain 414 may be reversed, and the flow rate error term, the output of the first summation junction 408, may be first amplified by the first integral gain 414 and then may be integrated by the first integrator 412. In combination with the present disclosure, the values of the first integral gain 414 and of the first proportional gain 410 may be readily determined by one skilled in the control systems art. The process of determining proportional, integral, and derivative gains in control systems is discussed in further detail hereinafter.

The command feed-forward signal is produced by amplifying the flow rate command 402 by a first feed-forward gain 418. The first feed-forward gain 418 is inversely proportional to an estimate of the angular velocity or rate of rotation of the motor driving the hydraulic pump 102. In an embodiment, the first feed-forward gain 418 may be a constant value, for example a constant value proportional to the reciprocal of the designed steady-state angular velocity of the motor. In another embodiment, however, the first feed-forward gain 418 may be determined based on the actual value of the angular velocity $\omega_P$ of the motor, for example the value of motor angular velocity determined by a sensor. The command feed-forward signal is summed with the output of the second summation junction 416 by the third summation junction 420. The output of the third summation junction 420 is amplified by a pump control gain 422 to produce a current command 404. In combination with the present disclosure, the pump control gain 422 may be readily determined by one skilled in the control systems art based on design data provided by the manufacturer of the hydraulic pump 102. In an embodiment, the pump control gain 422 may not remain constant and may vary with the value of the output of the third summation junction 420. In this case the flow regulator may determine the pump control gain 422 using a look-up table, gain scheduling, or other function definition. In some contexts, the first feed-forward gain 418 and the pump control gain may be referred to as a model or a portion of a model of the flow regulator 320 or of the drive modulator 40.

In an embodiment, the hydraulic pump 102 is an axial piston pump system 308 comprising a motor that turns a swash plate that drives an axial piston pump. The axial piston pump system 308 may comprise a current regulator 430, a pump swash plate actuator 432, a pump rotation multiplication junction 434, a pump chamber 436, and a flow sensor 310. The current regulator 430 outputs a control current to actuate an angle of displacement of the pump swash plate actuator 432 based on the current command 404 provided by the flow regulator 320. The angle of displacement of the pump swash plate actuator 432 determines the amount of piston displacement as the pistons reciprocate within the pump chamber 436.

The swash plate actuator 432 is illustrated as coupled to the pump chamber 436 through the pump rotation multiplication junction 434 illustrated as having a rotational input designated by $\omega_P$. The piston displacement, in combination with the rate of rotation of the pump swash plate, determines the flow output of the hydraulic pump 102. The outputs of the pump chamber 436 include the pump pressure output 440 and the pump flow output 442. The inputs of the pump chamber 436 include a pump back pressure 444, and a pump inlet pressure $P_S$. The flow sensor 310 provides the sensed flow rate 406.

In an embodiment, the value of the first proportional gain 410 and the value of the first integral gain 414 are both set to zero, the output of the second summation junction 416 is substantially zero, and the output of the third summation junction is substantially determined by the output of the first feed-forward gain 418. In another embodiment, the components 408, 410, 412, 414, and 416—the PI controller portion—are not part of the flow regulator 320. In both these embodiments the sensed flow rate 406 is not used to generate the current command 404. These two embodiments may be employed when there is no flow sensor 310 available, when the sensed flow rate 406 output by the flow sensor 310 is unreliable or time lags the actual flow rate excessively, or when the pump swash plate actuator 432 has a low frequency response.

Turning now to FIG. 8, an embodiment of the force modulator 322 is discussed. The force modulator 322, in combination with the flow regulator 320 discussed above, comprise an embodiment of the drive modulator 40 of the control system architecture 8 described with reference to FIG. 1. The combination of the force modulator 322 and the flow regulator 320 may be said to transform or map a manipulator force command and a manipulator velocity command to an actuator control signal. The force modulator 322 comprises a proportional controller portion, a command feed-forward portion, and a directional valve modulator 514. The general purpose of the proportional gain controller is to correct the error between a traveling head force command 504 and a calculated or estimated force by producing a corrective signal that tends to drive the estimated force to the value of the traveling head force command 504. The calculated force is determined based on sensed or estimated pressures in the rod side pressure line 112 and in the piston side pressure line 114. In an embodiment, it is assumed that the pressure sensed in the rod side pressure line 112 is substantially the same as the pressure in the rod side chamber 120 and that the pressure sensed in the piston side pressure line 114 is substantially the same as the pressure in the piston side chamber 122. In another embodiment, however, pressure sensors may be placed in the rod side chamber 120 and in the piston chamber 122. The estimated force is negatively summed with the traveling head force command 504 by a fourth summation junction 506 to produce a force error term. The estimated force provides a negative feedback term. The output of the fourth summation junction 506 is amplified by a second proportional gain 508. The components 506 and 508 comprise a proportional controller. In combination with the present disclosure, the value of the second proportional gain 508 may be readily determined by one skilled in the control systems art.

The command feed-forward portion produces a command feed-forward signal by amplifying a traveling head velocity command 502 by a directional area gain 510. Amplifying the traveling head velocity command 502 by an area term generates a volumetric rate of change term, or a flow rate term, corresponding to the flow rate of hydraulic fluid that promotes driving the traveling head velocity to achieve the value of the traveling head velocity command 502. In an embodiment, the directional area gain 510 may be determined based on the effective surface area of the piston 118 of the hydraulic actuator 110. In another embodiment, because the effective surface area of the piston 118 is greater in the piston side chamber 122 than in the rod side chamber 120, a different value of the directional gain 510 may be used depending upon the polarity or sense of direction of the velocity command 502. As noted above with respect to FIG. 2A, the effective surface area of the piston in the rod side chamber 122 is decreased by the cross-sectional area of the rod 116. In another embodiment, a single value of directional gain 510 may be used that is based on an average of the effective surface area of the piston in the piston side chamber 122 and the effective surface area of the piston in the rod side chamber 120. In the dual jacking system 150 embodiment, because two actuators 110-a, b are employed to manipulate the work string 152, the area gains of interest may be determined based on twice the effective surface area of the piston in the piston side chamber 122 side and twice the effective surface area of the piston in the rod side chamber 120. The output of the second proportional gain 508 is summed with the output of the directional gain 510 by a fifth summation junction 512. In the event that additional hydraulic actuators 110 are employed together, the directional gain 510 may be determined based on multiplying the effective surface area of the piston in the piston side chamber 122 and the effective surface area of the piston in the rod side chamber 120 by the number of hydraulic actuators 110. In another embodiment, however, the directional gain 510 may be determined in another way.

The force modulator 322 also comprises the directional valve modulator 514. The directional valve modulator 514 determines a directional flow valve command 530 based on the output of the fifth summation junction 512. The directional flow valve command 530 may control the directional flow valve 104 to direct the fluid flow to the rod side chamber 120, to the piston side chamber 122, or to the hydraulic return line 108. In an embodiment, the directional flow valve command 530 may be mapped by a digital-to-analog converter device (not shown) to produce an electrical current to energize the first or the second solenoid to actuate the diverting spool to control the directional flow valve 104. In an embodiment, the directional valve modulator 514 outputs an observer feed forward flow rate command 403. In an embodiment, the directional valve modulator 514 also outputs a flow command that is summed with an estimate of the hydraulic fluid flow disturbance 650 to produce the flow rate command 402. The hydraulic fluid flow disturbance 650 is discussed further below with reference to FIG. 10. The estimate of the hydraulic fluid flow disturbance 650 may take account of fluid leakage past seals within the directional flow valve 104 and/or other hydraulic seals in the hydraulic system. In another embodiment, however, the directional value modulator 514 directly outputs the flow rate command 402 and no hydraulic fluid flow disturbance term is considered.

The force modulator 322 also comprises a portion for calculating an estimated manipulator force as the force produced by the piston side chamber 122 subtracted from the force produced by the rod side chamber 120. The estimated piston side pressure 532 is amplified by a piston side area gain 546 to determine the force produced by the piston side chamber 122 of the hydraulic actuators 110-a,b. The estimated rod side pressure 534 is amplified by a rod side area gain 554 to determine the force produced by the rod side chamber 120 of the hydraulic actuators 110-a, b. Because in the subject embodiment two actuators 110-a, b are employed, the area gains 546, 554 are represented as multiplying their respective areas by a factor of two. In some contexts, the area gains 546, 554 may be referred to as a model or a model portion of the force modulator 322 or of the drive modulator 40. A seventh summation junction 556 sums the negative value of the piston side force with the positive value of the rod side force to determine the estimated traveling head force $\hat{F}_{TH}$. In another embodiment, other control structures may be employed to estimate force. In another embodiment, sensed values of rod side pressure and piston side pressure may be used instead of the estimated rod side pressure 534 and the estimated piston side pressure 532, respectively.

Turning now to FIG. 9, an embodiment of the traveling head controller 326 is described. The traveling head controller 326 is one embodiment of the manipulator controller 20 of the control system architecture 8 described above with reference to FIG. 1. The traveling head controller 326 comprises a proportional-integral-derivative (PID) controller portion and a command feed-forward portion. The traveling head controller 326 also comprises constants to compensate or offset the weight and the damping gain of the traveling head 156, 160.

An estimated traveling head position 610 is negatively summed with a traveling head position command 602 by an eighth summation junction 608 to determine a traveling head position error term. The estimated traveling head position 610 provides a negative feedback term. The output of the eighth summation junction 608 is amplified by a third proportional gain 616. The output of the eighth summation junction 608 is integrated by a second integrator 618 and amplified by a second integral gain 620. In another embodiment, the output of the eighth summation junction 608 is first amplified by the second integral gain 620 and then integrated by the second integrator 618. An estimated traveling head velocity 606 is negatively summed with the traveling head velocity command 502 by a ninth summation junction 612 to determine a traveling head velocity error term. The estimated traveling head velocity 606 provides a negative feedback term. The output of the ninth summation junction 612 is amplified by a first derivative gain 622. The processing of the traveling head velocity error term is considered to be a derivative component with respect to traveling head position because generally velocity is the derivative of position. In another embodiment, the sensed traveling head position and sensed traveling head velocity are used in place of the estimated traveling head position 610 and the estimated traveling head velocity 606, respectively. A tenth summation junction 624 sums the outputs of the third proportional gain 616, the second integral gain 620, and the first derivative gain 622. The components 608, 612, 616, 618, 620, 622, and 624 comprise a PID controller portion. The output of the tenth summation junction 624 may be viewed as a corrective signal that tends to drive the estimated traveling head position 610 and the estimated traveling head velocity 606 to the values of the traveling head position command 602 and the traveling head velocity command 502. In combination with the present disclosure, the values of the third proportional gain 616, the second integral gain 620, and the first derivative gain 622 may readily be determined by one skilled in the control systems art.

A traveling head acceleration command 634 is amplified by a second feed-forward gain 636 to produce a feed-forward signal. The second feed-forward gain 636 is proportional to the estimated mass of the traveling head. The feed-forward term corresponds to a force term, because the product of an acceleration multiplied by a mass is equivalent to a force. The estimated traveling head velocity 606 is amplified by an estimated traveling head damping gain 640. The output of the tenth summation junction 624 is summed with the output from the second feed-forward gain 636, the output from the damping gain 640, and the negative of the estimated traveling head weight 638 by an eleventh summation junction 641 to produce an observer feed forward traveling head force command 643. The output of the eleventh summation junction 641 is summed with negative values of a feed forward work string load command 632 corresponding to the predicted weight of the work string 152 on the traveling head 156, 160 and an estimated traveling head disturbance force term 644 by a twelfth summation junction 642 to produce the traveling head force command 504. In some contexts, the traveling head force command 504 may be referred to more generally as a manipulator force command. In another embodiment, the estimated traveling head disturbance force term 644 is not available and hence is not summed by the twelfth summation junction 642. In combination with the present disclosure, one skilled in the art may readily determine the second feed-forward gain 636 and the traveling head damping gain 640 by experimentally collecting data, for example velocity, position, acceleration, and/or pressure data, and fitting these gain values to this data, a technique which may be commonly performed by one skilled in the control systems art. In some contexts, the second feed-forward gain 636 and the estimated traveling head damping gain 640 may be referred to as a model of the traveling head and/or the manipulator.

Turning now to FIG. 10, a block diagram of the pressure estimator 324 is described. The pressure estimator 324 is one embodiment of the drive observer 50 of the control system architecture 8 described with reference to FIG. 1. The pressure estimator 324 comprises a directional valve command feed forward component 646, a rod side pressure observer 647, a piston side pressure observer 648, and a directional valve disturbance flow component 649. The pressure estimator 324 receives inputs from the directional flow valve command 530, the observer feed forward flow rate command 403, the sensed rod side pressure 652, the sensed piston side pressure 676, the estimated traveling head position 610, and the estimated traveling head velocity 606. In another embodiment, sensed values for traveling head position and traveling head velocity are used in place of the estimated traveling head position 610 and the estimated traveling head velocity 606, respectively. The pressure estimator 324 outputs the flow disturbance 650, the estimated piston side pressure 532, and the estimated rod side pressure 534.

The directional valve command feed forward component 646 receives the directional flow valve command 530 and the observer feed forward flow rate command 403 as inputs and outputs a rod side flow command 667 and a piston side flow command 690. When the directional flow valve command 530 has a piston side value, the directional flow valve 104 is selected to direct hydraulic fluid under pressure from the hydraulic pressure supply line 106 to the piston side hydraulic line 114 into the piston side chamber 122 and to return hydraulic fluid from the rod side chamber 120 to the rod side hydraulic line 112 to the hydraulic return line 107 to the hydraulic fluid reservoir 108. When the directional flow valve command 530 has a piston side value, the directional valve command feed forward component 646 determines the piston side flow command 690 to be proportional to the value of the observer feed forward flow rate command 403 and the rod side flow command 667 to be proportional to the negative value of the observer feed forward flow rate command 403 multiplied by the constant determined as the effective surface area of the piston 118 in the rod side chamber 120 divided by the effective surface area of the piston 118 in the piston side chamber 122.

When the directional flow valve command 530 has a rod side value, the directional flow valve 104 is selected to direct hydraulic fluid under pressure from the hydraulic pressure supply line 106 to the rod side hydraulic line 112 into the rod side chamber 120 and to return hydraulic fluid from the piston side chamber 122 to the piston side hydraulic line 114 to the hydraulic return line 107 to the hydraulic fluid reservoir 108. When the directional flow valve command 530 has a rod side value, the directional valve command feed forward component 646 determines the rod side flow command 667 to be proportional to the value of the observer feed forward flow rate command 403 and the piston side flow command 690 to be proportional to the negative value of the observer feed forward flow rate command 403 multiplied by the constant determined as the effective surface area of the piston 118 in the piston side chamber 122 divided by the effective surface area of the piston 118 in the rod side chamber 120. This may be expressed symbolically by:

$$S^*_{DV} = \text{Piston Side}$$
$$Q^*_{PS} \alpha Q^*_O$$
$$Q^*_{RS} \alpha (-Q^*_O)(A_{RS}/A_{PS})$$

$$S^*_{DV} = \text{Rod Side}$$
$$Q^*_{PS} \alpha (-Q^*_O)(A_{PS}/A_{RS})$$
$$Q^*_{RS} \alpha Q^*_O$$

In an embodiment, the constant of proportionality is unity, but in other embodiments a non-unity constant of proportionality may be used. In some embodiments, when the directional flow valve command 530 has a piston side value, the piston side flow command 690 is proportional to the value of the observer feed forward flow rate command 403 and the rod side flow command 667 is set to about zero; when the directional flow valve command 530 has a rod side value, the rod side flow command 667 is proportional to the observer feed forward flow rate command 403 and the piston side flow command 690 is set to about zero. The directional valve command feed forward component 646 may be implemented as a software component, a function call, or a portion of a software program that executes on a processor of a general purpose computer.

The rod side pressure observer 647 receives the sensed rod side pressure 652 the rod side flow command 667, the estimated traveling head position 610, and the estimated traveling head velocity 606 and outputs the estimated rod side pressure 534 and an estimated rod side flow disturbance 645. The piston side pressure observer 648 receives the sensed piston side pressure 676 the piston side flow command 690, the estimated traveling head position 610, and the estimated traveling head velocity 606 and outputs the estimated piston side pressure 532 and an estimated piston side flow disturbance 651. Both the rod side pressure observer 647 and the piston side pressure observer 648 are discussed in greater detail hereinafter.

The directional valve disturbance flow component 649 receives the directional flow valve command 530, the estimated rod side flow disturbance 645, and the estimated piston side flow disturbance 651 as inputs and outputs the flow disturbance 650. When the directional flow valve command 530 has a piston side value, the directional valve disturbance flow component 649 sets the value of the flow disturbance 650 to the value of the estimated piston side flow disturbance 651. When the directional flow valve command 530 has a rod side value, the directional valve disturbance flow component 649 sets the value of the flow disturbance 650 to the value of the estimated rod side flow disturbance 645. The directional valve disturbance component 649 may be implemented as a software component, a function call, or a portion of a software program that executes on a processor of a general purpose computer.

Turning now to FIG. 11, an embodiment of the rod side pressure observer 647 and the piston side pressure observer 648 are discussed. Each of the pressure observers 647, 648 have a similar structure and are each directed to producing an estimated pressure output and an estimated flow disturbance term output. In combination with the present disclosure, one skilled in the art will readily appreciate that an estimated parameter value, while it is related to a sensed parameter value, may be different from the sensed parameter value. For example, an estimated parameter value may be a smoothed or filtered version of the sensed parameter value that attenuates noise produced by a sensor or by an environment. Additionally, an estimated parameter value may partially reduce or remove phase shifts and/or time lags of system response. Each of the pressure observers 647, 648 includes a proportional-integral (PI) controller portion, a flow feed-forward portion, and a model portion. While the discussion below is based on inputting an estimated traveling head position $Z\hat{}_{TH}$ and an estimated traveling head velocity $V\hat{}_{TH}$ to each of the pressure observers 647, 648, in another embodiment a sensed traveling head position $Z_{TH}$ and a sensed traveling head velocity $V_{TH}$ may be input to each pressure observer 647, 648 in the place of the estimated traveling head position $Z\hat{}_{TH}$ and the estimated traveling head velocity $V\hat{}_{TH}$.

An estimated rod side pressure 673 is negatively summed with a sensed rod side pressure 652 by a thirteenth summation junction 654 to produce a rod side pressure error term. The estimated rod side pressure 673 is a negative feedback term. The sensed rod side pressure 652 may be provided by the second pressure sensor 312-b. The output of the thirteenth summation junction 654 is amplified by a fourth proportional gain 656. The output of the thirteenth summation junction 654 is first integrated by a third integrator 658 and then amplified by a third integral gain 660. In another embodiment, the output of the thirteenth summation junction 654 may by first amplified by the third integral gain 660 and then integrated by the third integrator 658. The outputs of the fourth proportional gain 656 and the third integral gain 660 are summed by a fourteenth summation junction 662. The components 654, 656, 658, 660, and 662 comprise a PI controller portion.

In combination with the present disclosure, the values of the fourth proportional gain 656 and the third integral gain 660 may be readily determined by one skilled in the control systems art. In an embodiment, the values of the fourth proportional gain 656 and the third integral gain 660 are not constant but may vary based on the estimate of the traveling head position $Z\hat{}_{TH}$, which may be referred to as gain scheduling. In an embodiment, the gain schedule may be looked up in a table. In another embodiment, the gain schedule may be defined by a mathematical function dependent on the estimate of the traveling head position $Z\hat{}_{TH}$. In another embodiment, the gain schedule may be defined by another method. Gain scheduling may be useful for achieving stable and fast response across the operating range of the actuators 110. For example, the gains may be based on the volume of the rod side chamber 120 which may vary substantially over the full range of travel of the piston 118.

The components 654, 656, 658, 660, and 662 which comprise the PI controller portion may be viewed as a filtering and/or smoothing mechanism to attenuate noise associated with the second pressure sensor 312-b and/or the operating environment. The output of the fourteenth summation junction 662 may be viewed as a corrective signal that tends to drive the estimated rod side pressure 673 to the sensed rod side pressure 652. The output of the fourteenth summation junction 662 may also be viewed as the estimated rod side flow disturbance 645. In some contexts, the estimated rod side flow disturbance 645 may be referred to as an estimated flow disturbance value that is a smoothed value and based on sensor information.

The flow feed-forward portion produces a flow rate by amplifying the estimated traveling head velocity 606 of the manipulator by a rod side area gain 666. This flow rate is associated with the flow of hydraulic fluid into and out of the rod side chamber 120 as the manipulator moves in the Z-axis of motion. The value of the rod side area gain 666 is proportional to the effective surface area of the rod side of the piston, the area of the piston 118 compensated for by the area of the rod 116 as described above. When two hydraulic actuators 110 are employed, for example the first and second hydraulic actuators 110-a, b, then the area gain may be doubled. The output of the rod side area gain 666 is negatively summed with the output of the fourteenth summation junction 662 and with a rod side flow command 667 by a fifteenth summation junction 668. The effect of the summation of the negative of the rod side gain 666, the rod side flow command 667, and the output from the fourteenth summation junction 662 is to produce through the model a filtered pressure related value that is zero time lagged or zero phase lagged with respect to the sensed rod side pressure 652.

The output of the fifteenth summation junction 668 is integrated by a fourth integrator 672 and then amplified by a rod side model gain 670. In another embodiment, the output of the fifteenth summation junction 668 may be first multiplied by the rod side model gain 670 and then integrated by the fourth integrator 672. The value of the rod side model gain 670 is proportional to $\hat{K}_{oil}$, the estimated bulk modulus of the hydraulic fluid, and is inversely proportional to $\hat{V}_{RS}$, the estimated volume of the rod side chamber 120 for both the first and second hydraulic actuators 110-a, b and the hydraulic lines, for example the rod side hydraulic line 112 associated with the first and second hydraulic actuators 110-a, b. Because the volume of the rod side chamber 120 varies with the estimated traveling head position $\hat{Z}_{TH}$, in an embodiment the value of the rod side model gain 670 may vary and may be determined using gain scheduling in a manner similar to that discussed above.

The estimated bulk modulus of the hydraulic fluid, $\hat{K}_{oil}$, is an indication of the compressibility of the hydraulic fluid. In an embodiment, the value of the estimated hydraulic bulk modulus $\hat{K}_{oil}$ may be about 180,000 pounds per square inch (PSI), but in other embodiments and in using other hydraulic fluids a different estimated bulk modulus $\hat{K}_{oil}$ may be used. The volume of the rod side chamber 120, in an embodiment, may be calculated from an about ten foot stroke and an about seven and one half inch bore or diameter. In other embodiments, different dimensions of the rod side chamber 120 may be appropriate. The calculation of the volume of the rod side chamber 120 should take account of the volume consumed by the rod 116. In combination with the present disclosure, the value of the rod side model gain 670 may be readily determined by one skilled in the control systems art.

The integration of the flow term and multiplying through by the rod side model gain 670 has the effect of transforming the flow term output by the fifteenth summation junction 668 into a pressure term. The output of the rod side model gain 670 is the estimated rod side pressure 673.

An estimated piston side pressure 697 is negatively summed with a sensed piston side pressure 676 by a sixteenth summation junction 678 to produce a piston side pressure error term. The estimated piston side pressure 697 is a negative feedback term. The sensed piston side pressure 676 may be provided by the first pressure sensor 312-a. The output of the sixteenth summation junction 678 is amplified by a fifth proportional gain 680. The output of the sixteenth summation junction 678 is integrated by a fifth integrator 682 and then amplified by a fourth integral gain 684. In another embodiment, the output of the sixteenth summation junction 678 may be first amplified by the fourth integral gain 684 and then integrated by the fifth integrator 682. The outputs of the fifth proportional gain 680 and the fourth integral gain 684 are summed by a seventeenth summation junction 686. The components 678, 680, 682, 684, and 686 comprise a proportional-integral (PI) controller portion. In combination with the present disclosure, the values of the fifth proportional gain 680 and the fourth integral gain 584 may be readily determined by one skilled in the control systems art. In an embodiment, for the same reasons discussed above with respect to the rod side pressure observer 647, the values of the fourth proportional gain 680 and the fourth integral gain 684 may not be constant but may be determined by gain scheduling, by mathematical function dependent on the estimate of the traveling head position $\hat{Z}_{TH}$, or by some other method.

The components 678, 680, 682, 684, and 686 which comprise the PI controller portion may be viewed as a filtering and/or smoothing mechanism to attenuate noise associated with the first pressure sensor 312-a and/or the operating environment. The output of the seventeenth summation junction 686 may be viewed as a corrective signal that tends to drive the estimated piston side pressure 697 to the sensed piston side pressure 676. The output of the seventeenth summation junction 686 may also be viewed as an estimated piston side flow disturbance 651. In some contexts, the estimated piston side flow disturbance 651 may be referred to as an estimated flow disturbance value that is a smoothed value and based on sensor information.

The command feed-forward portion produces a flow rate by amplifying the estimated traveling head velocity 606 of the manipulator by a piston side area gain 688. This flow is associated with the flow of hydraulic fluid into and out of the piston side chamber 122 as the manipulator moves in the Z-axis of motion. The value of the piston side area gain 688 is proportional to the area of the piston 118. When two hydraulic actuators 110 are employed, for example the first and second hydraulic actuators 110-a, b, then the piston side area gain 688 may be doubled. The output of the piston side area gain 688 is positively summed with the output of the seventeenth summation junction 686 and with a piston side flow command 690 by an eighteenth summation junction 692. The sense of summing of the traveling head velocity and area product is different for the piston pressure observer 648 versus the rod side pressure observer 647 because the direction of traveling head motion has opposite flow effects on the rod side chamber 120 and the piston side chamber 122. The effect of the summation of the output of the piston side area gain 688, the piston side flow command 690, and the output from the seventeenth summation junction 686 is to produce through the model a filtered pressure related value that is zero time lagged or zero phase lagged with respect to the sensed piston side pressure 676.

The output of the eighteenth summation junction 692 is integrated by a sixth integrator 696 and then amplified by a piston side model gain 694. In another embodiment, the output of the eighteenth summation junction 692 may be first amplified by the piston side model gain 694 and then integrated by the sixth integrator 696. The value of the piston side model gain is proportional to $\hat{K}_{oil}$, the estimated bulk modulus of the hydraulic fluid, and is inversely proportional to $\hat{V}_{PS}$, the estimated volume of the piston side chamber 122 for both the first and second hydraulic actuators 110-a, b and the hydraulic lines, for example the piston side hydraulic line 114 associated with the first and second hydraulic actuators 110-a, b. Because the volume of the piston side chamber 122 varies with the estimated traveling head position $\hat{Z}_{TH}$, in an embodiment the value of the piston side model gain 694 may be determined using gain scheduling in a manner similar to that discussed above.

The integration of the flow term and multiplying through by piston side model gain 694 has the effect of transforming the flow term output by the eighteenth summation junction 692 into a pressure term. The output of the piston side model gain 694 is the estimated piston side pressure 697.

In some contexts, the model portion of the rod side pressure observer 647 may be considered to comprise the rod side area gain 666 and the rod side model gain 670, and these gains are based on the estimated effective rod side piston area, the estimated hydraulic fluid bulk modulus, and the estimated variable rod side chamber volume. In some contexts the model portion of the piston side pressure observer 648 may be considered to comprise the piston side area gain 688 and the piston side model gain 694, and these gains are based on the estimated effective piston side piston area, the estimated hydraulic fluid bulk modulus, and the estimated variable piston side chamber volume. In some contexts, the model portion of the rod side pressure observer 647 and the model portion of the piston side pressure observer 648 may be referred to as a model of the hydraulic actuator 110 with reference to FIG. 2A or of the hydraulic actuators 110-a, 110-b with reference to FIG. 2B.

Turning now to FIG. 12, an embodiment of the traveling head position and velocity observer 328 is described. The traveling head position and velocity observer 328 is one embodiment of the manipulator observer 30 of the control system architecture 8 described with reference to FIG. 1. The traveling head position and velocity observer 328 may be referred to in some contexts as a manipulator position and velocity observer. The traveling head position and velocity observer 328 provides the estimate of traveling head position 610, the estimate of traveling head velocity 606, and the estimate traveling head disturbance force term 644. In combination with the present disclosure, one skilled in the art will readily appreciate that an estimated parameter value, while it is related to a sensed parameter value, may be different from the sensed parameter value. For example, an estimated parameter value may be a smoothed or filtered version of the sensed parameter value that attenuates noise produced by a sensor or by an environment. Additionally, an estimated parameter value may partially reduce or remove phase shifts and/or time lags of system response. The traveling head position and velocity observer 328 comprises a proportional-integral-derivative (PID) controller portion, a feed-forward portion, and a model portion.

The estimated traveling head position 610 is negatively summed with a sensed traveling head position 730 by a nineteenth summation junction 734 to determine a sensed traveling head position error. The estimated traveling head position 610 provides a negative feedback term. The output of the nineteenth summation junction 734 is amplified by a sixth proportional gain 736. The output of the nineteenth summation junction 734 is integrated by a seventh integrator 738 and then amplified by a fifth integral gain 740. In another embodiment, the output of the nineteenth summation junction 734 may be first amplified by the fifth integral gain 740 and then may be integrated by the seventh integrator 738. The estimated traveling head velocity 606 is negatively summed with a sensed traveling head velocity 732 by a twentieth summation junction 742 to determine a sensed traveling head velocity error. The estimated velocity 606 provides a negative feedback term. The output of the twentieth summation junction 742 is amplified by a second derivative gain 744. The processing of the sensed traveling head velocity error term is considered to be a derivative component with respect to the sensed traveling head position because generally velocity is the derivative of position. A twenty-first summation junction 746 sums the outputs of the sixth proportional gain 736, the fifth integral gain 740, and the second derivative gain 744. The components 734, 736, 738, 740, 742, 744, and 746 comprise a PID controller portion. In combination with the present disclosure, the values of the sixth proportional gain 736, the fifth integral gain 740, and the second derivative gain 742 may be readily determined by one skilled in the control systems art.

The components 734, 736, 738, 740, 742, 744, and 746 which comprise the PID controller portion may be viewed as a filtering and/or smoothing mechanism to attenuate noise associated with the sensed traveling head position 730, the sensed traveling head velocity 732, and/or the operating environment. The output of the twenty-first summation junction 746 may be viewed as a corrective signal that tends to drive the estimated traveling head position 610 and estimated traveling head velocity 606 to the sensed traveling head position 730 and the sensed traveling head velocity 732 values. The output of the twenty-first summation junction 746 may also be viewed as the estimated traveling head disturbance force term 644, an estimate of the un-modeled disturbances acting on the traveling head physical system. In some contexts, the estimated traveling head disturbance force term 644 may be referred to as an estimated disturbance force feedback value that is a smoothed and based on actuator position sensor information.

A twenty-second summation junction 750 sums the output of the twenty-first summation junction 746, the observer feed forward traveling head force command 643, an estimated traveling head weight 752, the negative of the output of the estimated traveling head friction component 760, and the negative of the output of the estimated traveling head damping gain 762. The effect of the summation of the output of the twenty-first summation junction 746, the observer feed forward traveling head force command 643, the estimated traveling head weight 752, the negative of the output of the estimated traveling head friction component 760, and the negative of the output of the estimated traveling head damping gain 762 is to produce through the model a filtered velocity and position related value that is zero time lagged or zero phase lagged with respect to the sensed traveling head position 730 and the sensed traveling head velocity 732.

The estimated traveling head friction component 760 and the estimated traveling head damping gain 762 are provided to take into account friction and damping effects that may be present in the mechanical structure associated with the hydraulic actuators 110-a, b, for example mechanical rails or guides which substantially constrain the hydraulic actuators 110-a, b to motion in a single Z-axis. The estimated traveling head friction component 760 is a function of the polarity of the estimated traveling head velocity 758. The damping effect is modeled as the estimated traveling head velocity 758 amplified by the estimated traveling head damping gain 762. In combination with the present disclosure, the estimated traveling head damping gain 762 and the estimated traveling head friction component 760 may be determined and/or tuned by one skilled in the art by collecting data during experimental operation of the control system and fitting the traveling head model to the data. The value of the estimated traveling head weight 752 may be determined by weighing the traveling head 156, 160, by taking the net weight identified on a specification provided by a manufacturer of the traveling head 156, 160, or by some other known manner. The output of the twenty-second summation junction 750 corresponds to a force term. The output of the twenty-second summation junction 750 is amplified by an inverse estimated traveling head mass gain 766. The value of the inverse estimated traveling head mass gain 766 is inversely proportional to the mass of the traveling head, and the mass of the traveling head 156, 160 may be determined from the weight of the traveling head 156, 160.

The output of the inverse estimated traveling head mass gain 766 is an acceleration term. The output of the inverse traveling head mass gain 766 is integrated by an eighth integrator 768. The output of the eighth integrator 768 is a velocity term, the estimated traveling head velocity 606, because generally the integration of an acceleration produces a velocity. The output of the eighth integrator 768 is integrated by a ninth integrator 770. The output of the ninth integrator 770 is a position term, the estimated traveling head position 610, because generally the integration of a velocity produces a position.

In some contexts, the estimated traveling head weight 752, the estimated traveling head friction component 760, the estimated traveling head damping gain, and inverse traveling head mass gain 766 may be referred to as a model of the traveling head 156, 160, as a model of the traveling head 156, 160 and associated slip bowl 154, 158, or as a model of a force coupling component. In some contexts, the traveling head 156, 160 may be referred to as a force coupling component, e.g., a force coupling component that couples the force output by the actuators 110 to one of the slip bowl 154, 158. In some cases the model of the traveling head 156, 160 may take into account or include the slip bowl 154, 158. In some contexts, the estimated traveling head friction component 760 may be referred to as a force coupling friction component, the estimated traveling head weight 752 may be referred to as an estimated weight of the force coupling component, the estimated traveling head damping gain may be referred to as an estimated damping factor of the force coupling component, and the inverse traveling head mass gain 766 may be associated with an estimated mass of the force coupling component.

Turning now to FIG. 13, an embodiment of a work string controller 800 is discussed. The work string controller 800 is one embodiment of the system controller 10 of the control system architecture 8 described with reference to FIG. 1. The work string controller 800 is configured to control one or more manipulator control systems 300, for example a first manipulator control system 300-a, a second manipulator control system 300-b, and a third manipulator control system 300-c, whereby to control the work string 152. In an embodiment, the work string controller 800 controls the work string 152 through controlling the dual-jacking system 150. In this embodiment, the first manipulator control system 300-a controls the first and second hydraulic actuators 110-a, b and the first slip bowl 154, the second manipulator control system 300-b controls the third and fourth hydraulic actuators 110-c, d and the second slip bowl 158, and the third manipulator control system 300-b controls the third or stationary slip bowl 162. In another embodiment, the work string controller 800 may control the work string 152 by another means, for example using more than two pairs of hydraulic actuators 110 or for example by using a different kind of actuator. In an embodiment, the work string controller 800 comprises a simulated force feedback section 802, a model controller 804, and a manipulator commands generator 806.

The work string controller 800 receives commanded work string values, for example a work string position command 818 and a work string velocity command 828, as control inputs. These commanded work string values 818, 828 may come from a user interface or an operator control station. The work string controller 800 also receives a plurality of sensed and commanded values from components that are part of the control system architecture 8. The work string controller 800 receives sensed or estimated values of manipulator position $Z_{TH1}$, $Z_{TH2}$ and manipulator velocity $V_{TH1}$, $V_{TH2}$, for example from the traveling head position sensors 314 a, b, the traveling head velocity sensors 316 a, b or from the traveling head position and velocity observer 328. The work string controller 800 receives state value of slip bowls $S_{SB1}$, $S_{SB2}$, $S_{SB3}$ from the slip bowls 154, 158, 162. The sensed or estimated values of position and velocity and of slip bowl state may be considered to be feedback to the work string controller 800 from the manipulator physical systems. The work string controller 800 outputs commanded values of manipulator position $Z_{TH1}^*$, $Z_{TH2}^*$, manipulator velocity $V_{TH1}^*$, $V_{TH2}^*$, manipulator acceleration $A_{TH1}^*$, $A_{TH2}^*$, workstring force $F_{WS/TH1}^*$, $F_{WS/TH2}^*$, and slip bowl state $S_{SB1}^*$, $S_{SB2}^*$, $S_{SB3}^*$, for example to the traveling head controller 326 and to the slip bowl 154. At a high level, the work string controller 800 takes into account the command inputs and the feedback inputs to develop commands that are output to the manipulator controllers 300.

In an embodiment, the simulated force feedback section 802 comprises three manipulator simulated force feedback components 810: a first manipulator simulated force feedback component 810-a associated with the actuators 110-a, b and the first slip bowl 154, a second manipulator simulated force feedback component 810-b associated with the actuators 110-c, d and second slip bowl 158, and a third simulated force feedback component 810-c associated with the stationary slip bowl 162. The first manipulator simulated force feedback component 810-a receives sensed or estimated first traveling head position, commanded first traveling head position, sensed or estimated first traveling head velocity, commanded first traveling head velocity, sensed or estimated first slip bowl position and commanded first slip bowl position inputs and generates therefrom a simulated force feedback of the work string on the first manipulator 812-a. The second manipulator simulated force feedback component 810-b receives sensed or estimated second traveling head position, commanded second traveling head position, sensed or estimated second traveling head velocity, commanded second traveling head velocity, sensed or estimated second slip bowl position, and commanded second slip bowl position inputs and generates therefrom a simulated force feedback of the work string on the second manipulator 812-b. The third manipulator simulated force feedback component 810-c receives a sensed or estimated stationary slip bowl position and a commanded stationary slip bowl position as inputs and generates therefrom a simulated force feedback of the work string on the third manipulator 812-c. A twenty-third summation junction 814 sums the simulated force feedback of the work string on the first, second, and third manipulator 812-a, b, c to determine a combined simulated force feedback of the work string on the manipulators 812.

The model controller 804 comprises a PID controller section and a work string model section. The intention of the model controller 804 is to produce an estimated work string position 840 and an estimated work string velocity 842.

The estimated work string position 840 is negatively summed with the work string position command 818 by a twenty-fourth summation junction 820 to produce a position error term. The estimated work string position 840 provides a negative feedback term. The output of the twenty-fourth summation junction 820 is amplified by a seventh proportional gain 821. The output of the twenty-fourth summation junction 820 is integrated by a tenth integrator 822 and amplified by a sixth integral gain 823. In another embodiment, the output of the twenty-fourth summation junction 820 may be first amplified by the sixth integral gain 823 and then integrated by the tenth integrator 822. The estimated work string velocity 842 is negatively summed with the work string velocity command 828 by a twenty-fifth summation junction 830 to produce a velocity error term. The estimated work string velocity 842 provides a negative feedback term. The output of the twenty-fifth summation junction 830 is amplified by a third derivative gain 831. The processing of the velocity term is considered to be a derivative component with respect to the work string position because generally velocity is the derivative of position. The output of the twenty-third summation junction 814 is negatively summed with the output of the seventh proportional gain 821, the output of the sixth integral gain 823, and the output of the third derivative gain 831 by a twenty-sixth summation junction 832. The output of the twenty-third summation junction 814 effectively couples position and velocity feedback, in the form of simulated force feedback of the work string on the manipulators 812, from the manipulators into the estimation of work string position and velocity. In an embodiment, the general intention is that if one of the manipulators is not achieving the targeted manipulator position, the simulated force feedback term grows large, and the position commands to the other non-lagging manipulators are adapted accordingly. This may promote better synchronization among manipulators when a heavy load or an operational anomaly occurs.

In another embodiment, sensed values of work string position and work string velocity may be fed directly to the manipulator commands generator 802. Alternatively, in another embodiment, a sensed value of the work string position and work string velocity may be available, the sensed value of work string position may be substituted for the estimated work string position 840 input to the twenty-fourth summation junction 820, and the sensed value of work string velocity may be substituted for the estimated work string velocity 842 input to the twenty-fifth summation junction 830.

The output of the twenty-sixth summation junction 832 is amplified by a model gain 834. The model gain 834 is inversely proportional to the estimated mass of the work string. During well bore servicing operations the mass of the work string may change, for example as joints of pipe are added to or removed from the work string, and in an embodiment, the model gain 834 may be a changing value rather than a static value. In another embodiment, however, the model gain 834 may be set to a static value associated with a static estimated mass of the work string. The output of the model gain 834 is integrated by an eleventh integrator 836 to produce the estimated work string velocity 842. The output of the eleventh integrator 836 is integrated by a twelfth integrator 838 to produce the estimated work string position 840.

In an embodiment, the manipulator commands generators 806 may be selected to operate in a plurality of operation modes for controlling the first, second, and third manipulators cooperatively. A first mode may be a distributed load or high capacity sequential mode, where the first and second manipulators are controlled to concurrently grip the work string 152 and to apply substantially equal force to the work string 152 in the same direction at the same time. A second mode may be a high speed sequential mode, where the first and second manipulators trade off gripping the work string 152 and applying force to the work string 152 in a sequence of start and stop motions. The high speed sequential mode could also be extended to include all three manipulators. A third mode may be a high speed continuous mode, where the first and second manipulators trade off gripping the work string 152 and applying force to the work string 152 in a manner which constrains work string motions to substantially constant work string velocity or substantially constant work string acceleration or deceleration independent of manipulator trajectories. A fourth mode may be a high speed constrained mode, where the first and second manipulators trade off gripping the work string 152 and applying force to the work string 152 in a manner which is constrained by a maximum hand-off speed between the manipulators. In other embodiments with multiple manipulators and constraints, combinations of these modes are contemplated by the present disclosure. A user interface (not shown), for example a control panel, may be used to select the operation mode of the manipulator commands generator 806 and to input the work string position command 818 and the work string velocity command 828. In another embodiment, the mode of operation may be chosen automatically as the system conditions change, including but not restricted to the changing weight of the work string 152. In response to the operation mode selection, the estimated work string position 840, and the estimated work string velocity 842, the manipulator commands generators 806 may employ an internal map or table or program to generate the operation mode specific manipulator controller command input vectors 340. In an embodiment, a pipe collar indication 844, which may be provided by a collar locator such as that shown in FIG. 16, is also input to the manipulator commands generator 806. The manipulator commands generator 806 may employ the pipe collar indication 844 to avoid commanding the first and second slip bowls 154, 158 and the stationary slip bowl 162 to close on a pipe collar, a situation which would prevent the first and second slip bowls 154, 158 and the stationary slip bowl 162 from closing and gripping the work string 152 securely.

The manipulator commands generator 806 generates the first slip bowl command 214, the first traveling head velocity command **502-*a*, the first traveling head position command 602-*a*, the first traveling head acceleration command 634-*a*, a first feed forward work string load command 632-*a*, the second slip bowl command 220, the second traveling head velocity command 502-*b*, the second traveling head position command 602-*b*, the second traveling head acceleration command 634-*b*, a second feed forward work string load command 632-*b*, and the stationary slip bowl command 228**.

Figure 14:
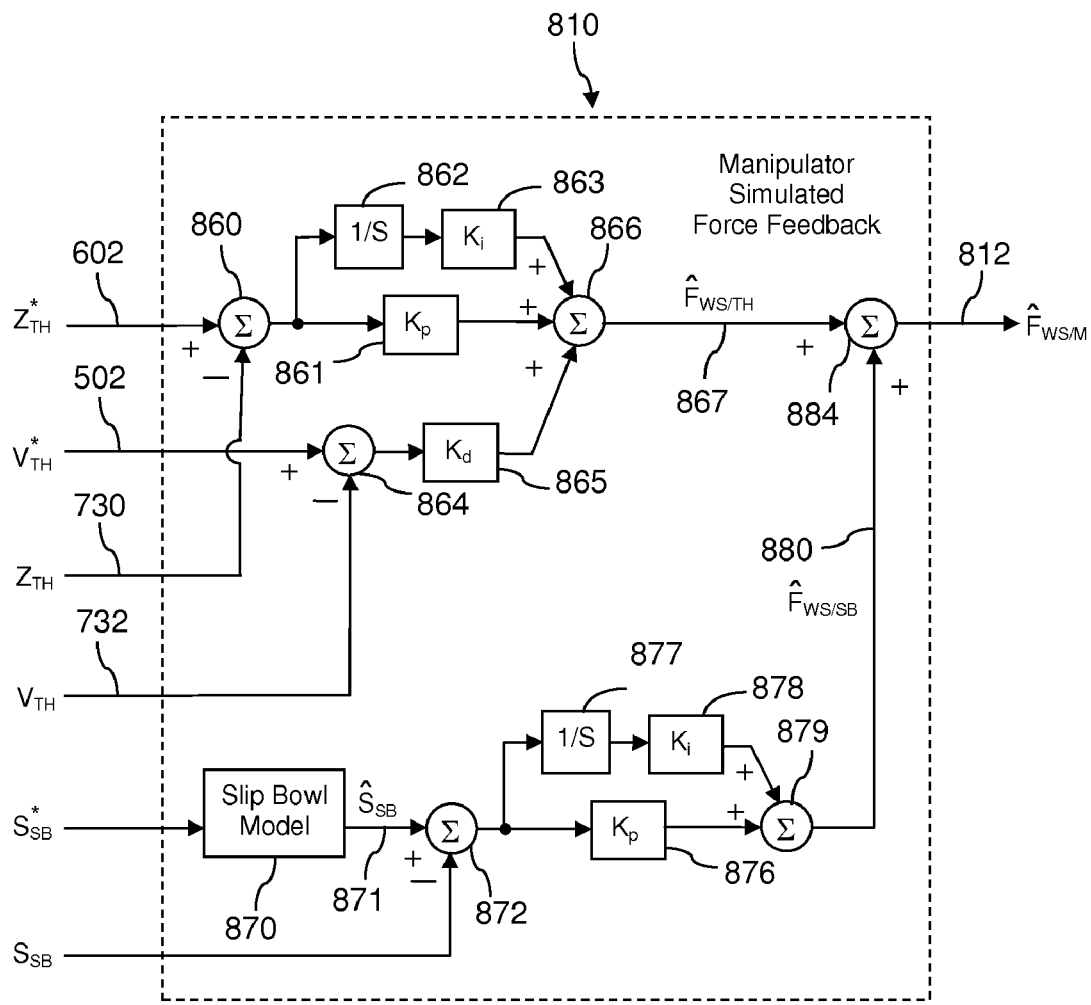
FIG. 14 is a control diagram of a manipulator simulated force feedback component according to an embodiment of the disclosure.

Turning now to FIG. 14, an exemplary manipulator force feedback component 810 is discussed. The manipulator force feedback component 810 comprises a PID controller section, a slip bowl model section, and a slip bowl model PI controller section. The sensed traveling head position 730 is negatively summed with the commanded traveling head position 602 by a twenty-seventh summation junction 860 to produce a position error term. The sensed traveling head position 730 provides a negative feedback term. The output of the twenty-seventh summation junction 860 is amplified by an eighth proportional gain 861. The output of the twenty-eighth summation junction 860 is integrated by a thirteenth integrator 862 and amplified by a seventh integral gain 863. In another embodiment, the output of the twenty-eighth summation junction 860 may be first amplified by the seventh integral gain 863 and then may be integrated by the thirteenth integrator 862. The sensed traveling head velocity 732 is negatively summed with the commanded traveling head velocity 502 by a twenty-eighth summation junction 864 to produce a velocity error term. The sensed traveling head velocity 732 provides a negative feedback term. The output of the twenty-eighth summation junction 864 is amplified by a fourth derivative gain 865. The processing of the traveling head velocity term is considered to be a derivative component with respect to the traveling head position because generally velocity is the derivative of position. The output of the eighth proportional gain 861, the seventh integral gain, and the fourth derivative gain 865 are summed by a twenty-ninth summation junction 866 to produce an estimated work string force feedback on the traveling head 867. In combination with the present disclosure, the values of the eighth proportional gain 861, the seventh integral gain 863, and the fourth derivative gain 864 may be readily determined by one skilled in the control systems art.

The slip bowl command 214, 220, 226 is processed by a slip bowl model 870 to produce an estimated slip bowl position 871. In an embodiment, the slip bowl model 870 may comprise a simple time delay to model the time it takes for the physical slip bowl system to follow the slip bowl command under normal situations. In another embodiment, the sensed slip bowl position and the slip bowl command 214, 220, 226 may relate to a continuous slip bowl position from being fully disengaged to being fully engaged, where the slip bowl model 870 may become unnecessary. The sensed slip bowl position 216 is negatively summed with the estimated slip bowl state 871 by a thirtieth summation junction 872. The output of the thirtieth summation junction 872 is amplified by a ninth proportional gain 876. The output of the thirtieth summation junction 872 is integrated by a fourteenth integrator 877 and amplified by an eighth integral gain 878. In another embodiment, the output of the thirtieth summation junction 872 may first be amplified by the eighth integral gain 878 and then integrated by the fourteenth integrator 877. The output of the ninth proportional gain 876 and the output of the eighth integral gain 878 are summed by a thirty-first summation junction 879 to produce an estimated work string force feedback on the slip bowl. In an embodiment, the value of the eighth integral gain 878 may be set to a substantially higher value than that of the seventh integral gain 863, so the estimated work string force feedback on the slip bowl may ramp up more rapidly than the estimated work string force feedback on the traveling head. In an embodiment, the eighth integral gain 878 may be about five times larger than the seventh integral gain 863. In another embodiment, the eighth integral gain 878 may be about ten times larger than the seventh integral gain 863. In yet another embodiment, the eighth integral gain 878 may be about fifty times larger than the seventh integral gain 863. For example, if the physical slip bowl system does not follow the estimated slip bowl state, for example if the slip bowl 154, 158, 162 does not close because it has erroneously attempted to close on a pipe collar, it is desirable for the estimated work string force feedback on the slip bowl to rapidly increase in value to cause the several manipulators to come to a stop or even reverse direction momentarily. In combination with the present disclosure, the values of the ninth proportional gain 876 and the eighth integral gain 878 may be readily determined by one skilled in the control systems art.

The output of the twenty-ninth summation junction 866 and the thirty-first summation junction 879 are summed by a thirty-second summation junction 884 to determine a simulated force feedback of the work string on the manipulator.

The proportional, integral, and derivative gains in the several control components described above may be determined by an initial calculation based on a pole-zero system stability analysis and a frequency response analysis of the control system and later the gains may be further adjusted when deploying the control system to actual use. The general design approach is to design the control system based on a frequency domain mathematical model, for example expressed using Laplace transforms. This mathematical model includes both control elements and physical elements of the control system. The manipulator control system 300 and the work string controller 800 controlling two or more manipulator control systems 300 may be implemented as hierarchical control systems, wherein the control feedback loops are closed and tuned in order from the lowest level or innermost loop to the highest level or outermost loop. The gains at each level may be tuned to the fastest frequency response which can be attained while maintaining a stable system with good disturbance rejection. In a work string controller system such as that disclosed herein, large disturbances are possible, for example large manipulator force transients associated with portions of the well bore collapsing in on the work string 152 and increasing the friction experienced by the work string 152 moving in the well bore. Therefore, it may be prudent to employ reasonable safety factors in setting the design values for disturbances that may be experienced when tuning the control gains. According to a generally accepted practice, when control loops are placed around other control loops, as is the case with the work string controller 800 and the manipulator control system 300, the outer loop gains may be designed to achieve about one quarter the frequency response of the next lower control loop. In some embodiments, however, this general practice may not be adhered to.

While the figures illustrate the control components in terms of the Laplace transform, which is a continuous time transform, one skilled in the control systems art could readily adapt the continuous time illustrations to discrete time illustrations. The principal modification would be replacing the continuous time Laplace transform of the integration operation, represented as 1/S in the several integrator blocks, by $T_s/(Z-1)$, where Ts is a constant proportional to the control system data sampling interval and $1/(Z-1)$ is the discrete time Z-transform of the integration operation.

As would be appreciated by those of ordinary skill in the control systems art, some portions of the above described control system components may be combined or separated without materially altering the function of the control system. For example, other combinations of summation junctions may be employed to build the flow regulator 320 without materially changing the control function of the flow regulator 320. For example, in another embodiment, the summation provided by the second summation junction 416 and the third summation junction 420 may be performed by a single summation junction without materially altering the control function of the flow regulator 320. Additionally, the order of some portions of the above described control components may be changed without materially changing the function of the control system. For example, reversing the positions of the first integrator 412 with the first integral gain 414 in the flow regulator 320 may not materially alter the function of the flow regulator 320. All such trivial combinations and positional rearrangements that do not materially alter the control function of the controllers and control components described above are contemplated by this disclosure.

Figure 15:
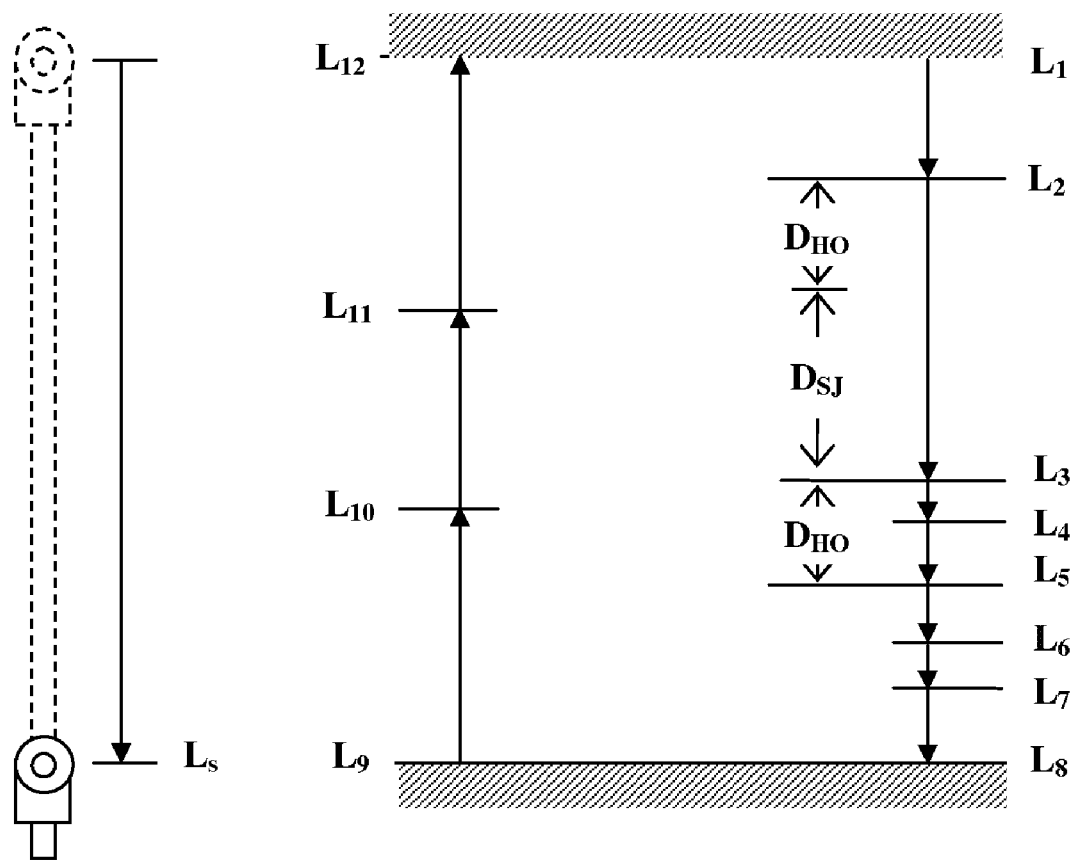
FIG. 15 is an illustration of a kinematic model according to an embodiment of the disclosure.

Turning now to FIG. 15, some kinematic parameters associated with a twelve stage traveling head trajectory are illustrated. The illustrated kinematic parameters provide one possible model of kinematic parameters associated with the control system architecture 8 depicted in FIG. 1, for example kinematic parameters associated with the dual-jacking system 150 depicted in FIG. 3. The kinematic equations disclosed below, including equation (1) through equation (48), provide exemplary kinematic equations that may be employed by the manipulator commands generators 806 in part to generate the manipulator commands in one mode of operation, for example in a high speed continuous mode of operation. In other modes of operation, other kinematic parameters and other kinematic equations may apply. In combination with the present disclosure, one skilled in the art may make appropriate modifications and extensions of these kinematic parameters and associated kinematic equations to apply this information to other related control systems and/or manipulator systems. Table 1 identifies some trajectory stage lengths and describes the stages. Table 2 identifies some trajectory parameters.

TABLE 1

Trajectory Stage Lengths

| | | |
|---|---|---|
| $L_1$ | 0 | in Stage 1 - Maximum Acceleration to Match Pipe Speed |
| $L_2$ | ? | Stage 2 - Slip Bow Engagement (Hand Off) for Fully Loaded Single |
| $L_3$ | ? | Stage 3 - Accelerate for Hand Off |
| $L_4$ | ? | Stage 4 - Relative Jack Velocity for Slip Bowl Disengagement (Hand |
| $L_5$ | ? | Stage 5 - Accelerate Away from Pipe |
| $L_6$ | ? | Stage 6 - Potential Maximum Velocity Achieved |
| $L_7$ | ? | Stage 7 - Decelerate for Return Stroke |
| $L_8$ | $L_s$ | Stage 8 - Zero Velocity Dwell for Directional Valve Switch |
| $L_9$ | $L_s$ | Stage 9 - Maximum Acceleration on Return Stroke |
| $L_{10}$ | ? | Stage 10 - Potential Maximum Velocity Achieved |
| $L_{11}$ | ? | Stage 11 - Maximum Deceleration on Return Stroke |
| $L_{12}$ | 0 | in Zero Velocity Dwell for Directional Valve Switch |

TABLE 2

Trajectory Parameters

| | | |
|---|---|---|
| $D_{HO}$ | ? | Hand Off Length |
| $D_{SJ}$ | ? | Fully Loaded Single Jack Portion of Stroke Length |
| $D_{SB}$ | ? | Distance Traveled during Slip Bowl Response Time $t_{SB}$ |
| $D_{slip}$ | 1 in | Relative Distance for Slip Bowl Disengagement w.r.t. Pipe |
| $F_s$ | 6 | Slip Insurance Safety Factor (Shutdown Conditional) |
| $Q_{max}$ | 60 GPM | Maximum Output Flow rate per Pump |
| $\dot{Q}_{max}$ | | Maximum Output Flow Rate of Change per Pump |
| $V_{dn}$ | ? | Maximum Achievable Velocity Downward |
| $V_{up}$ | ? | Maximum Achievable Velocity Upward |
| $A_{dn}$ | ? | Maximum Achievable Acceleration Downward |
| $A_{up}$ | ? | Maximum Achievable Acceleration Upward |

$$v_1 = 0 \quad (1)$$

$$L_1 = 0 \quad (2)$$

$$L_2 - L_1 = \tfrac{1}{2} a_1 t_1^2 \quad (3)$$

$$v_2 = a_1 t_1 \quad (4)$$

$$v_2 = v_P \quad (5)$$

$$a_2 = 0 \quad (6)$$

$$L_3 L_2 = D_{SJ} + D_{HO} + D_{SB} \quad (7)$$

$$L_3 - L_2 = v_2 t_2 \quad (8)$$

$$L_5 - L_3 = D_{HO} \quad (9)$$

$$v_3 = v_2 \quad (10)$$

$$L_4 - L_3 = v_3 t_3 + \tfrac{1}{2} a_3 t_3^2 \quad (11)$$

$$v_4 = v_3 + a_3 t_3 \quad (12)$$

$$a_3 = a_{DN\_MAX} \quad (13)$$

$$D_{slip} = (L_5 - L_3) - v_P(t_3 + t_4) \quad (14)$$

$$L_5 - L_4 = v_4 t_4 \quad (15)$$

$$a_4 = 0 \quad (16)$$

$$v_5 = v_4 \quad (17)$$

$$L_6 = L_5 = v_5 t_5 + \tfrac{1}{2} a_5 t_5^2 \quad (18)$$

$$L_6 - L_5 = D_{slip} F_s \quad (19)$$

$$v_6 = v_5 + a_5 t_5 \quad (20)$$

$$t_6 = 0 \quad (21)$$

$$a_6 = 0 \quad (22)$$

$$L_7 = L_6 \quad (23)$$

$$L_2 = L_8 - L_5 \quad (24)$$

$$v_7 = a_7 t_7 \quad (25)$$

$$v_7 = v_6 \quad (26)$$

$$t_7 = N T_s \quad (27)$$

$$L_8 - L_7 = v_7 t_7 - \tfrac{1}{2} a_7 t_7^2 \quad (28)$$

$$v_8 = 0 \quad (29)$$

$$a_8 = 0 \quad (30)$$

$$t_8 = T_{switch} \quad (31)$$

$$v_9 = 0 \quad (32)$$

$$v_{10} = a_9 t_9 \quad (33)$$

$$v_{10} = -v_{UP\_MAX} \quad (34)$$

$$a_9 = -a_{UP\_MAX} \quad (35)$$

$$L_9 = L_8 \quad (36)$$

$$L_{10} - L_9 = \tfrac{1}{2} a_9 t_9^2 \quad (37)$$

$$L_{11} - L_{10} = v_{10} t_{10} \quad (38)$$

$$L_{11} = L_8 - L_{10} \quad (39)$$

$$a_{10} = 0 \quad (40)$$

$$v_{11} = v_{UP\_MAX} \quad (41)$$

$$t_{11} = t_9 \quad (42)$$

$$a_{11} = a_{UP\_MAX} \quad (43)$$

$$v_{12} = 0 \quad (44)$$

$$t_{12} = T_{switch} \quad (45)$$

$$a_{12} = 0 \quad (46)$$

$$L_{12} = 0 \quad (47)$$

$$t_2 = t_1 + t_3 + t_4 + t_5 + t_6 + t_7 + t_8 + t_9 + t_{10} + t_{11} + t_{12} \quad (48)$$

Unknowns:

$L_1, L_2, L_3, L_4, L_5, L_6, L_7, L_8, L_9, L_{10}, L_{11}, L_{12}$ $t_1, t_2, t_3, t_4, t_5, t_6, t_7, t_8, t_9, t_{10}, t_{11}, t_{12}$ $v_1, v_2, v_3, v_4, v_5, v_6, v_7, v_8, v_9, v_{10}, v_{11}, v_{12}$ $a_1, a_2, a_3, a_4, a_5, a_6, a_7, a_8, a_9, a_{10}, a_{11}, a_{12}$

Turning now to FIG. 16, an embodiment of a collar locater 900 is described. In an embodiment, the collar locator 900 comprises a first digital camera 908, a first light source 914, a second digital camera 918, a second light source 920, and a collar detector 922. The work string 152 includes a first collar 902 and a second collar 904. Collars in the work string 152 may be formed where two ends of pipes are threaded into each other. The collars 902 and 904 have a larger diameter and a broader profile than the rest of the pipe sections when viewed by the first and second digital cameras 908, 918. The first and second digital cameras 908, 918 provide images of the work string 152 to the collar detector 922 which processes these images to identify collars. The collar detector 922 outputs a collar indication 844. In an embodiment, the collar indication 844 may indicate when a collar is in view of the first digital camera 908, when a collar is in view of the second digital camera 918, and/or the estimated position of one or more collars.

In an embodiment, the digital image of a section of the work string 152 may be thresholded by the collar detector 922 to distinguish the work string 152 from the background. Thresholding is an image processing technique that designates pixels as object pixels or background pixels based on comparing the value of the pixels to a threshold value, for example a grayscale value. In different embodiments, object pixels may be either lighter or darker than the threshold value. After thresholding, an edge detection computer vision algorithm may be applied by the collar detector 922 to determine the approximate width of the profile of the portion of the work string 152 within the image. If the width of the work string 152 exceeds a limit, the collar detector 922 determines that a collar is in the image.

In an embodiment, the first and second digital cameras 908, and 918 may capture images of the work string 152 at a sample rate of 30 times per second or greater. In this embodiment, the collar locator 900 may be able to determine a speed of the work string 152 and to provide an estimate of the location of the first collar 902 and the second collar 904 after they have passed out of the view field of the first and second digital cameras 908, 918 based on the calculated work string velocity.

Figure 17:
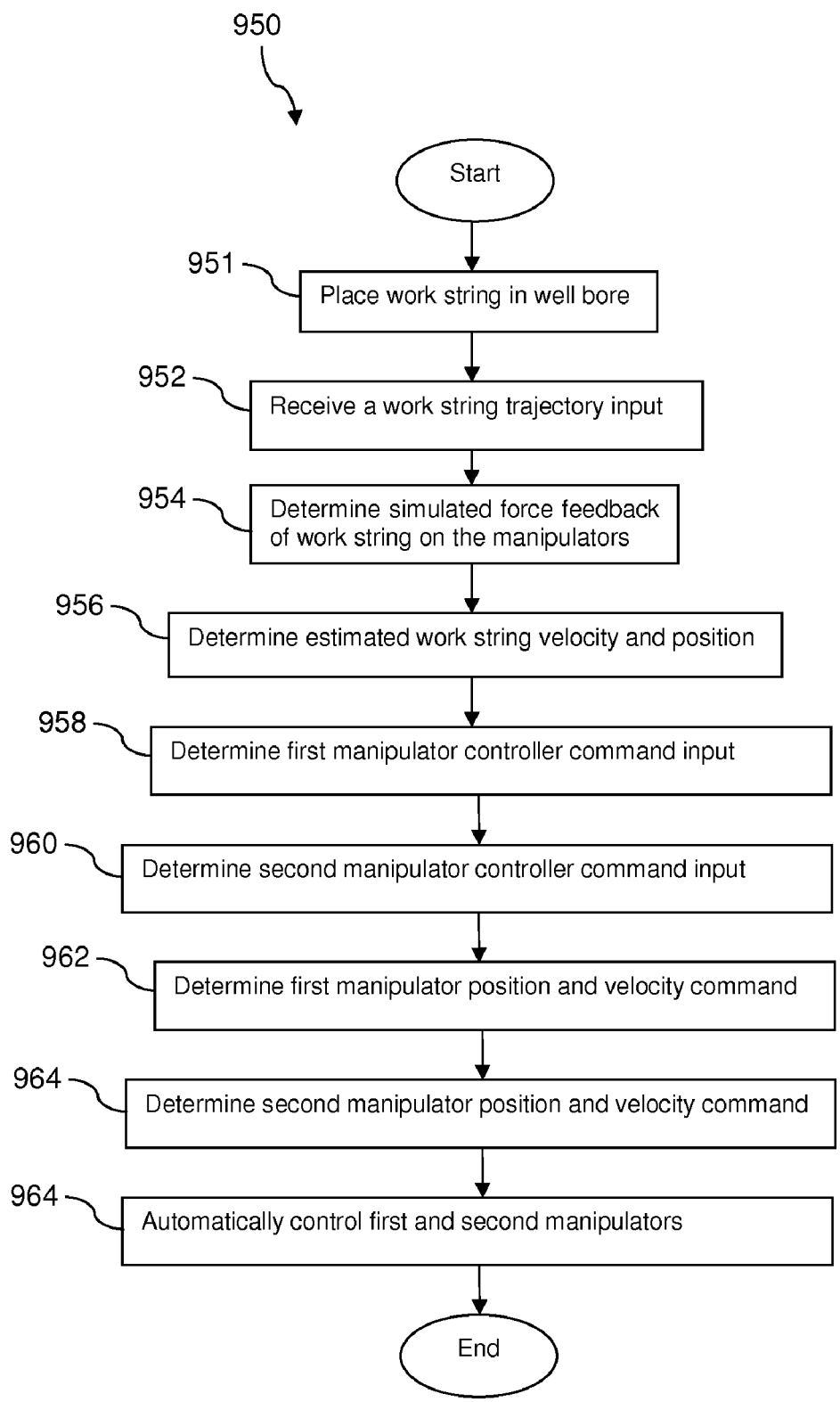
FIG. 17 is a flow chart of a method of controlling a work string according to an embodiment of the disclosure.

Turning now to FIG. 17, a method 950 of controlling the work string 152 is described. In block 951, the work string is placed in a well bore. In block 952, a work string trajectory input is received. The work string trajectory characterizes a desired motion of the work string 152 as one or more linked pairs of position and velocity, or work string target position and work string velocity target. These may be referred to as an ordered sequence of target pairs, wherein each target pair comprises a work string target position and a work string target velocity. In a first example, the work string trajectory input may include one linked pair of position and velocity having a position target of 5000 feet and a velocity target of 5 feet per second. In a second example, the work string trajectory input may include six linked pairs of position and velocity—a first position target of 5010 feet and a first velocity target of 5 feet per second, a second position target of 4990 feet and a second velocity target of −20 feet per second, a third position target of 5010 feet and a third velocity target of 20 feet per second, a fourth position target of 4990 feet and a fourth velocity target of −20 feet per second, a fifth position target of 5010 feet and a fifth velocity target of 20 feet per second, and a sixth position target of 0 feet and a sixth velocity target of −5 feet per second. This second example corresponds to lowering the work string 152 into the well bore to a depth of about 5000 feet and oscillating the work string 152 partially in and out of the well bore and then retracting the work string 152 out of the well bore. It will readily be appreciated that a wide variety of work string manipulation regimes may be described and/or defined by such a series of linked pairs of position and velocity, all of which are contemplated by the present disclosure.

In block 954, the simulated force feedback of the work string on the manipulators is determined. The simulated force feedback of the work string on the manipulators is the sum of the simulated force feedback of the work string on each of the manipulators of the control system. In an embodiment, three manipulators are deployed, for example the dual-jacking system 150, where the first traveling head 156 and the first slip bowl 154 comprise a first manipulator, the second traveling head 160 and the second slip bowl 158 comprise a second manipulator, and the stationary slip bowl 162 comprises a third manipulator. In this embodiment, the simulated force feedback of the work string on the first manipulator $812\text{-}a$, the simulated force feedback of the work string on the second manipulator $812\text{-}b$, and the simulated force feedback of the work string on the third manipulator $812\text{-}c$ are determined and summed.

In block 956, the estimated work string velocity 842 and the estimated work string position 840 are determined. In an embodiment, a model force is determined based on the estimated feedback force of the manipulators on the work string 812, on the work string position command 818, and on the work string velocity command 828. The model force is multiplied by the reciprocal of the estimated work string mass to transform the model force to a model work string acceleration. The estimated work string velocity 842 is determined by integrating the model work string acceleration. The estimated work string position 840 is determined by integrating the estimated work string velocity 842.

In block 958, a first manipulator controller command input vector $340\text{-}a$ is determined based on the estimated work string velocity 842, the estimated work string position 840, the pipe collar indication 844, and the mode of operation. The first manipulator controller command input vector $340\text{-}a$ is transmitted to the first manipulator control system $300\text{-}a$.

In block 960, a second manipulator controller command input vector $340\text{-}b$ is determined based on the estimated work string velocity 842, the estimated work string position 840, the pipe collar indication 844, and the mode of operation. The second manipulator controller command input vector $340\text{-}b$ is transmitted to the second manipulator control system $300\text{-}b$.

In block 962, a first manipulator position command and a first manipulator velocity command are determined by using the first manipulator controller command input vector $340\text{-}a$ to drive the first manipulator physical system components to desired values.

In block 964, a second manipulator position command and a second manipulator velocity command are determined by using the second manipulator controller command input vector $340\text{-}b$ to drive the second manipulator physical system components to desired values. In block 966, the first and second manipulators are automatically controlled based on the first and second manipulator position and velocity commands. The method 950 then ends or may be repeated at a periodic rate effective to control the work string 152.

Figure 18:
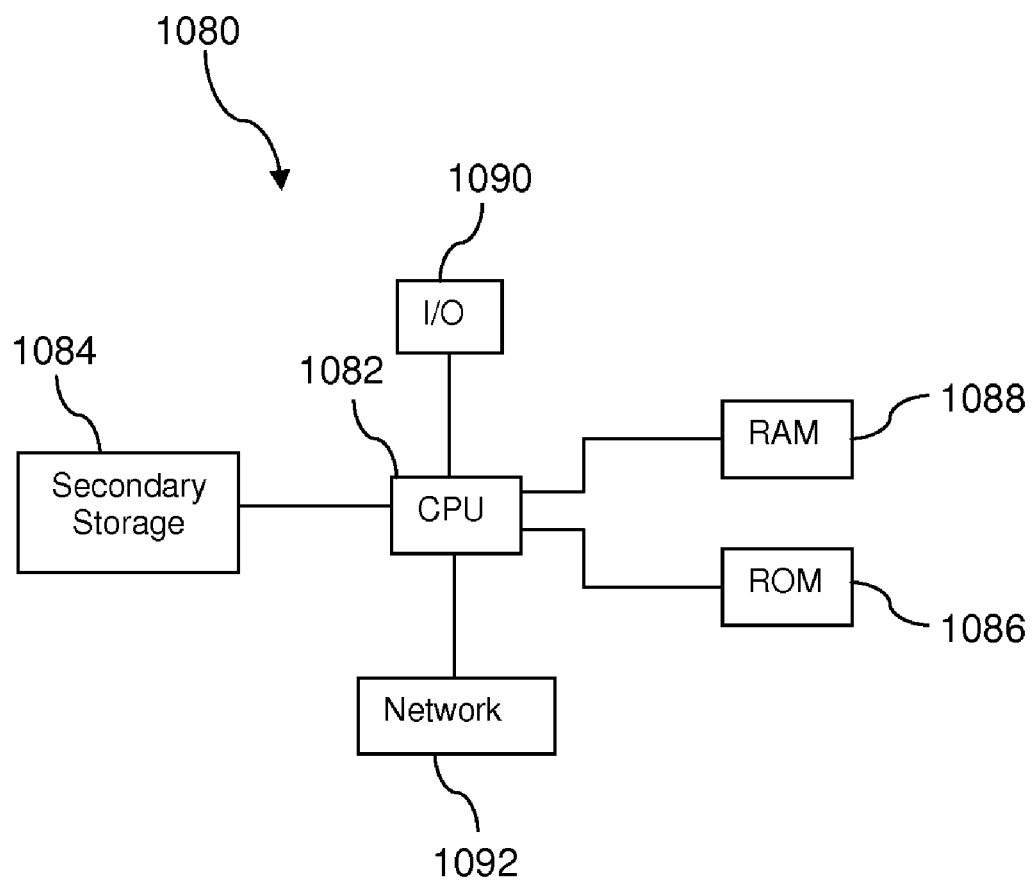
FIG. 18 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 18 illustrates a typical, general-purpose computer system suitable for implementing one or more embodiments disclosed herein. The computer system 1080 includes a processor 1082 (which may be referred to as a central processor unit or CPU) that is in communication with memory devices including secondary storage 1084, read only memory (ROM) 1086, random access memory (RAM) 1088, input/output (I/O) devices 1090, and network connectivity devices 1092. The processor may be implemented as one or more CPU chips.

The secondary storage 1084 is typically comprised of one or more disk drives or tape drives and is used for non-volatile storage of data and as an over-flow data storage device if RAM 1088 is not large enough to hold all working data. Secondary storage 1084 may be used to store programs which are loaded into RAM 1088 when such programs are selected for execution. The ROM 1086 is used to store instructions and perhaps data which are read during program execution. ROM 1086 is a non-volatile memory device which typically has a small memory capacity relative to the larger memory capacity of secondary storage. The RAM 1088 is used to store volatile data and perhaps to store instructions. Access to both ROM 1086 and RAM 1088 is typically faster than to secondary storage 1084.

I/O devices 1090 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 1092 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 1092 may enable the processor 1082 to communicate with an Internet or one or more intranets. With such a network connection, it is contemplated that the processor 1082 might receive information from the network, or might output information to the network in the course of performing the above-described method steps. Such information, which is often represented as a sequence of instructions to be executed using processor 1082, may be received from and outputted to the network, for example, in the form of a computer data signal embodied in a carrier wave. In an embodiment, portions of the control system 8, the controller 202, the manipulator control system 300, and/or the work string controller 800 may be reconfigured and/or gains be tuned from a remote computer via the network connectivity devices 1092.

Such information, which may include data or instructions to be executed using processor 1082 for example, may be received from and outputted to the network, for example, in the form of a computer data baseband signal or signal embodied in a carrier wave. The baseband signal or signal embodied in the carrier wave generated by the network connectivity devices 1092 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the control systems art.

The processor 1082 executes instructions, codes, computer programs, scripts which it accesses from hard disk, floppy disk, optical disk (these various disk based systems may all be considered secondary storage 1084), ROM 1086, RAM 1088, or the network connectivity devices 1092. While only one processor 1092 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A pressure observer, comprising:
    a first proportional-integral (PI) controller portion operable to determine a first pressure error and to generate a first corrective signal based on the first pressure error;
    a first feed-forward portion operable to determine a first flow rate based on a first velocity and a first gain;
    a first integrator operable to integrate the sum of the first corrective signal and the first flow rate; and
    a second gain operable to amplify an output of the first integrator by a first model gain and to produce a first pressure estimate.

2. The pressure observer of claim 1, wherein the first proportional-integral controller portion is further operable to determine a first flow disturbance signal based on the first pressure error.

3. The pressure observer of claim 1, wherein the first pressure error is determined as the difference of a first sensed pressure and the first pressure estimate.

4. The pressure observer of claim 1, wherein the first gain is proportional to the difference of an area of a piston of a hydraulic actuator and an cross-section area of a rod of the hydraulic actuator.

5. The pressure observer of claim 1, wherein the first model gain is proportional to a bulk modulus of a hydraulic fluid and is inversely proportional to a volume comprising a rod side chamber of a hydraulic actuator, wherein the volume of the rod side chamber changes as a rod of the hydraulic actuator moves.

6. The pressure observer of claim 1, further comprising:
    a second proportional-integral (PI) controller portion operable to determine a second pressure error and to generate a second corrective signal based on the second pressure error;
    a second feed-forward portion operable to determine a second flow rate based on a second velocity and a second gain;
    a second integrator operable to integrate the sum of the second corrective signal and the second flow rate; and a second gain operable to amplify an output of the second integrator by a second model gain and to produce a second pressure estimate.

7. A control system for controlling movement of a work string in a well bore, comprising:
a controller comprising a processor, a memory, and a pressure observer component, the pressure observer component comprising
a first proportional-integral (PI) controller portion operable to determine a first pressure error and to generate a first corrective signal based on the first pressure error;
a first feed-forward portion operable to determine a first flow rate based on a velocity of a first hydraulic actuator and a first gain;
a first integrator operable to integrate the sum of the first corrective signal and the first flow rate; and
a second gain operable to amplify an output of the first integrator by a first model gain and to produce a first pressure estimate,
wherein the controller commands the first hydraulic actuator to move the work string based at least in part on the first pressure estimate.

8. The control system of claim 7, wherein the first proportional-integral controller portion is further operable to determine a first flow disturbance signal based on the first pressure error, and wherein the controller commands the first hydraulic actuator to move the work string further based on the first flow disturbance signal.

9. The control system of claim 7, wherein the first pressure error is determined as the difference of a first sensed pressure and the first pressure estimate.

10. The control system of claim 7, wherein the first gain is proportional to the difference of an area of a piston of the first hydraulic actuator and a cross-section area of a rod of the first hydraulic actuator.

11. The control system of claim 7, wherein the first model gain is proportional to a bulk modulus of a hydraulic fluid and is inversely proportional to a volume comprising a rod side chamber of the first hydraulic actuator, wherein the volume of the rod side chamber changes as a rod of the first hydraulic actuator moves.

12. The control system of claim 7, wherein the pressure observer component further comprises:
a second proportional-integral (PI) controller portion operable to determine a second pressure error and to generate a second corrective signal based on the second pressure error;
a second feed-forward portion operable to determine a second flow rate based on a velocity of a second hydraulic actuator and a second gain;
a second integrator operable to integrate the sum of the second corrective signal and the second flow rate; and
a second gain operable to amplify an output of the second integrator by a second model gain and to produce a second pressure estimate,
wherein the controller further commands the second hydraulic actuator to move the work string based at least in part on the second pressure estimate.

13. A method of servicing a wellbore with a work string, comprising:
receiving a work string trajectory input from a user interface, wherein the work string trajectory comprises at least a first work string target position and a first work string target velocity;
determining a first pressure error and generating a first corrective signal based on the first pressure error;
determining a first flow rate based on a velocity of a first hydraulic actuator and a first gain;
integrating the sum of the first corrective signal and the first flow rate to determine a first integrated value;
determining a first pressure estimate based on amplifying the first integrated value by a first model gain;
determining a first hydraulic actuator control command based on the first pressure estimate and the work string trajectory input moving the workstring within the wellbore responsive to the first hydraulic actuator control command.

14. The method of claim 13, further comprising determining a first flow disturbance signal based on the first pressure error, wherein determining the first hydraulic actuator control command is further based on the first flow disturbance signal.

15. The method of claim 13, wherein the first pressure error is determined as the difference of a first sensed pressure and the first pressure estimate.

16. The method of claim 13, wherein the first gain is proportional to the difference of an area of a piston of the first hydraulic actuator and a cross-section area of a rod of the first hydraulic actuator.

17. The method of claim 13, wherein the first model gain is proportional to a bulk modulus of a hydraulic fluid and is inversely proportional to a volume comprising a rod side chamber of the first hydraulic actuator, wherein the volume of the rod side chamber changes as a rod of the first hydraulic actuator moves.

18. The method of claim 13, further comprising:
determining a second pressure error and to generate a second corrective signal based on the second pressure error;
determining a second flow rate based on a velocity of a second hydraulic actuator and a second gain;
integrating the sum of the second corrective signal and the second flow rate to determine a second integrated value;
determining a second pressure estimate based on amplifying the second integrated value by a second model gain and to produce a second pressure estimate; and
determining a second hydraulic actuator control command based on the second pressure estimate and the work string trajectory input.

19. The method of claim 18, further comprising determining a second flow disturbance signal based on the second pressure error, wherein determining the second hydraulic control command is further based on the second flow disturbance signal.

20. The method of claim 18, wherein the second pressure error is determined as the difference of a second sensed pressure and a second pressure estimate.

* * * * *